United States Patent [19]
Magara et al.

[11] Patent Number: 5,919,380
[45] Date of Patent: Jul. 6, 1999

[54] THREE-DIMENSIONAL ELECTRICAL DISCHARGE MACHINING METHOD AND APPARATUS UTILIZING NC CONTROL

[75] Inventors: Takuji Magara; Akihiro Goto; Yoshihito Imai; Tomoko Sendai; Tatsushi Sato; Hidetaka Miyake, all of Tokyo, Japan

[73] Assignee: Mitsubishi Denki Kabushiki Kaisha, Tokyo, Japan

[21] Appl. No.: 08/606,978

[22] Filed: Feb. 26, 1996

[30] Foreign Application Priority Data

Feb. 27, 1995 [JP] Japan ................................. 7-038390

[51] Int. Cl.⁶ ............................. B23H 1/00; B23H 7/20; B23H 7/28
[52] U.S. Cl. .................................. 219/69.16; 364/474.04
[58] Field of Search ......................... 219/69.16, 69.17, 219/69.13; 364/474.04

[56] References Cited

U.S. PATENT DOCUMENTS

| | | | |
|---|---|---|---|
| 3,591,761 | 7/1971 | Bederman et al. | 219/69.16 |
| 3,614,372 | 10/1971 | Dulebohn | 219/69.15 |
| 4,001,538 | 1/1977 | Michalski | 219/69.17 |
| 4,039,779 | 8/1977 | Rupert . | |
| 4,045,641 | 8/1977 | Ullmann et al. | 219/69.17 |
| 4,163,887 | 8/1979 | Bühler | 219/69.12 |

(List continued on next page.)

FOREIGN PATENT DOCUMENTS

| | | |
|---|---|---|
| 2735403 | 12/1980 | Germany . |
| 3134443 | 4/1982 | Germany . |
| 2614765 | 8/1985 | Germany . |
| 3135918 | 10/1988 | Germany . |
| 3790661 | 10/1988 | Germany . |
| 4422967 | 1/1995 | Germany . |
| 3336034 | 8/1995 | Germany . |
| 63-139622 | 6/1988 | Japan . |
| 63-144915 | 6/1988 | Japan . |
| 63-191519 | 8/1988 | Japan . |
| 3-79233 | 4/1991 | Japan . |
| 4-129613 | 4/1992 | Japan . |
| 4-283023 | 8/1992 | Japan . |
| 5-228741 | 9/1993 | Japan . |

OTHER PUBLICATIONS

Three–Dimensionally Controlled EDM Using Column Shaped Electrode (3rd Report), Electrical Processing Society Journal, vol. 17, No. 34, pp. 30–42 (1984).

Electrical Discharge Machining of Low Electrode Wear In Water (I), Electrical Processing Society Journal, vol. 3, No. 5, pp. 23–29 (1969).

Study of Electrical Discharge Machining Using Water as Machining Liquid (1st Report), Electrical Processing Society Journal, vol. 14, No. 27, pp. 50–57 (1980).

Konig, Wilfried (et al) "Bahnerosion als Alternative" In: Industrie–Anzeiger 90/1991, pp. 22–26.

Senkerodiermaschinen zur wirtschaftlichen Bearbeltung von Grosswerkzeugen, FE 540, 550, 560: Catalogue of the firm Schiessnassovia, Apr. 1981, p. 10.

Senkerosion fur alle Anwendungen: catalogue of the firm AGIE, Apr. 1984, pp. 24–25.

*Primary Examiner*—Geoffrey S. Evans
*Attorney, Agent, or Firm*—Sughrue, Mion, Zinn, Macpeak & Seas, PLLC

[57] ABSTRACT

To obtain high machining speed and machining accuracy in three-dimensional machining by using of an electrode of simple shape. Applying voltage between an electrode of simple shape and a workpiece, performing three-dimensional control by an NC control while synthesizing a feed of a Z-axis direction for correcting longitudinal consumed amount of an electrode with an X-Y plane feed, storing amount equivalent to an X-Y moving distance in an X-Y plane corresponding to correcting moving amount of the Z-axis direction in an electrical discharge machining method for machining a desired three-dimensional shape and performing a feed of correcting moving amount in the Z-axis direction each time a moving distance in the X-Y plane on a moving locus during machining reaches the above stored amount.

36 Claims, 48 Drawing Sheets

U.S. PATENT DOCUMENTS

| | | | |
|---|---|---|---|
| 4,168,426 | 9/1979 | Furukawa | 219/69.2 |
| 4,323,749 | 4/1982 | Mazond et al. | 219/69.2 |
| 4,345,131 | 8/1982 | Semon et al. . | |
| 4,484,051 | 11/1984 | Yamada et al. . | |
| 4,608,476 | 8/1986 | Shimizu | 219/69.2 |
| 4,700,038 | 10/1987 | Dauw | 219/69.13 |
| 4,720,616 | 1/1988 | Inoue | 219/69.17 |
| 4,739,145 | 4/1988 | Check et al. . | |
| 5,051,912 | 9/1991 | Johanson et al. . | |
| 5,354,961 | 10/1994 | Diot et al. | 364/474.04 |
| 5,847,352 | 12/1998 | Yuzawa et al. | 219/69.17 |

THREE-DIMENSIONAL ELECTRICAL DISCHARGE MACHINING METHOD AND APPARATUS UTILIZING NC CONTROL

BACKGROUND OF THE INVENTION

The present invention relates to an electrical discharge machining method and apparatus therefor that uses an electrode of a simple shape, such as a tube, a cylinder or an angular column, and that realizes three-dimensional machining by NC control.

There is conventionally known an electrical discharge machining apparatus which three-dimensionally controls an electrode of a simple shape, such as the shape of a tube, a cylinder or an angular column, by NC control means to form a desired three-dimensional shape. In this type of electrical discharge machining apparatus, it is unnecessary to fabricate a compound die electrode of a complicated three-dimensional shape, thereby significantly reducing manufacturing costs for a metal die and reducing the manufacturing time. Moreover, since the electrode shape can be defined in advance, it is easy to construct a CAM system, and automation of machining steps is expected.

However, this type of an electrical discharge machining apparatus has problems with respect to electrode wear and accuracy of machining, in comparison with electrical discharge machining utilizing a compound die electrode.

In order to solve these problems, for example, the engineering department of Yamagata University has proposed a method for dividing a desired three-dimensional shape into several layers in a Z-axis direction and carrying out machining of each layer while simultaneously correcting electrode wear.

For example, FIG. 42 is a constitutional view of an electrical discharge machining apparatus such as disclosed in "Three-dimensional Control Electrical Discharge Machining by a Tubular Electrode (third report)", *Electrical Processing Society Journal*, Vol. 17, No. 34, pp. 30–42 (1984), which is one of a series of research reports by Tsuchiya, Kaneko et al.

In the FIG. 42, reference numeral 1 is an electrode of a cylindrical shape or the like, 2 is a workpiece as a processed material, 3 is an X-Y table for fixing the workpiece 2, 4 is an electrode rotating mechanism for rotating the electrode 1 about a Z-axis, 5 is an X-axis driving means for driving the X-Y table 3 in an X-Y direction, 6 is a Y-axis driving means for driving the X-Y table 3 in a Y direction, 7 is a Z-axis driving means for driving the electrode rotating device 4 with the electrode 1 attached in the Z-axis direction, 8 is a working power source for supplying working pulses between poles formed by the electrode 1 and the workpiece 2, 9 is a machining state detecting means for detecting a machining state during machining, 10 is an NC control means for controlling the X-axis driving means 5, Y-axis driving means 6 and Z-axis driving means 7, 11 is an electrode wear correcting means for correcting wear of the electrode 1 during machining by a positional information. The NC control means 10 gives appropriate commands to each of the X-axis driving means 5, Y-axis driving means 6 and Z-axis driving means 7, while stably maintaining the machining state detected by the machining state detecting means 9 on the basis of a three-dimensional locus command instructed by the electrode wear correcting means 11.

Mr. Tsuchiya and Mr. Kaneko and others have implemented the NC control means 10 and the electrode wear correcting means 11 by a program using a microcomputer. Still, though this implementation does not cause any limitation to the electrode wear correcting method.

FIG. 43 is an explanatory view of the operation of the electrode wear correcting method showing a conventional process, after a three-dimensional machining shape desired to be machined is given, until NC data provided with an electrode wear correction is obtained, which has been proposed by Tsuchiya, Kaneko et al.

First, a process 12a provides data of a desired three-dimensional shape to be machined. Next, a process 13a slices the data of the three-dimensional machining shape into a plurality, e.g., in the Z-axis direction, thereby dividing it into some layers. A series of processes 14a enclosed by a dotted line in the figure is applied to each layer.

Now, it is supposed that the thickness of one layer divided herein is E. A process 15a generates a path of the electrode in an X-Y plane, namely a tool path. Then, a process 16a executes a machining program corresponding to the thickness E of this layer in the Z-axis direction at the start point of the tool path. Thereafter, a series of processes 19a and 20a are carried out to perform machining in the X-Y plane while correcting wear of the electrode.

Next, a principle of the electrode wear correcting method shown in the process 19a is described based upon experimental results of Tsuchiya, Kaneko et al.

FIG. 44 is a graph showing the relation between an electrode moving amount and an electrode consumed length in the X-Y plane in a case where electrode wear correction is not carried out. FIG. 45 is a graph showing the relation between the electrode moving amount and the electrode consumed length in case of machining while performing the electrode wear correction.

Seeing the relation between the electrode moving amount and the electrode consumed length shown in FIG. 44, it is understood that the electrode consumed length is negative at the beginning of machining, and the electrode consumed length increases gradually thereafter. With respect to the amount of change of the electrode consumed length, it is also understood that, the curve inclination changes between m1, m2, m3 depending on the shape or material of the electrode, the material of the workpiece, electrical conditions and the like, and if the change of the electrode consumed length is over a predetermined value, thereafter the electrode 1 is consumed at the same rate. Therefore, the point at which the electrode consumed length changes from negative to positive is made as a correction start point Lc. Then, a correction amount in the Z-axis feeding direction is obtained for each appropriate correction reference interval ΔL, e.g., on the basis of the curve inclination m2.

The correction amount ΔLE of the feed in the Z-axis direction is:

$$\Delta LE = mi \cdot \Delta L$$

where:
  mi: curve inclination of electrode consumed length
  ΔL: correction interval
  Lc: correction start point
  Thus, the machining program with a Z-axis feed correction is executed in the process 20a.

As shown in FIG. 45, if electrode wear correction is performed, the total electrode consumed length increases linearly. This shows that, even if there is wear of the electrode, machining in which the machining depth is uniform, namely, machining of one layer divided into a thickness E, is possible.

Here, parameters necessary for electrode wear correction shown in the process 19a should be stored beforehand as machining technique data 18a corresponding to the thickness E of one divided layer given by the process 13a and the shape or material of the electrode, material of the workpiece, electrical conditions and the like, which are given by the process 17a. Since the electrode consuming amount has a close relation with the electrode shape during machining, the correction amount of electrode wear should be decided in consideration of the case in the removing amount during machining changes according to the tool path.

Japanese Laid-Open Patent Publication No. 5-345228 describes an electrode wear correcting method on the basis of a similar concept to the above.

FIG. 46 is an explanatory view illustrating the principle of a conventional electrode wear correcting method.

As shown in the figure, a tubular electrode is fed in a slanting direction by an angle a relative to a plane, that is, processed by electrical discharge, while being rotated, so that it is possible to attain a stationary state from a position (c) to and after a position (d), in which the profile shape of the electrode 1 and machining depth do not change, after passing a transient state from a position (a) to the position (c), in which the profile shape of the electrode 1 and the machining depth change. At that time, if the machining has a condition of a large electrode consuming amount, the transient state from the position (a) to the position (c) can be nearly ignored. Accordingly, it is possible to carry out removal machining for a layer shape whose machining depth is constant by feeding the machining electrode in the slanting direction by a suitable feeding angle $\alpha$.

At that time, after a short period of early transferring time wherein the electrode 1 touches the workpiece 2 and the profile changes, the profile of the electrode 1 is stable (unchanged) in the rest time of machining (between the position (d) to the position (c)), and the electrode length is consumed while only the electrode length decreases. In the illustrated example, the shape of the leading end of the electrode becomes conical at the end of the transferring step, and an inclination angle $\beta$ is dependent on the layer thickness E (cutting depth or groove depth) and radius R of the tubular electrode.

FIG. 47 is an explanatory view of an electrode wear correcting process illustrating the principle of a conventional electrode wear correcting method.

First, a desired three-dimensional machining shape to be machined is inputted in a process 12b. Next, the three-dimensional machining shape is divided into several layers in a process 13b. Then, a series of processes 14b enclosed by a dotted line in the figure are applied to each layer. Now, it is supposed that a thickness of one divided layer is E. A process 15b generates a path of the electrode 1 in the X-Y plane, namely, a tool path. A series of processes 19b and 20b form a machining program with an electrode wear correction performed prior to the machining for the tool path. According to the principle shown in the FIG. 46, an inclining feed angle $\alpha$ of the electrode for removing one layer of the thickness E can be obtained by the following expression, as shown in the process 19b, from the layer thickness E, a radius R of the machining electrode, a cross sectional area S of the machining electrode and a volume consuming rate U, in consideration of the machining amount and the electrode consuming amount in the stationary state.

$$\tan(\alpha) = R \cdot E \cdot U / S \qquad (1)$$

wherein the expression (1) corresponds to a case in which the electrode 1 is a tubular shape as shown in FIG. 46. In case the electrode 1 is a hollow tubular shape, the inclining feed angle $\alpha$(alpha) of the electrode is shown by the following expression, supposing that the machining electrode has an outside radius R1, an inside radius R2 and a cross sectional area S.

$$\tan(\alpha) = (R1+R2) \cdot E \cdot U / S = E \cdot U / \pi / (R1-R2) \qquad (2)$$

Accordingly, it is necessary to derive expressions for correcting the electrode wear corresponding to the shape of the electrode 1. Here, the parameters can be selected from machining technique data 18b that is prepared beforehand on the basis of a layer thickness given in the process 13b and the shape or material of the electrode, material of the workpiece, electric conditions and the like given in the process 17b.

As mentioned above, the technique disclosed in the publication employs a simulator that calculates a value for correcting longitudinal wear and calculates a feed angle a of the electrode relative to the plane of a layer that is processed by electrical discharge, by moving through a thickness E of a removed layer, a radius R of an electrode and a consumed volume amount U, thereby performing machining by an inclining movement. Particularly, it is shown that the technique can correct longitudinal wear of the electrode by feeding it in the slanting direction, so that it is possible to use an electrode consuming area where the machining speed is increased, thereby improving a work efficiency.

As mentioned above, in the electrical discharge machining apparatus for machining a desired three-dimensional shape by three-dimensionally controlling the electrode 1 of a simple shape like a cylinder or angular rod by use of the NC control means 10, it is important how accurately and simply the electrode wear correction is performed.

However, in the electrode wear correcting method reported in the former conventional "Three-dimensional Control Electrical Discharge Process by a Tubular Electrode (third report)", it is necessary to experimentally measure the correction start point, correction reference interval and curve inclination according to a variety of layer thicknesses, shape or material of an electrode, material of the workpiece, electrical conditions and the like. Moreover, there is a problem that it is very troublesome to store these large quantity of data as machining technique data and so on.

In the electrode wear correcting method described in the latter Laid-Open Patent Publication No. 5-345228, it is theoretically possible to decide an inclining feed angle of the electrode analytically prior to machining if the layer thickness, radius of the machining electrode, cross-sectional area of the machining electrode, and volume consuming rate are given as machining technique data. However, since the electrode consuming rate for practical machining conditions varies depending on the machining liquid temperature or machining chip amount in the machining gap, it cannot always remove accurately a required layer thickness. Therefore, there is a problem that it is troublesome to correct the machining technique data and make a machining program for additional machinings. Namely, it is necessary to input all correcting amount of Z-axis as a Z-axis feed command of an NC program before starting machining. Accordingly, the NC program becomes very complicated and needs a large capacity. At the same time, it is difficult to change the correcting amount in Z-axis even if the machining state changes during machining.

Therefore, the present invention has been made to solve these problems, and it is a first object thereof to reduce the amount of machining technique data which must be inputted manually and which requires correction for electrode wear and to realize electrode wear correction with an easier method.

On the other hand, the electrical discharge apparatus using an electrode of simple shape can perform machining by the electrode of simple shape without fabricating an electrode of complicated shape. However, the machining speed decreases due to an area effect. That is, generally, an electrical discharge machining has an upper limit of an electric current value that can be applied thereto, which varies in accordance with an electrode area. If electric current over such value is supplied, an abnormal arc is generated and machining becomes impossible. If the electrode area is small, it is experimentally verified that this limit value decreases. Usually, the larger the electrode area, the higher the current density can be, thereby increasing machining efficiency. This phenomenon related to the electrical discharge machining is called an area effect. In conventional machining using the electrode of simple shape, the consuming condition can be used, so that the limit value of applied electric current rises. Still, there is a problem in that, under normal electrical discharge machining conditions, the machining efficiency is rather low in comparison with the compound die.

Moreover, a conventional and common electrical discharge machining apparatus for die sinking uses oil as a working fluid, while a wire electrical discharge machining apparatus uses water.

The following are reasons why electrical discharge machining using water is unsuitable for a die sinking electrical discharge machining apparatus and why water has not been used as in the wire electrical discharge machining apparatus.

(1) Low machining accuracy

Since a common electrical discharge machining takes transfer machining by a compound die as a premise, low-wear machining is indispensable. In electrical discharge machining by water, it is known that low electrode wear cannot be obtained by a reversed polarity (electrode positive) as in machining by oil, and that low electrode wear can be obtained at an area of a large pulse width of a positive polarity (electrode negative). (See Kimoto and Tamiya, *Electrical Processing Society Journal*, Vol. 3, No. 5 (1969), pp. 23–29, "Electrical Discharge Machining of Low Electrode Wear in Water (I)"). It has been clarified that a condition to get a low wear is very narrow and critical (See Masuzawa, *Electrical Processing Society Journal*, Vol. 14, No. 27 (1980), pp. 50–57, "Study of Electrical Discharge Machining Using Water as Machining Liquid (first report)"). Accordingly, in case water is used as a working fluid, it is generally difficult to maintain a low consuming state of the electrode. In this regard, the wire electrical discharge machining apparatus feeds the electrode successively, so that electrode wear can be ignored in machining. However, it is hard to obtain a high machining accuracy in case of die sinking electrical discharge machining by the use of the compound die.

(2) Slow machining speed

As long as the low electrode wear condition is used, if water is utilized as working fluid, the machining speed is lowered approximately one-half to one-third in comparison with the oil.

The present invention was made to solve the abovementioned problems, and it is a second object to obtain an electrical discharge machining apparatus that can obtain a higher machining speed and machining accuracy than has been the case conventionally in three-dimensional machining by the use of an electrode of simple shape.

FIGS. 48a to 48f are process explanatory views showing examples of a machining path illustrated in Japanese Laid-Open Patent Publication No. 5-345228. FIGS. 49a and 49b are explanatory views consisting of a plan view (FIG. 49a) and a front view (FIG. 49b) in the case of performing corner portion finishing by side surface machining.

In this type of machining, flashing and unremoved portions are produced along the edge of a layer that has been machined by electrical discharge. Therefore, it is necessary to vary the pattern of the machining path each time the layer changes from one to another in order to remove material left along the edge. Namely, as illustrated in FIGS. 48a to 48g, machining of a desired depth and shape is made possible by repeatedly performing a removing machining operation on the layers many times while switching various machining path patterns.

In the conventional electrical discharge machining apparatus using an electrode of simple shape, it is necessary to vary the machining path pattern each time the layer changes from one to another in order to remove material left along the edge of the machined layer. Therefore, for example, as illustrated in FIGS. 48a to 48g, it is necessary to generate machining paths (machining programs) for repeatedly performing the removing machining of the layers while switching various machining path patterns. Thus, there are problems that the machining programming is made complicated and that the required data capacity is made very great.

Furthermore, even if the machining path is repeatedly machined, the shape which can be machined is limited to a cavity shape of 2.5 dimensions whose side surface is vertical. It is hard to machine a cavity that has a three-dimensional shape as its side surface, having a tapered surface and a curved surface.

In addition, a smallest corner equal to the radius R of a cylindrical electrode or tubular electrode is formed at an inside corner portion of a cavity shape machined by the cylindrical electrode or tubular electrode. It is difficult to finish this corner portion. That is, in the conventional machining by an electrode of simple shape, the machining is performed while keeping a bottom surface shape of the electrode in a stationary state by performing a consuming machining at the bottom surface portion of the electrode. However, after rough machining, as illustrated in FIGS. 48a to 48g, if the consuming condition is used in carrying out a conventional automated enlarging or drawing machining (finishing machining by a side surface portion of the electrode), an electrode radius is reduced due to wear in the cylindrical or tubular electrode. Moreover, a corner portion is worn in the pattern of a square electrode. Accordingly, there is a problem that the shape accuracy at the corner portion is extremely deteriorated.

Therefore, it is necessary to switch the electrical machining condition to a low consuming condition in order to perform good finishing of the corner portion by side surface machining, as shown in FIGS. 49a and 49b. However, it is common that the pulse width of the electric current pulse is increased for the low consuming condition, so that the surface roughness at the corner portion is made worse. Otherwise, the machining speed must be drastically decreased in order to maintain the surface roughness. Moreover, even in case of using the low consuming condition, there arises a problem in the case of a square electrode in that the shape accuracy worsens due to wearing of the electrode corner.

Therefore, the present invention has been made to solve the above conventional problems, and it is a third object to provide an electrical discharge machining method and apparatus therefor that makes programming easy, improves the machining shape accuracy at an edge portion, can easily perform side surface machining of a three-dimensional shape, and can improve a machining accuracy at corner portions.

SUMMARY OF THE INVENTION

The electrical discharge machining method according to a first aspect of the invention includes steps of storing the correcting moving amount for performing correction in the Z-axis direction corresponding to the fixed unit moving distance in the X-Y plane, and performing feeding of the fixed correcting moving amount in the above Z-axis direction each time the moving distance in the X-Y plane, on the moving locus during machining, reaches the above unit moving distance.

The electrical discharge machining apparatus according to a second aspect of the invention comprises storage means for storing the correcting moving amount for performing correction in the Z-axis direction corresponding to the fixed unit moving distance in the X-Y plane, and relative position control means for performing the feed of the fixed correcting moving amount in the above Z-axis direction each time the moving distance in the X-Y plane, on the moving locus during machining, reaches the above unit moving distance.

The electrical discharge machining method according to a third aspect of the invention stores the relation between the fixed unit moving distance in the X-Y plane and the correcting moving amount for performing correction in the Z-axis direction corresponding to the above unit moving distance, and performs feeding of the fixed moving amount in the above Z-axis direction each time the moving distance in the X-Y plane, on the moving locus during machining, reaches the above unit moving distance.

The electrical discharge machining apparatus according to a fourth aspect of the invention comprises storage means for storing the relation between the fixed unit moving distance in the X-Y plane and correcting moving amount for performing correction in the Z-axis direction corresponding to the above unit moving distance, and relative position control means for performing feeding of the fixed correcting moving amount in the above Z-axis direction each time the moving distance in the X-Y plane, on the moving locus during machining, reaches the above unit moving distance.

The electrical discharge machining method according to a fifth aspect of the invention stores the relation between the specific unit moving distance in the X-Y plane and the correcting moving amount, for performing correction in the Z-axis direction corresponding to the above unit moving distance, as the specific unit moving distance in the X-Y plane and the angle, and performs feeding of the fixed correcting moving amount in the above Z-axis direction each time the moving distance in the X-Y plane, on the moving locus during machining, reaches the above unit moving distance.

The electrical discharge machining apparatus according to a sixth aspect of the invention comprises storage means for storing the relation between the fixed unit moving distance in the X-Y plane and correcting moving amount for performing correction in the Z-axis direction corresponding to the above unit moving distance, as the fixed unit moving distance in the X-Y plane and the angle, and relative position control means for performing the feed of the unit moving amount in the above Z-axis direction each time the moving distance in the X-Y plane, on the moving locus during machining, reaches the above unit moving distance.

The electrical discharge machining method according to a seventh aspect of the invention stores the relation between the fixed unit moving distance in the X-Y plane and the correcting moving amount, for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, calculates the fixed corrected unit moving distance in the X-Y plane, which is corrected on the basis of the above unit moving distance in the X-Y plane and the above unit moving distance in the Z-axis direction, and performs feeding of the fixed moving amount in the above Z-axis direction each time the above unit moving distance in the X-Y plane which is corrected on the moving locus during machining reaches the above unit moving distance in the X-Y plane.

The electrical discharge machining apparatus according to an eighth aspect of the invention comprises the storage means for storing the relation between the fixed unit moving distance in the X-Y plane and the correcting moving amount, for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, and the relative position control means for calculating the fixed unit moving distance in the X-Y plane, which is corrected on the basis of the above unit moving distance in the X-Y plane and the above unit moving distance in the Z-axis direction, and performing the feed of the fixed moving amount in the above Z-axis direction each time the above unit moving distance in the X-Y plane which is corrected on the moving locus during machining reaches the above unit moving distance in the X-Y plane.

The electrical discharge machining method according to the ninth aspect of the invention stores the relation between the fixed unit moving distance in the X-Y plane and the correcting moving amount, for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, and performs feeding of the fixed moving amount in the above Z-axis direction each time the unit moving distance in the X-Y plane, on the moving locus during machining, reaches the above unit moving distance in the X-Y plane and the above fixed unit moving distance in the Z-axis direction on the moving locus during machining, on the basis of the above unit moving distance in the X-Y plane and the above unit moving distance in the Z-axis direction.

The electrical discharge machining apparatus according to a tenth aspect of the invention comprises storage means for storing the relation between the fixed unit moving distance in the X-Y plane and the correcting moving amount for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, and the relative position control means for performing the feed of the fixed moving amount in the above Z-axis direction each time the unit moving distance in the X-Y plane, on the moving locus during machining, reaches the above unit moving distance in the X-Y plane and the above fixed unit moving distance in the Z-axis direction on the moving locus during machining, on the basis of the above unit moving distance in the X-Y plane and the above unit moving distance in the Z-axis direction.

The electrical discharge machining method according to an eleventh aspect of the invention divides desired three-dimensional shape into some layers in the Z-axis direction, stores the X-Y data of the tool path for the above each layer, the correction unit interval as a standard for performing correction in the X-Y axis direction and the unit moving distance in the Z-axis direction corresponding to the above correction unit interval, decides how many times the above tool path is repeated depending on the machining depth decided by the moving amount in the Z-axis direction and an amount equivalent to the unit moving distance in the Z-axis direction corresponding to an X-Y moving distance in the above X-Y plane and thereby controls the number of repetition times of the above tool path.

The electrical discharge machining apparatus according to a twelth aspect of the invention comprises storage means for dividing desired three-dimensional shape into some layers in the Z-axis direction and storing at least the X-Y data of the tool path for the above each layer, the correction unit interval as a standard for correcting in the X-Y axis direction and the unit moving distance in the Z-axis direction corresponding to the above correction unit interval, and the repetition time control means for deciding how many times the above tool path is repeated depending on the machining depth decided by the amount equivalent to the thickness of the above layer, the unit moving distance at least in the Z-axis direction and the amount equivalent to the X-Y moving distance in the X-Y plane corresponding to the above unit moving distance, thereby controlling the number of repetition times of the above tool path.

The electrical discharge machining method according to a thirteenth aspect of the invention divides desired three-dimensional shape into some layers in the Z-axis direction; stores at least the X-Y data of the tool path for the above each layer, the correction unit interval as a standard for correcting in an X-Y axis direction and the unit moving distance in the Z-axis direction corresponding to the above correction reference interval; decides how many times the above tool path is repeated depending on the machining depth decided by the amount equivalent to the thickness of the above layer, the unit moving distance at least in the Z-axis direction and the amount equivalent to the amount equivalent to the X-Y moving distance in the X-Y plane corresponding to the above unit moving distance; measuring the machining depth during the above repetition times or after the above repetition times while going on machining for each layer with controlling the repetition times of the above tool path; compares the above measured value with the machining depth expected for the above the repetition times; and, if the above compared value exceeds an allowable range, changes one or more of the rest of the repetition times, the repetition times to be added, the unit moving distance in the Z-axis direction, the amount equivalent to the X-Y moving distance in the X-Y plane corresponding to the unit moving distance in the Z-axis direction, and the electrical conditions that are able to control the wear amount of the electrode.

The electrical discharge machining apparatus according to a fourteenth aspect of the invention comprises the storage means for dividing desired three-dimensional shape into some layers in the Z-axis direction and storing at least the X-Y data of the tool path for the above each layer; repetition time control means for deciding how many times the above tool path is repeated depending on the machining depth decided by the amount equivalent to the thickness of the above layer, the unit moving distance at least in the Z-axis direction and the amount equivalent to the amount equivalent to the X-Y moving distance in the X-Y plane corresponding to the above unit moving distance; measuring means for measuring the machining depth during the above repetition times or after the above repetition times; an electrical condition control means for comparing the above measured value with the machining depth expected for the above repetition times and, if the above compared value exceeds an allowable range, changing one or more of the rest of the repetition times, the repetition times to be added, the unit moving distance in the Z-axis direction, the amount equivalent to the X-Y moving distance in the X-Y plane corresponding to the unit moving distance in the Z-axis direction, and the electrical conditions that are able to control the wear amount of the electrode.

The electrical discharge machining method according to a fifteenth aspect of the invention divides desired three-dimensional shape into some layers in the Z-axis direction; stores at least the X-Y data of the tool path for the above each layer; decides how many times the above tool path is repeated depending on the machining depth decided by the amount equivalent to the thickness of the above layer, the unit moving distance at least in the Z-axis direction and the amount equivalent to the amount equivalent to the moving distance in the X-Y plane corresponding to the above unit moving distance; measures the machining depth during the above repetition times or after the above repetition times while going on performing for each layer with controlling the repetition times of the above tool path; compares the above measured value with the machining depth expected for the above repetition times; and, if the above compared value exceeds an allowable range, changes one or more of the rest of the repetition times, the repetition times to be added, the unit moving distance in the X-Y direction, the feed amount in the Z-axis direction corresponding to the unit moving distance in the X-Y direction, the unit moving distance in the Z-axis direction, the amount equivalent to the X-Y moving distance in the X-Y plane corresponding to the unit moving distance in the Z-axis direction, and the electrical conditions that are able to control the wear amount of the electrode.

The electrical discharge machining apparatus according to a sixteenth aspect of the invention comprises storage means for storing at least the X-Y data of the tool path for the above each layer; repetition time control means for deciding how many times the above tool path is repeated depending on the machining depth decided by the amount equivalent to the thickness of the above layer, the unit moving distance at least in the Z-axis direction and the amount equivalent to the amount equivalent to the X-Y moving distance in the X-Y plane corresponding to the above unit moving distance and controlling the repetition times of the above tool path; measuring means for measuring the machining depth during the above repetition times or after the above repetition times; and the electrical condition control means for comparing the above measured value with the machining depth expected for the above repetition times and, if the above compared value exceeds an allowable range, changing one or more of the rest of the repetition times, the repetition times to be added, the unit moving distance in an X-Y direction, the feed amount in the Z-axis direction corresponding to the unit moving distance in the X-Y direction, the unit moving distance in the Z-axis direction, an amount equivalent to the X-Y moving distance in the X-Y plane corresponding to the unit moving distance in the Z-axis direction, and the electrical conditions that are able to control the wear amount of the electrode.

The electrical discharge machining method according to a seventeenth aspect of the invention comprises the repetition time control means for synthesizing the feed in the Z-axis direction for correcting the longitudinal wear amount of the electrode with the X-Y plane feed and controlling at least one type of the repeating movement of the tool path; machining liquid supplying means for supplying ion exchange water as machining liquid between the poles; and the working power source for supplying the pulse current of high peak and short pulse, that has a negative polarity at an electrode side, between the poles, and performs machining under the wearing machining condition having an electrode wearing percentage of 40% or more.

The electrical discharge machining apparatus according to an eighteenth aspect of the invention comprises repetition time control means for synthesizing the feed in the Z-axis direction for correcting the longitudinal wear amount of the electrode with the X-Y plane feed and controlling at least one type of the repeating movement of the tool path; machining liquid supplying means for supplying ion exchange water as machining liquid between the poles; and the working power source for applying bipolar voltage between the poles and supplying the pulse current of high peak and short pulse, that has a negative polarity at an electrode side, between the poles, and performs machining under the wearing machining condition having an electrode wearing percentage of 40% or more.

The electrical discharge machining apparatus according to a nineteenth aspect of the invention uses pulse current whose peak value is 100A or more and whose pulse width is 20 microseconds or less for the working power source to supply the pulse current of high peak and short pulse.

The electrical discharge machining apparatus according to a twentieth aspect of the invention uses brass for the electrode of simple shape as recited in one of claim 1 to claim 19.

The electrical discharge machining method according to a twenty-first aspect of the invention applies voltage between the electrode of simple shape and the workpiece, performs three-dimensional control by the NC control while synthesizing the feed in the Z-axis direction, for correcting the longitudinal wear amount of the electrode, with the X-Y plane feed and performs machining while repeatedly moving the inside machining path for forming the inside shape path in the machining shape and the profile machining path for forming the profile shape path in the machining shape in the electrical discharge machining method which processes desired three-dimensional shape.

The electrical discharge machining apparatus according to a twenty-second aspect of the invention comprises the inside machining path generating means for generating the inside shape path in the machining shape and the profile machining path generating means for generating the profile shape path in the machining shape, and performs machining while repeatedly moving the above inside shape path and the profile shape path.

The electrical discharge machining apparatus according to a twenty-third aspect of the invention comprises inside machining path generating means for forming the inside shape path in the machining shape and the profile machining path generating means for forming the profile shape path in the machining shape.

The electrical discharge machining method according to a twenty-fourth aspect of the invention performs machining of a machining shape having a side surface of a desired angle by repeatedly machining while gradually reducing or inwardly changing the profile shape path in the machining shape.

The electrical discharge machining method according to a twenty-fifth aspect of the invention comprises offset program storage means for storing the profile shape path in the machining shape as the program having the offset information and the offset value storage means for storing a plurality of offset value to be changed during machining, and performs machining of a shape having a side surface of a desired angle by repeatedly machining while changing the above offset value one after another.

The electrical discharge machining apparatus according to a twenty-sixth aspect of the invention comprises offset program storage means for storing the profile shape path in the machining shape as the program having the offset information, the side surface shape storage means for storing the information about a side surface shape and the offset value calculating means for calculating the offset value to be changed during machining on the basis of the information about the above side surface shape, and performs machining of a shape having a side surface of a desired angle by repeatedly machining while changing the offset value one after another by the calculated result of the above offset value calculating means.

The electrical discharge machining apparatus according to a twenty-seventh aspect of the invention comprises electrode holding means for fixing an electrode at a slanting state by a predetermined angle to its electrode rotation axis and the working power source that can vary the electrode consumed amount, and machines and forms a side surface shape having a constant slope by the profile machining for machining of desired shape while rotating the electrode at the slanting state by the predetermined angle.

The electrical discharge machining method according to a twenty-eighth aspect of the invention performs machining of the inside corner portion of the radius R by the cylindrical electrode or tubular electrode, and thereafter, finishes the corner portion which the above cylindrical electrode or tubular electrode fails to remove by the quadrangular electrode whose one side length L is to be $$L \leq \left(1 - \frac{1}{\sqrt{2}}\right) \cdot R.$$

The electrical discharge machining method according to a twenty-ninth aspect of the invention performs machining of the inside corner portion of the radius R by the cylindrical electrode or tubular electrode, and thereafter, finishes the corner portion which the above cylindrical electrode or tubular electrode fails to remove by the above cylindrical electrode or tubular electrode for finishing machining whose radius R' is to be $$R' \leq \left(1 - \frac{1}{\sqrt{2}}\right) \cdot R.$$

The electrical discharge machining method according to a thirtieth aspect of the invention performs machining of the inside corner portion of the radius R by the cylindrical electrode or tubular electrode, and thereafter, finishes the corner portion which the above cylindrical electrode or tubular electrode fails to remove by the tubular electrode having such a shape as a part of the liquid hole portion covers the corner portion which the cylindrical electrode or tubular electrode fails to remove.

The electrical discharge machining apparatus according to a thirty-first aspect of the invention comprises electrode exchanging means for exchanging a plurality of electrodes, the corner portion judging means for judging whether the position which is now processed is the corner portion or not, and the relative position control means for controlling so as to perform machining in the slanting direction while synthesizing the feed in the Z-axis direction for correcting the longitudinal wear amount of the electrode with the X-Y plane feed at the corner portion, and perform only the X-Y plane feed at portions other than the corner portion, exchanges the electrode for an electrode for finishing after machining by the cylindrical electrode or tubular electrode, and performs finishing machining of the corner portion on the basis of a command of the above relative position control means.

The electrical discharge machining apparatus according to a thirty-second aspect of the invention comprises interpole detecting means for detecting if interpole space is opened due to decrease of discharge frequency or increase of average machining voltage or the like during machining, and stops the feed in the Z-axis direction and performs only the X-Y plane feed in case the interpole space is opened or nearly opened by the above interpole detecting means.

The electrical discharge machining apparatus according to a thirty-third aspect of the invention performs horizontal movement at portions other than the corner portion by the interpole control means at a higher speed than a normal machining speed.

In the electrical discharge machining apparatus according to a thirty-fourth aspect of the invention the electrical discharge machining apparatus comprises moving speed detecting means for detecting decrease of the horizontal moving speed at portions other than the corner portion and the corner portion judging means for judging if the electrode for finishing a corner reaches a bottom surface by rough machining from detected results of the above moving speed detecting means, and judges complete time of finishing machining by the above corner portion judging means.

Also, in the electrical discharge machining apparatus according to a thirty-fifth aspect of the invention the electrical discharge machining apparatus comprises interpole detecting means for detecting increase of discharge frequency or decrease of average machining voltage during machining, and corner portion judging means for judging if the electrode for finishing a corner reaches a bottom surface by rough machining from detected results of the above interpole detecting means, and judges complete time of finishing machining by the above corner portion judging means.

DESCRIPTION OF THE PREFERRED EMBODIMENTS

Figure 1:
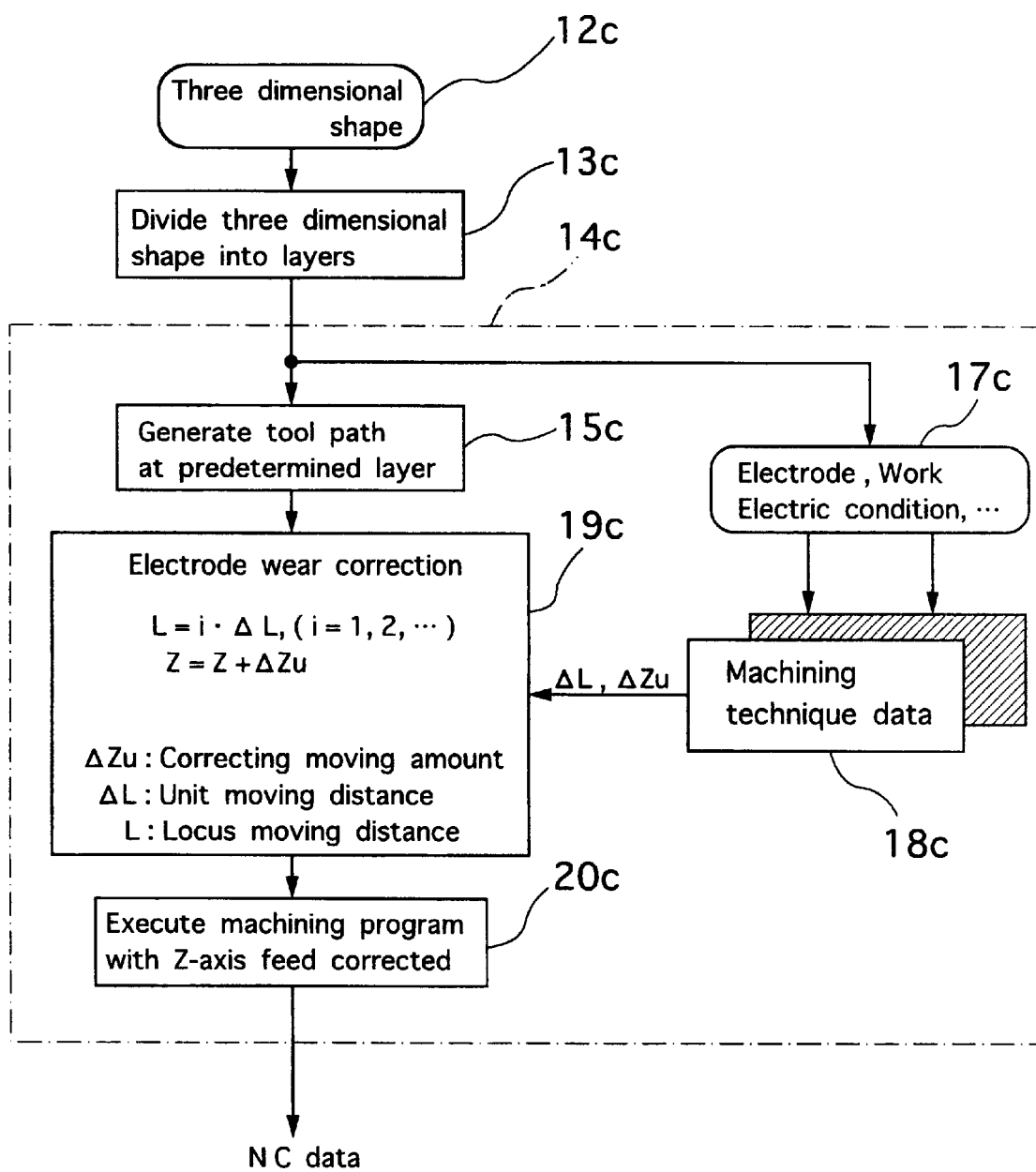
FIG. 1 is an explanatory view of an electrode wear correcting process illustrating a principle of an electrode wear correcting method of a first embodiment of the invention

In accordance with the first and second aspects of the invention, the correcting moving amount for performing correction in the Z-axis direction corresponding to the fixed unit moving distance in the X-Y plane is stored, and feeding is performed of the fixed correcting moving amount in the above Z-axis direction each time the moving distance in the X-Y plane, on the moving locus during machining, reaches the above unit moving distance; therefore, it is possible to correct an electrode wear by a small amount of machining technique data.

In accordance with the third and fourth aspects of the invention, it is set so as to store the relation between the fixed unit moving distance in the X-Y plane and the correcting moving amount for performing correction in the Z-axis direction corresponding to the above unit moving distance, and perform the feed of the fixed moving amount in the above Z-axis direction each time the moving distance in the X-Y plane, on the moving locus during machining, reaches the above unit moving distance, therefore, it is possible to correct an electrode wear by a small amount of machining technique data.

In accordance with the fifth and sixth aspects of the invention, it is set so as to store the relation between the specific unit moving distance in the X-Y plane and the correcting moving amount, for performing correction in the Z-axis direction corresponding to the above unit moving distance, as the specific unit moving distance in the X-Y plane and the angle, and perform the feed of the fixed correcting moving amount in the above Z-axis direction each time the moving distance in the X-Y plane, on the moving locus during machining, reaches the above unit moving distance; therefore, it is possible to correct an electrode wear by a small amount of machining technique data.

In accordance with the seventh and eighth aspects of the invention, the relation between the fixed unit moving distance in the X-Y plane and the correcting moving amount is stored, for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, calculate the fixed unit moving distance in the X-Y, plane which is corrected on the basis of the above unit moving distance in the X-Y plane and the above unit moving distance in the Z-axis direction, and perform the feed of the fixed moving amount in the above Z-axis direction each time the above unit moving distance in the X-Y plane which is corrected on the moving locus during machining reaches the above unit moving distance in the X-Y plane, therefore, a machining program for correcting a electrode wear comes to be easy regardless of the different thickness of layers.

In accordance with the ninth and tenth aspects of the invention, the relation between the fixed unit moving distance in the X-Y plane and the correcting moving amount is stored, for performing correction in the Z-axis direction corresponding to the above unit moving distance, and the relation between the fixed unit moving distance in the Z-axis direction and the correcting moving amount, for performing correction in the Z-axis direction corresponding to the above unit moving distance, and perform the feed of the fixed moving amount in the above Z-axis direction each time the unit moving distance in the X-Y plane, on the moving locus during machining, reaches the above unit moving distance in the X-Y plane and the fixed unit moving distance in the Z-axis direction on the moving locus during machining, on the basis of the above unit moving distance in the X-Y plane and the above unit moving distance in the Z-axis direction, therefore, a machining program for correcting a electrode wear comes to be easy regardless of the different thickness of layers.

In accordance with the eleventh and twelfth aspects of the invention, when machining for each layer is performed while controlling a repetition times of the above tool path, it is set so as to change one or more of the rest of the repetition times, the repetition times to be added, the unit moving distance in the Z-axis direction, an amount equivalent to the X-Y moving distance in the X-Y plane corresponding to the unit moving distance in the Z-axis direction, or an amount used for finding them and electrical conditions that can adjust the consumed amount of the electrode by measuring the machining depth during the above repetition times or after the above repetition times and comparing the above measured value with the machining depth expected for the above repetition times. Therefore, it comes to be easy to modify machining technique data and to make a machining program for an additional machining and it is possible to remove the desired thickness of layers accurately.

In accordance with the thirteenth and fourteen aspects of the invention, it is set so as to store at least X-Y data of the tool path for each layer, decide how many times the above tool path is repeated depending on the machining depth decided by the amount equivalent to the thickness of the above layer, the unit moving distance at least in the Z-axis direction and the amount equivalent to the amount equivalent to the X-Y moving distance in the X-Y plane corresponding to the above unit moving distance, perform machining for each layer while controlling the repetition times of the above tool path, measure the machining depth during the above repetition times or after the above repetition times, compare the above measured value with the machining depth expected for the above repetition times, and, if the above compared value exceeds an allowable range, change one or more of the rest of the repetition times, the repetition times to be added, the unit moving distance in the Z-axis direction, the amount equivalent to the X-Y moving distance in the X-Y plane corresponding to the unit moving distance in the Z-axis direction, and the electrical conditions that can adjust the wear amount of the electrode. Therefore, it comes to be easy to make a machining program for electrode wear correction in case of adjustment or change of the thickness of layers and it is possible to remove the desired thickness of the layers accurately.

In accordance with the fifteenth and sixteenth aspects, it is set so as to store at least the X-Y data of the tool path for each layer, decide how many times the above tool path is repeated depending on the machining depth decided by the amount equivalent to the thickness of the above layer, the unit moving distance at least in the Z-axis direction and the amount equivalent to the amount equivalent to the moving distance in the X-Y plane corresponding to the above unit moving distance, measure the machining depth during the above repetition times or after the above repetition times while going on machining for each layer with controlling the repetition times of the above tool path, compare the above measured value with the machining depth expected for the above repetition times, and, if the above compared value exceeds an allowable range, change one or more of the rest of the repetition times, the repetition times to be added, the unit moving distance in the X-Y direction, the feed amount in the Z-axis direction corresponding to the unit moving distance in the X-Y direction, the unit moving distance in the Z-axis direction, the amount equivalent to the X-Y moving distance in the X-Y plane corresponding to the unit moving distance in the Z-axis direction, and the electrical conditions that can adjust the wear amount of the electrode. Therefore, it comes to be easy to make a machining program for electrode wear correction in case of adjustment or change of the thickness of layers and it is possible to remove the desired thickness of the layers accurately.

In accordance with the seventeenth aspect of the invention, machining is performed by synthesizing the feed in the Z-axis direction for correcting the longitudinal wear amount of the electrode of simple shape with the X-Y plane feed, controlling at least one or more type of the repeating movement of the tool path, supplying the ion exchange water as machining liquid between poles, and supplying the pulse current of high peak and short pulse, that has a negative polarity at an electrode side, between the poles under the wearing machining condition having an electrode wearing percentage of 40% or more.

In accordance with the eighteenth aspect of the invention, machining is performed by synthesizing the feed in the Z-axis direction for correcting the longitudinal wear amount of the electrode of simple shape, with the X-Y plane feed, controlling at least one or more type of the repeating movement of the tool path, supplying the ion exchange water as machining liquid between poles, applying bipolar voltage between the poles, and supplying the pulse current of high peak and short pulse, that has a negative polarity at an electrode side between the poles under the wearing machining condition having an electrode wearing percentage of 40% or more only in case of discharge generation with the negative polarity at the electrode side.

In accordance with the nineteenth aspect of the invention, machining is performed by the pulse current whose peak value is 100A or more and whose pulse width is 20 microseconds or less as a pulse current wave form of high peak and short pulse.

In accordance with the twenthieth aspect of the invention, machining is performed by using brass as a material for an electrode of simple shape.

In accordance with the twenty-first aspect of the invention, machining is performed by applying voltage between the electrode and the workpiece which are facing to each other, synthesizing the feed in the Z-axis direction, for correcting the longitudinal wear amount of the electrode, with the X-Y plane feed, and repeatedly moving the inside machining path for forming the inside shape path in the machining shape and the profile machining path for forming the profile shape path in the machining shape.

In accordance with the twenty-second aspect of the invention, the inside shape path and the profile shape path in the machining shape is generated before machining, and then, machining is performed by applying voltage between the electrode and the workpiece which are facing to each other and repeatedly moving the above inside shape path and the profile shape path while synthesizing the feed in the Z-axis direction for correcting the longitudinal wear amount of the electrode with the X-Y plane feed.

In accordance with the twenty-third aspect of the invention, the inside machining path for forming the inside shape path in the machining shape and the profile machining path for forming the profile shape path in the machining shape are generated.

In accordance with the twenty-fourth aspect of the invention, machining of the machining shape having a side surface of a desired angle is performed by applying voltage between the electrode and the workpiece which are facing to each other, synthesizing the feed in the Z-axis direction for correcting the longitudinal wear amount of the electrode with the X-Y plane feed and repeatedly machining while gradually reducing or inwardly changing the profile shape path in the machining shape.

In accordance with the twenty-fifth aspect of the invention, machining of the machining shape having a side surface of a desired angle is performed by applying voltage between the electrode and the workpiece which are facing to each other, synthesizing the feed in the Z-axis direction, for correcting the longitudinal wear amount of the electrode, with the X-Y plane feed and repeatedly machining while changing the offset value of the profile shape path in the machining shape one after another.

In accordance with the twenty-sixth aspect of the invention, machining of the machining shape having a side surface of a desired angle is performed by applying voltage between the electrode and the workpiece which are facing to each other, synthesizing the feed in the Z-axis direction, for correcting the longitudinal wear amount of the electrode, with the X-Y plane feed, calculating the offset value to be changed during machining on the basis of the information about a side surface shape and repeatedly machining while changing the offset value one after another.

In accordance with the twenty-seventh aspect of the invention, a side surface shape having a constant slope is performed and formed by applying voltage between workpieces while rotating the electrode at the slanting state by the predetermined angle to the electrode rotation axis, synthesizing the feed in the Z-axis direction, for correcting the longitudinal wear amount of the electrode, with then X-Y plane feed, and machining the profile in a desired shape.

In accordance with the twenty-eighth aspect of the invention, voltage is applied between the electrode and the workpiece which are facing to each other, machining is performed by the cylindrical electrode or tubular electrode whose radius is R while the feed in the Z-axis direction, for correcting the longitudinal wear amount of the electrode, is synthesized with the X-Y plane feed, and thereafter, finishing the corner portion which the above cylindrical electrode or tubular electrode fails to remove is performed by the quadrangular electrode whose one side length L is $$L \leq \left(1 - \frac{1}{\sqrt{2}}\right) \cdot R.$$

In accordance with the twenty-ninth aspect of the invention, voltage is applied between the electrode and the workpiece which are facing to each other, machining is performed by the above cylindrical electrode or tubular electrode whose radius is R while the feed in the Z-axis direction for correcting the longitudinal wear amount of the electrode is synthesized with the X-Y plane feed, and thereafter, finishing the corner portion which the above first cylindrical electrode or tubular electrode fails to remove by the following cylindrical electrode whose radius R' is $$R' \leq \left(1 - \frac{1}{\sqrt{2}}\right) \cdot R.$$

In accordance with the thirtieth aspect of the invention, voltage is applied between the electrode and the workpiece which are facing to each other, machining is performed by the above cylindrical electrode or tubular electrode whose radius is R while the feed in the Z-axis direction, for correcting the longitudinal wear amount of the electrode, is synthesized with the X-Y plane feed, and thereafter, finishing the corner portion which the above cylindrical electrode or tubular electrode fails to remove is performed by the tubular electrode having such a shape as a part of the liquid hole portion covers the corner portion which the above cylindrical electrode fails to remove.

The electrical discharge machining apparatus in accordance with the thirty-first aspect performs machining of the corner portion by applying voltage between the electrode and the workpiece which are facing to each other, machining by the cylindrical electrode or tubular electrode while synthesizing the feed in the Z-axis direction, for correcting the longitudinal wear amount of the electrode, with then X-Y plane feed, then, exchanging the electrode for an electrode for finishing, and thereafter performing machining in the slanting direction while synthesizing the feed in the Z-axis direction for correcting the longitudinal wear amount of the electrode with then X-Y plane feed at the corner portion, and on the other hand, performing only the X-Y plane feed at portions other than the corner portion depending on whether a position which is now processed is the corner portion or not.

In accordance with the thirty-first aspect, voltage is applied between the electrode and the workpiece which are facing to each other, machining is performed while the feed in the Z-axis direction, for correcting the longitudinal wear amount of the electrode, is synthesized with the X-Y plane feed. In case interpole space is opened or nearly opened, the feed in the Z-axis direction is stopped and only the feed in the X-Y plane is performed.

In accordance with the thirty-third aspect, the horizontal movement at portions other than the corner portion is performed at a higher speed than a normal machining speed.

In accordance with the thirty-fourth aspect, it is judged that the electrode for finishing a corner reaches a bottom surface by rough machining from decrease of the horizontal moving speed at portions other than the corner portion, and complete time of finishing machining is judged.

In accordance with the thirty-fifth aspect, it is judged that the electrode for finishing a corner reaches a bottom surface by rough machining from detecting increase of discharge frequency or decrease of average machining voltage during machining, and complete time of finishing machining is judged.

Embodiments of an electrical discharge machining method and an apparatus thereof according to the invention will be described hereafter.

First Embodiment

Figure 2A:
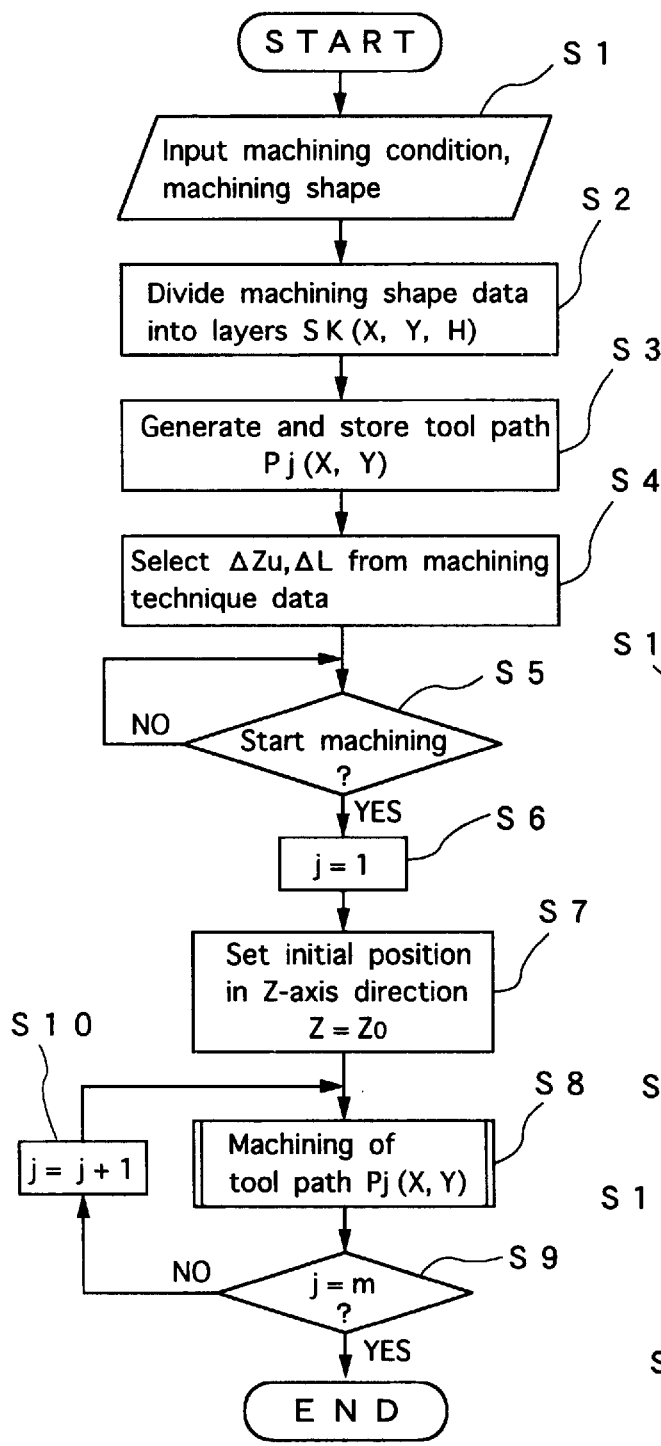
FIGS. 2a and 2b are flowcharts of an electrode wear correcting process for executing an electrode wear correcting method of a second embodiment of the invention.
Figure 2B:
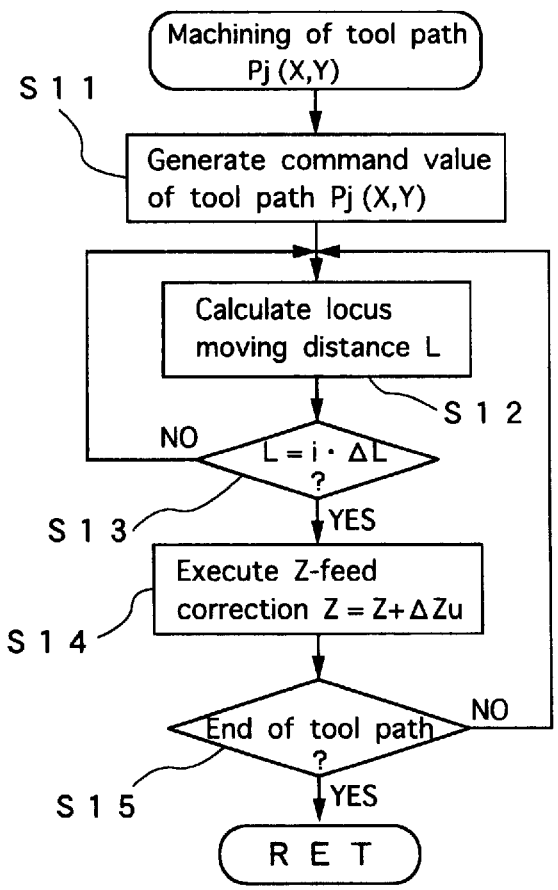
Figure 42:
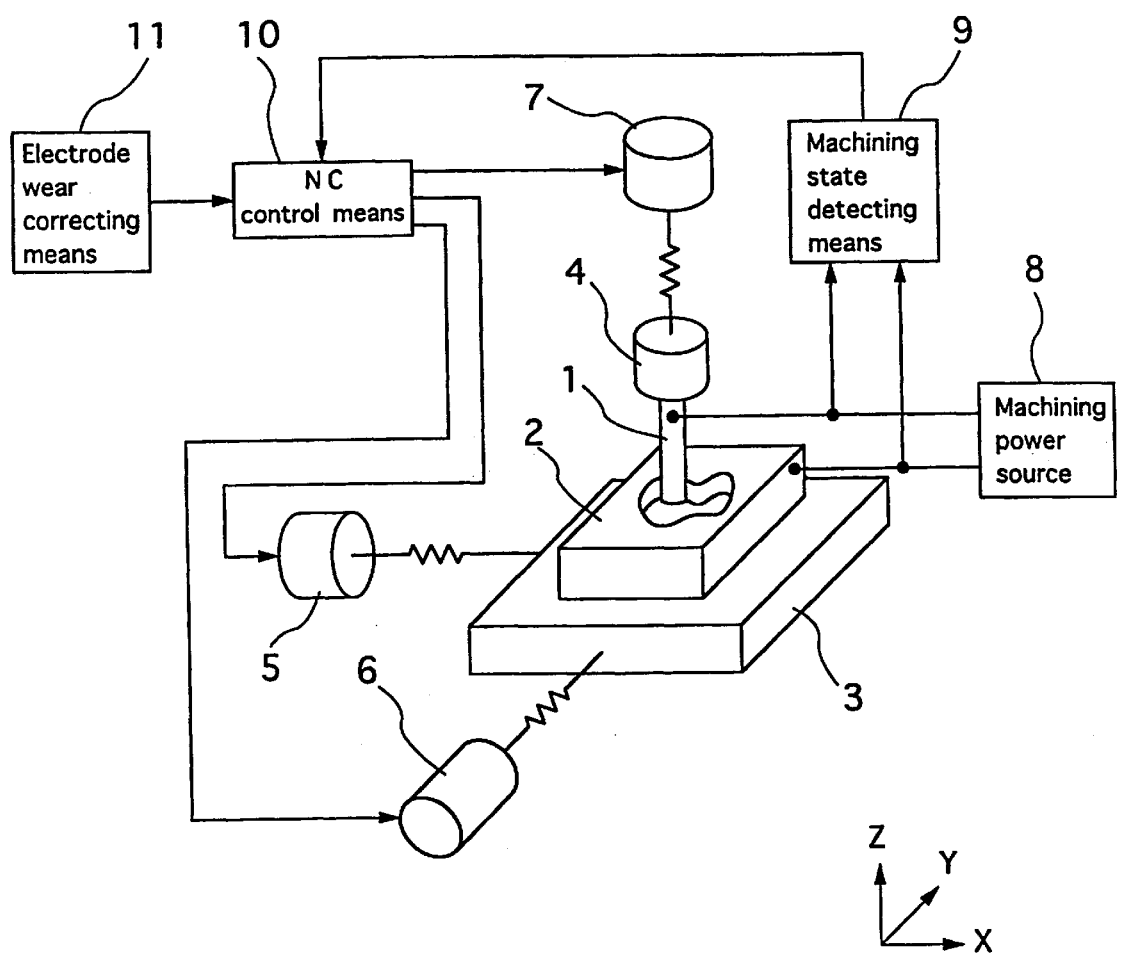
FIG. 42 is a structure view of an electrical discharge machining apparatus in the prior art.
Figure 43:
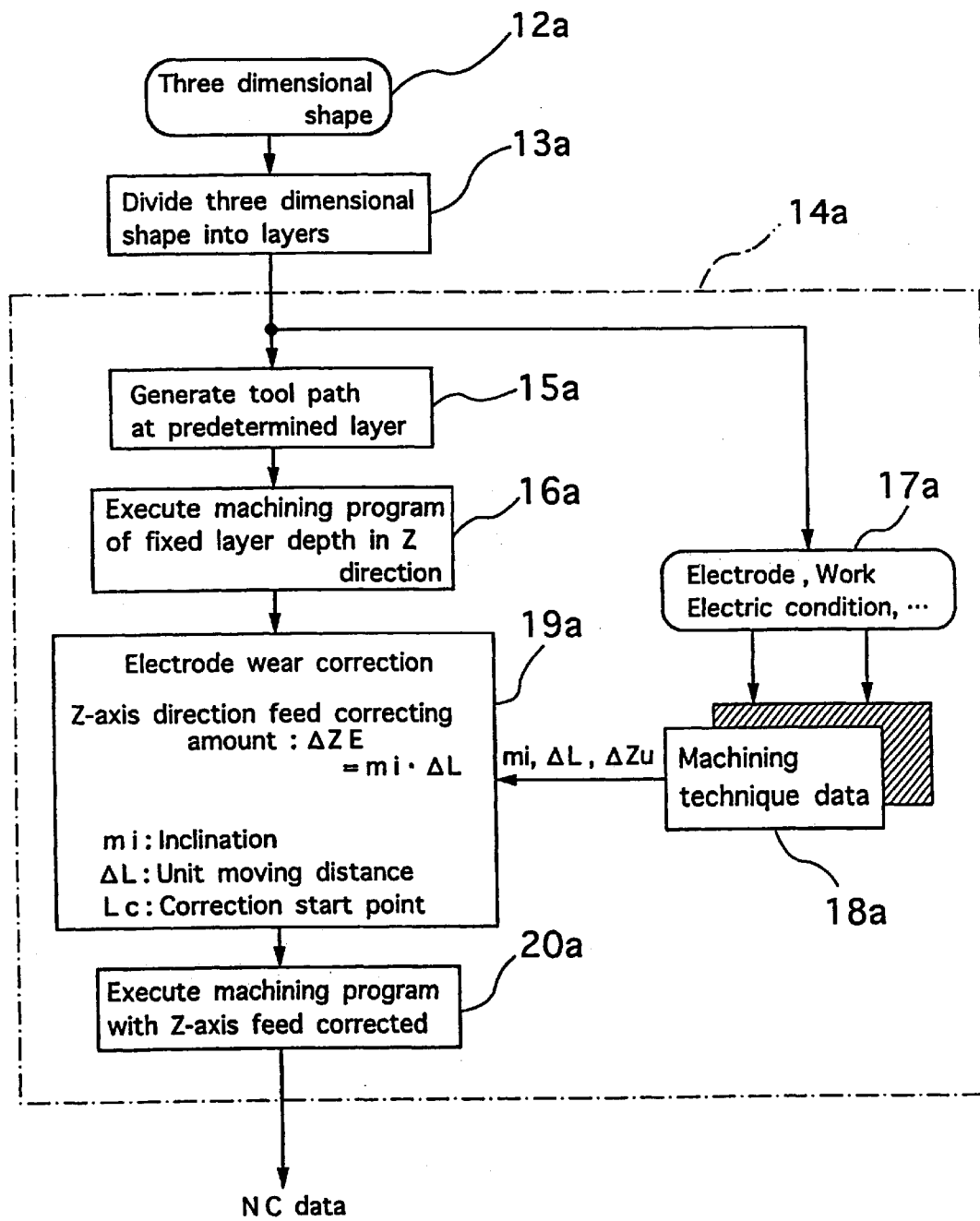
FIG. 43 is an explanatory view of an operation of an electrode wear correcting method in the prior art.
Figure 44:
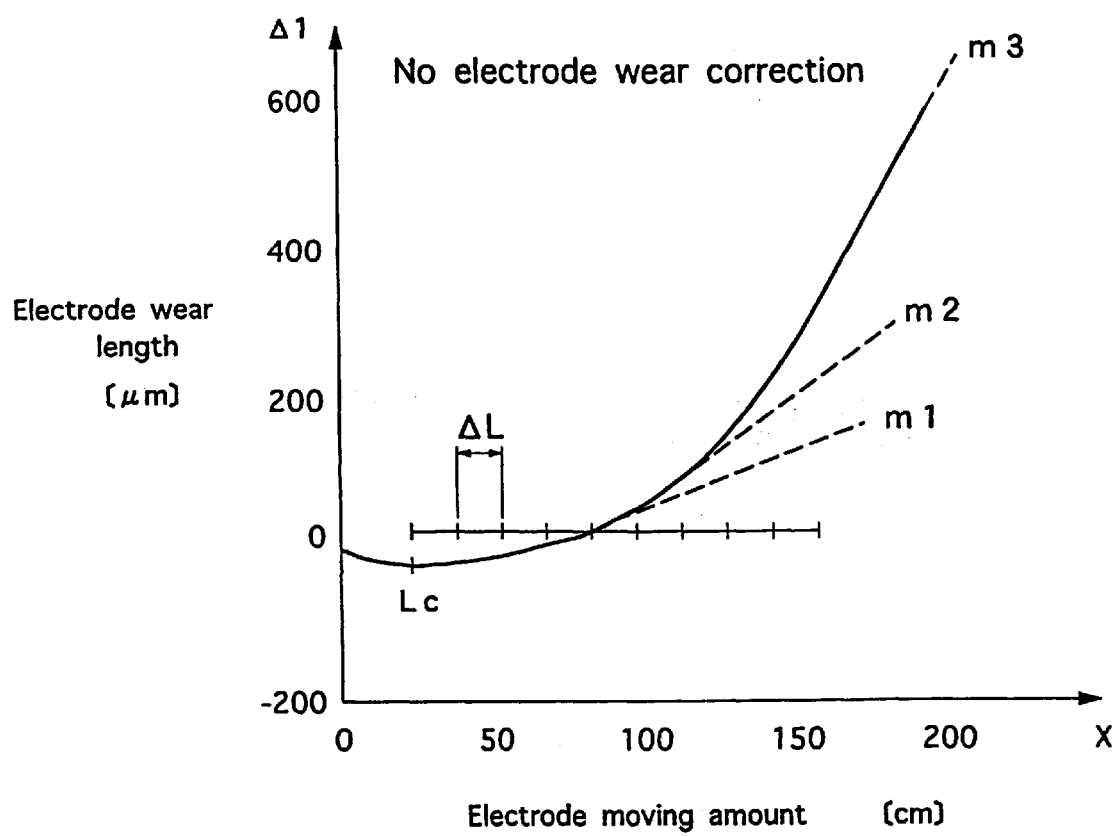
FIG. 44 is a graph showing a relation between an electrode moving amount and an electrode wear length in an X-Y plane in case an electrode wear correction is not performed.
Figure 45:
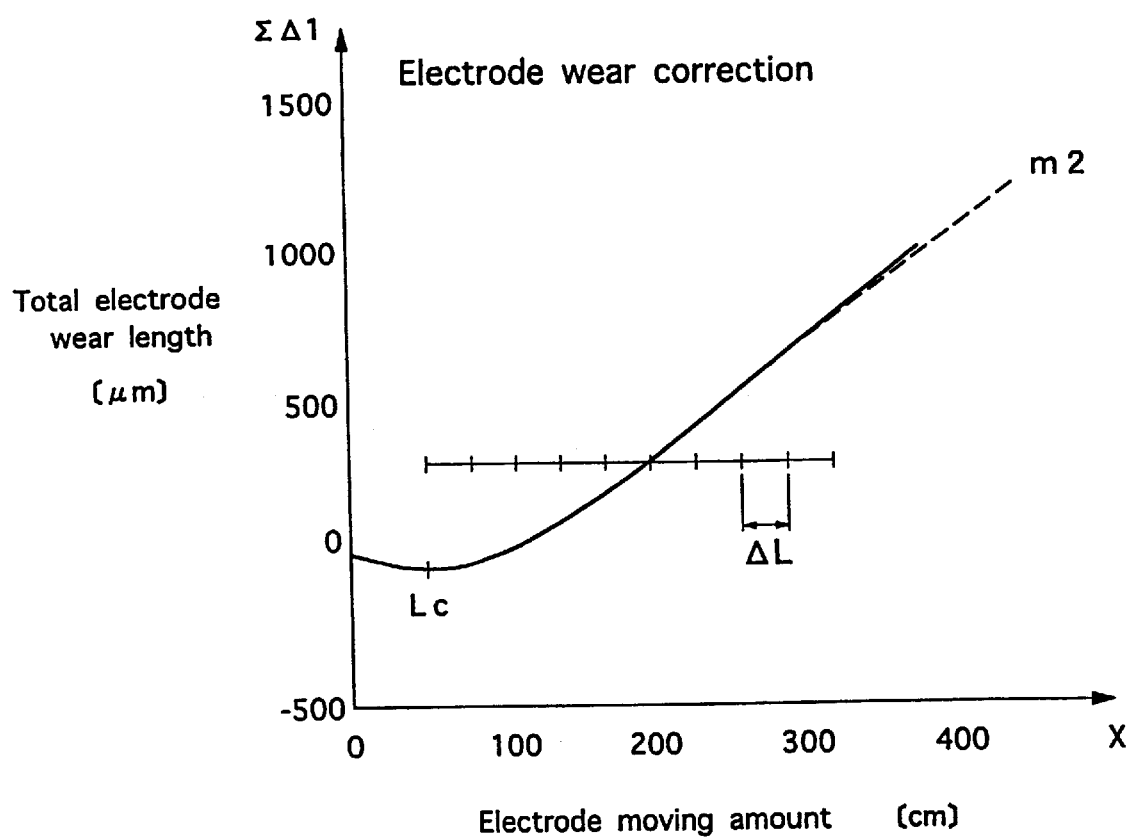
FIG. 45 is a graph showing the relation between the electrode moving amount and the electrode wear length in case machining is performed while performing the electrode wear correction practically.
Figure 46:
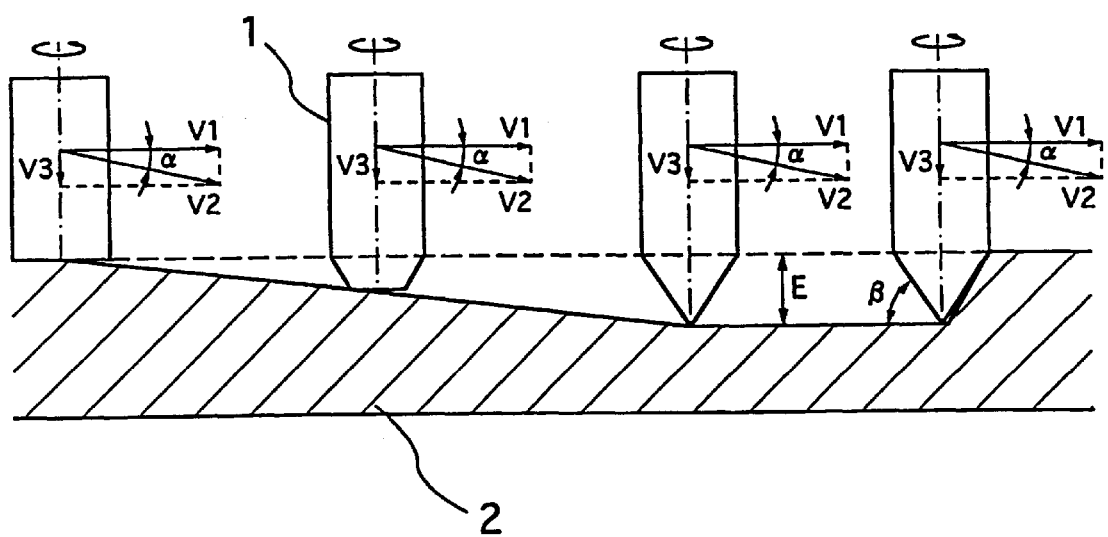
FIG. 46 is an explanatory view illustrating a principle of the electrode wear correcting method in the prior art.
Figure 47:
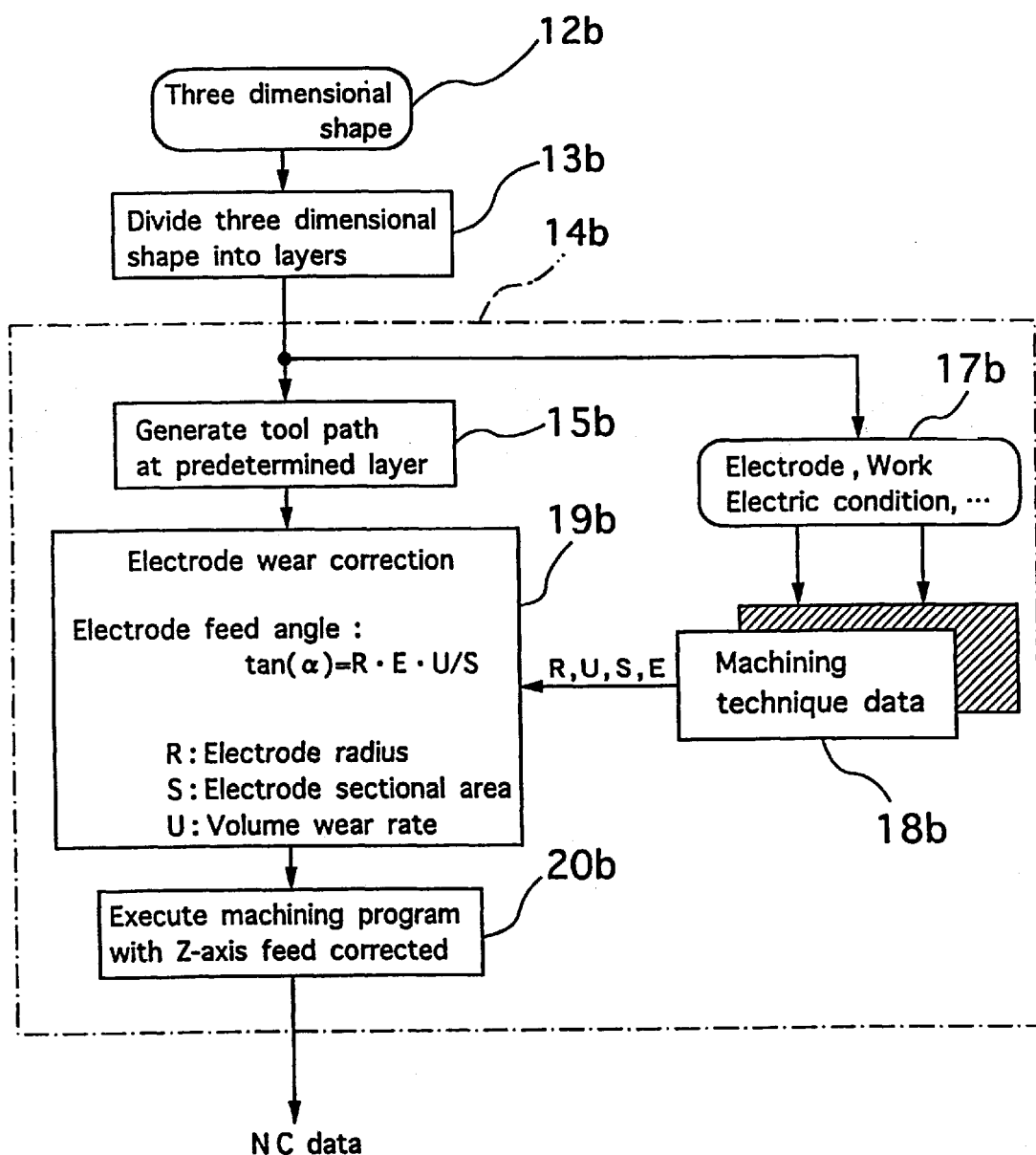
FIG. 47 is an explanatory view of an electrode wear correcting process illustrating a principle of the electrode wear correcting method in the prior art.
Figure 48A:
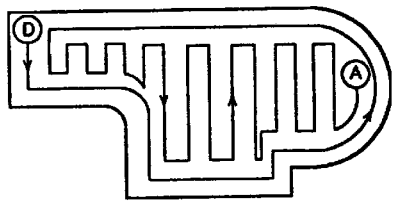
FIGS. 48a to 48f are process explanatory views showing examples of machining paths in the prior art.
Figure 48B:
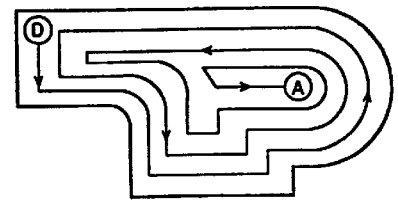
Figure 48C:
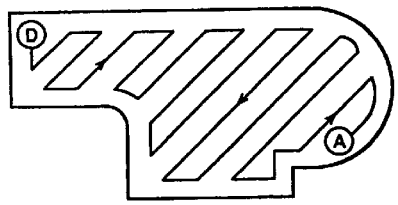
Figure 48D:
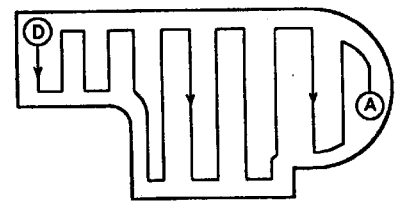
Figure 48E:
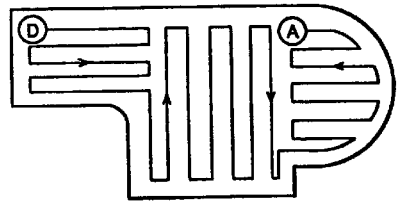
Figure 48F:
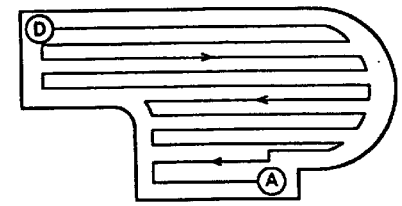
Figure 48G:
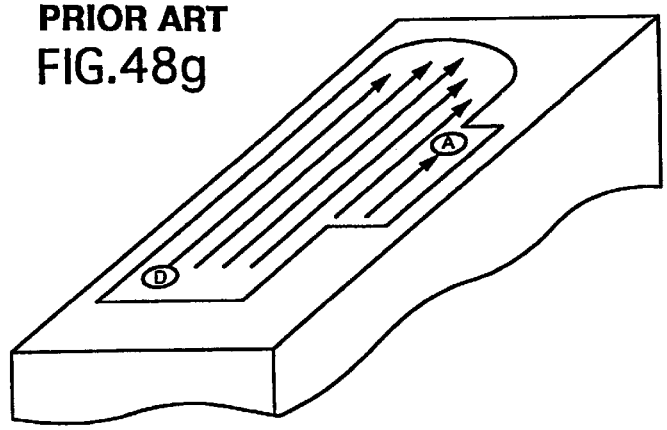
Figure 49A:
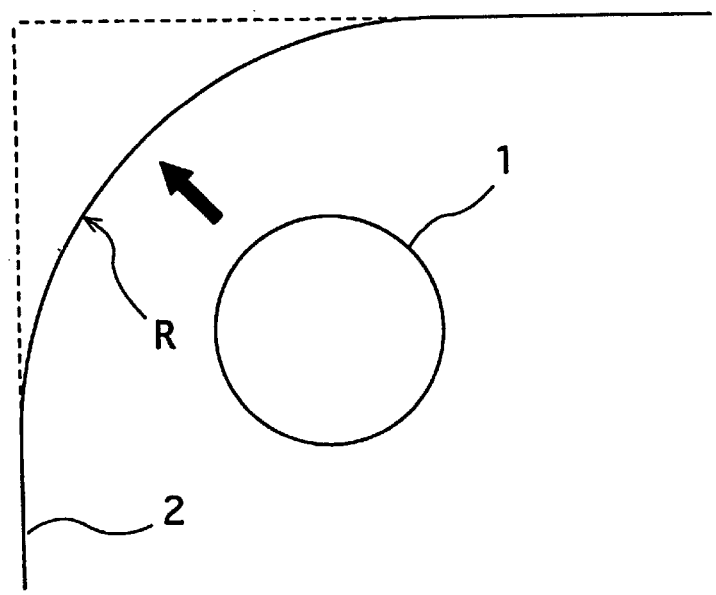
FIG. 49a is a plan view and FIG. 49b is a front view in case corner portion finishing is performed by side surface machining of the prior art.
Figure 49B:
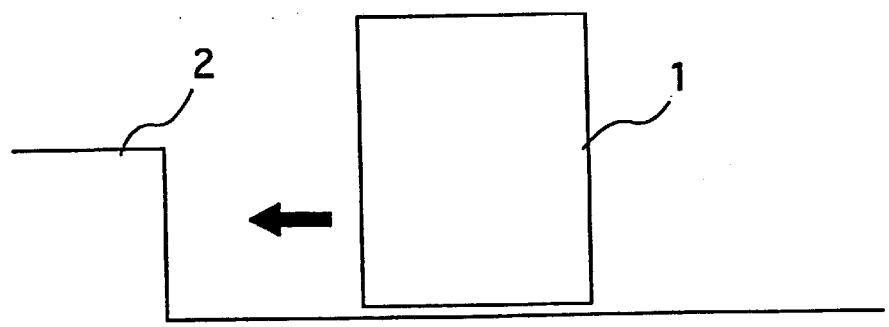

FIG. 1 is a functional explanatory view of an electrode wear correcting process, illustrating a principle of an electrode wear correcting method in a first embodiment of this invention. FIGS. 2a and 2b are flowcharts of the electrode wear correcting process for executing the electrode wear correcting method in the first embodiment of this invention. A fundamental structure for embodying the electrode wear correcting method in the first embodiment of the invention is the same as the structure drawing of FIG. 42, so that its description is omitted. Moreover, the figure shows processes from a time for giving a three-dimensional shape to be machined to a time for obtaining NC data, on which an electrode wear correction has been made, for making explanation easy to understand as in the prior art description.

In a process 12c, a three-dimensional machining shape, which is intended to be machined, is given. In a process 13c, such three-dimensional machining shape is divided into several layers. This dividing work is performed in nearly the same way as the conventional one and it has the same meaning. Then, a series of processes 14c enclosed by a dotted line is applied for each of the layers, which have been divided in the process 13c. Now, it is supposed that a thickness of one divided layer is E. In a process 15c, a path of an electrode in an X-Y plane, namely a tool path is produced. A machining in the X-Y plane is performed for the above tool path while correcting the electrode wear in a series of processes 19c and 20c.

Contrary to the conventional electrode wear correction, in the electrode wear correction shown in the process 19c, each time a locus moving distance (X-Y moving distance) L in the X-Y plane in the machining reaches a unit moving distance $\Delta L$, which is given as a standard for the correction in the Z-axis direction by the machining technique data 18c, the electrode is fed along the Z-axis by the correcting moving amount $\Delta Zu$, which is given by the machining technique data 18c. Thus, it is possible to remove a layer by a constant machining depth, which is determined by the correcting moving amount $\Delta Zu$ in the Z-axis direction and an amount equivalent to the X-Y moving distance in the X-Y plane for the correcting moving amount $\Delta Zu$ or a unit moving distance $\Delta L$, in other words, by a machining depth in which an electrode wear amount and an electrode feed amount are balanced to each other.

The correcting moving amount $\Delta Zu$ in feeding the electrode along the Z-axis at that time is:

$$L = i \cdot \Delta L \ (i=1, 2, 3, \ldots)$$

$$Z = Z + \Delta Zu$$

where:
$\Delta Zu$: correcting moving amount
$\Delta L$: unit moving distance
L: locus moving distance As mentioned above, a machining program, wherein the Z-axis feed correction is finished, is executed in the process 20c.

Here, parameters necessary for correcting the electrode wear as shown in the process 19c need to be stored beforehand in the machining technique data 18c, corresponding to at least a shape or a material of the electrode, a material of the workpiece, electrical conditions and the like, which are given in the process 17c. While FIG. 1 shows a case in which the correcting moving amount $\Delta Zu$ in the Z-axis direction is given by the machining technique data 18c, it may be set in the same value as the least command increment of a Z-axis driving means 7 or an NC control means 10. In this case, the correcting moving amount $\Delta Zu$ in the Z-axis direction need not be stored as the machining technique data 18c. Moreover, it is unnecessary to match a machining depth decided by the correcting moving amount $\Delta Zu$ in the Z-axis direction and the unit moving distance $\Delta L$, namely, a machining depth in one machining path scanning to a thickness of a layer to be machined. It may serve to store, as the machining technique data 18c, an amount equivalent to the X-Y moving distance in the X-Y plane for the correcting moving amount $\Delta Zu$ in the Z-axis direction so that the depth becomes not more than the above layer thickness. At any rate, in case of embodying the invention, it is enough to store at least the correcting moving amount $\Delta Zu$ in the Z-axis direction and the amount equivalent to the locus moving distance L, which becomes the X-Y moving distance in the X-Y plane corresponding to the correcting moving amount $\Delta Zu$ in the Z-axis direction. So, it is possible to correct the electrode wear by the machining technique data 18c which is less than that of the prior art.

Next, a case in which the electrode wear correction is processed by a program of the NC control means 10 is described, by use of the flowchart of the electrode wear correcting process in the embodiment of FIGS. 2a and 2b.

Machining conditions, such as an electric machining condition and a machining shape, are inputted in step S1. Namely, at least a shape and a material of the electrode, a material of the workpiece and electrical conditions and the like are inputted, and machining technique data corresponding to them are called beforehand. In step S2, a three-dimensional work shape is divided into some layers according to the shape intended to be machined. Namely, machining shape data are divided so as to define layers. Here, it is supposed that each layer is SK(X, Y, H). H means depth and k means an integral number like 1, 2, 3 ... m. In step S3, a path of the electrode in the X-Y plane, namely, a tool path Pj (X, Y) is produced for each of the divided layers, and it is stored. j means an integral number like 1, 2, 3 ... m. In step S4, selected and determined are a specific unit moving distance $\Delta L$, which is given by the machining technique data, and a correcting moving amount $\Delta Zu$ in the Z-axis direction, which is given by the machining technique data, for feeding the electrode along the Z-axis by the correcting moving amount $\Delta Zu$ each time it reaches the unit moving distance $\Delta L$. In step S5, machining is begun. In step S6, 1 is set in a memory (j=1) which records a number (j=1, 2, 3 ... m) of finished tool path Pj. In step S7, an initial position in the Z-axis direction, namely, $Z=Z_0$ is set. $Z_0$ means the initial position. In step S8, a routine for performing machining work along the tool path Pj(j=1, 2, 3 ... m) is called. In step S9, it is decided whether or not the machining is finished up to the tool path Pm, which is the last one of the tool path Pj, by judging if the memory value j is equal to m or not. If the memory value j is not m, the value J is incremented in the memory in step 10, and the routine from step S8 to step S9 is executed repeatedly.

If a machining routine of the tool path Pj(j=1, 2, 3 . . . m) is called in step S8, a command value in the X-Y plane of the tool path Pj is outputted in step S11. Next, the X-Y moving distance L in the X-Y plane of the electrode is calculated as L=i·ΔL in step S12, and it is decided if the electrode has moved by the X-Y moving distance L or not in step S13. If the electrode has moved by the X-Y moving distance L in step S12, the Z-axiS feed amount Z=Z+ΔZu is computed for performing a Z-axis feed correction of the electrode in step S14. It is decided in step s15 if the electrode reaches at an end of the tool path Pj. A routine from S12 to step S15 continues till the end of the tool path Pj.

As mentioned above, the present embodiment of the electric discharge machining apparatus applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining apparatus comprises a storage means composed of step S4 for storing the correcting moving amount ΔZu for performing the electrode wear correction in the Z-axis direction, corresponding to the fixed unit moving distance ΔL in the X-Y plane, and a relative position control means composed of step S14 for feeding the electrode by the fixed correcting moving amount ΔZu in the above Z-axis direction each time it reaches the moving distance L in the X-Y plane on a moving locus in the machining or the above unit moving distance ΔL. This is equivalent to the embodiment corresponding to the claim.

Thus, even if an electrode wear amount is large, the electrode is fed by the correcting moving amount ΔZu along the Z-axis each time the locus moving distance L in the X-Y plane in machining becomes the moving distance ΔL, which is a standard for the correcting work in the Z-axis direction. Therefore, it is possible to remove a layer from the workpiece by a constant machining depth, which is determined by the correcting moving amount ΔZu in the Z-axis direction and an amount equivalent to the X-Y moving distance in the X-Y plane for the correcting moving amount ΔZu or the unit moving distance ΔL, in other words, a machining depth in which the electrode wear amount and the electrode feed amount are balanced to each other. Consequently, it is possible to decrease machining technique data which are necessary and manually inputted for correcting an electrode wear, and to realize an electrode wear correction in a easier way. In addition, even if a electrode wear amount is large, machining accuracy can be maintained well. Therefore, it is possible to achieve high machining speed and machining accuracy not achieved conventionally, while being independent of the electrode wear amount in the three-dimensional machining work by use of an electrode of simple shape.

Moreover, it does not need to include a Z-axis correcting component as a Z-axis feed command of the NC program like the prior art, so that the NC program becomes very easy and it is possible to largely reduce the capacity of the program. In addition, it is easy to change a correcting amount during machining.

The present embodiment of the electrical discharge machining method applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining method stores in step S4 the correcting moving amount ΔZu for performing the electrode wear correction in the Z-axis direction, corresponding to the fixed unit moving distance ΔL in the X-Y plane, and feeds the electrode by the fixed correcting moving amount ΔZu in the above Z-axis direction each time it reaches the moving distance L in the X-Y plane on a moving locus in the machining or the above unit moving distance ΔL, as decided in step S13 and S14. This is equivalent to the electrical discharge machining method of the embodiment corresponding to the claim and it has the same effects as the above claim.

By the way, the present embodiment stores the correcting moving amount ΔZu for the correction in the Z-axis direction corresponding to the fixed unit moving distance ΔL in the X-Y plane in step S4. This invention can be realized by setting a relation between the fixed unit moving distance ΔL in the X-Y plane and the correcting moving amount ΔZu for the correction in the Z-axis direction.

That is, such a modified electrical discharge machining apparatus applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining apparatus comprises a storage means composed of, e.g., step S4 for storing the relation between the fixed unit moving distance ΔL in the X-Y plane and the correcting moving amount ΔZu for performing the electrode wear correction in the Z-axis direction corresponding to the fixed unit moving distance ΔL, and a relative position control means composed of, e.g., step S14 for feeding the electrode by the fixed correcting moving amount ΔZu in the above Z-axis direction each time it reaches the moving distance L in the X-Y plane on a moving locus in the machining or the above unit moving distance ΔL. This is equivalent to the embodiment corresponding to the claim and it has the above effects.

In addition, such a modified electrical discharge machining method applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining method stores, for example in step S4, the relation between the fixed unit moving distance ΔL in the X-Y plane and the correcting moving amount ΔZu for performing the electrode wear correction in the Z-axis direction corresponding to the fixed unit moving distance ΔL, and feeds the electrode by the fixed correcting moving amount ΔZu in the above Z-axis direction each time it reaches the moving distance L in the X-Y plane on a moving locus in the machining or the above unit moving distance ΔL, as decided in step S13 and S14 for example. This is equivalent to the electrical discharge machining method of the embodiment corresponding to the claim and it has the same effects as the above claim.

In each of the embodiments, the relation between the fixed unit moving distance ΔL in the X-Y plane and the correcting moving amount ΔZu for performing the electrode wear correction in the Z-axis direction is set beforehand. Such a relation can be expressed as a fixed angle alpha (α) as follows:

$$\alpha = \tan^{-1} \Delta Zu/\Delta L$$

Since there is a strong possibility that one of the values ΔZu and ΔL in the value ΔZu/ΔL, for example, the unit moving distance ΔZu depends on a resolution accuracy of the apparatus, an artisan who operates the apparatus can easily find the degree of correction for the feed of the fixed moving amount in the above Z-axis direction by inputting the fixed unit moving distance ΔL or the angle alpha (α), Namely, such a modified embodiment of the electrical discharge machining apparatus can be constituted as an embodiment which applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining apparatus comprises a storage means composed of, e.g., step 34 for storing the relation between the fixed unit moving distance ΔL in the X-Y plane and the correcting moving amount ΔZu for performing the electrode wear correction in the Z-axis direction corresponding to the unit moving distance ΔL as a relation between the unit moving distance ΔL and the angle alpha (α), and a relative position control means composed of, e.g., step S14 for feeding the electrode by the fixed correcting moving amount ΔZu in the above Z-axis direction each time it reaches the moving distance L in the X-Y plane on a moving locus in the machining or the above unit moving distance ΔL. This is equivalent to the embodiment corresponding to the claim and it has the above effects.

In addition, such a modified electrical discharge machining method can be constituted as an embodiment which applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining method stores the relation between the fixed unit moving distance ΔL in the X-Y plane and the correcting moving amount ΔZu for performing the electrode wear correction in the Z-axis direction corresponding to the above unit moving distance ΔL as the relation between the unit moving distance ΔL and the angle alpha (α), for example in step S4, and feeds the electrode by the fixed correcting moving amount ΔZu in the above Z-axis direction each time it reaches the moving distance L in the X-Y plane on a moving locus in the machining or the above unit moving distance ΔL, as decided in step S13 and S14 for example. This is equivalent to the electrical discharge machining method of the embodiment corresponding to the claim and it has the same effects as the above claim.

While the description is made with respect to the electrode wear correction in the first embodiment of the invention, each process shown in FIG. 1 may be embodied in the NC control means 10 as programs. Otherwise, it is possible to constitute machining means for each.

Second Embodiment

Figure 3:
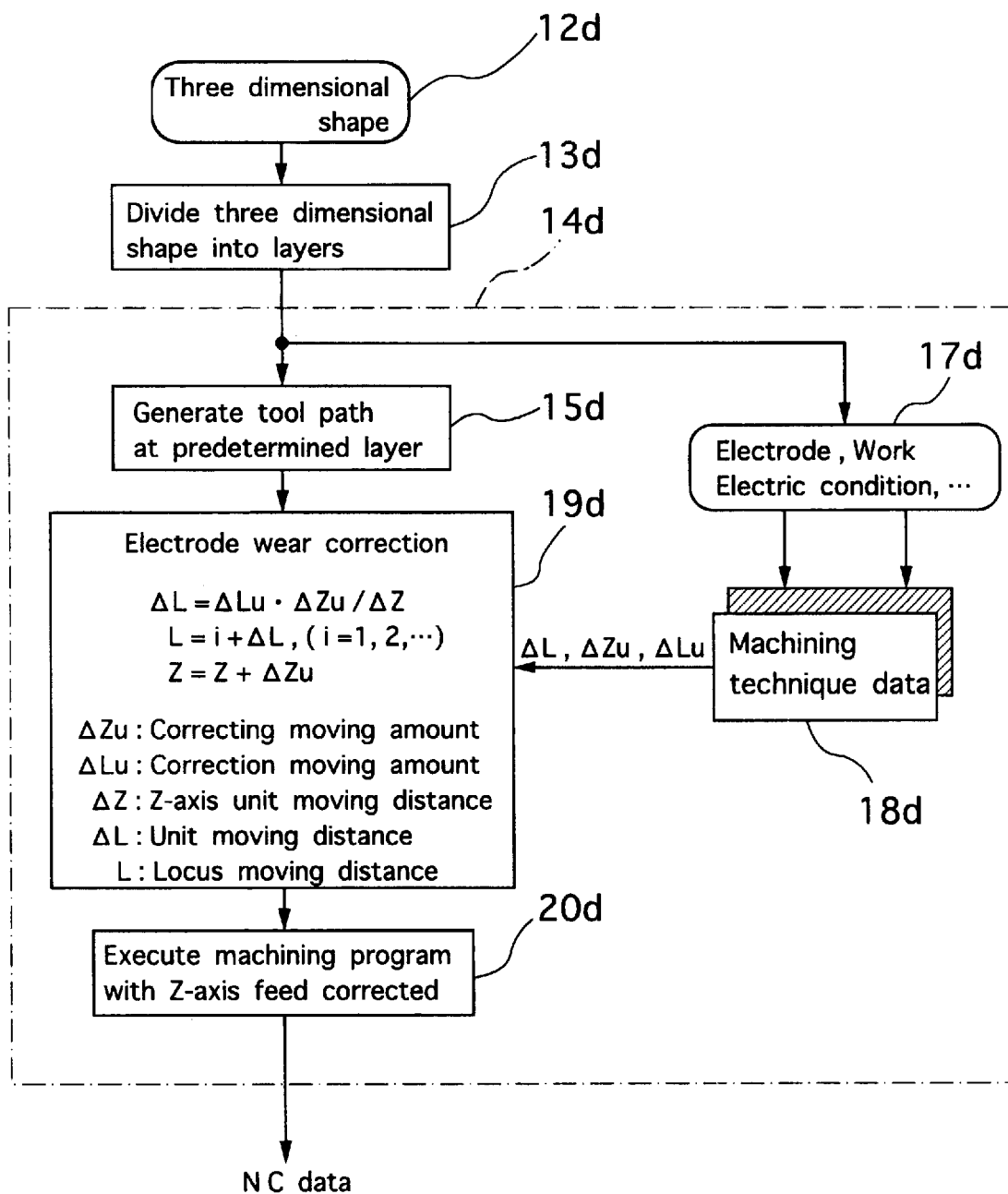
FIG. 3 is an explanatory view of the electrode wear correcting process illustrating a principle of the electrode wear correcting method of the second embodiment of the invention.
Figures 4A, 4B:
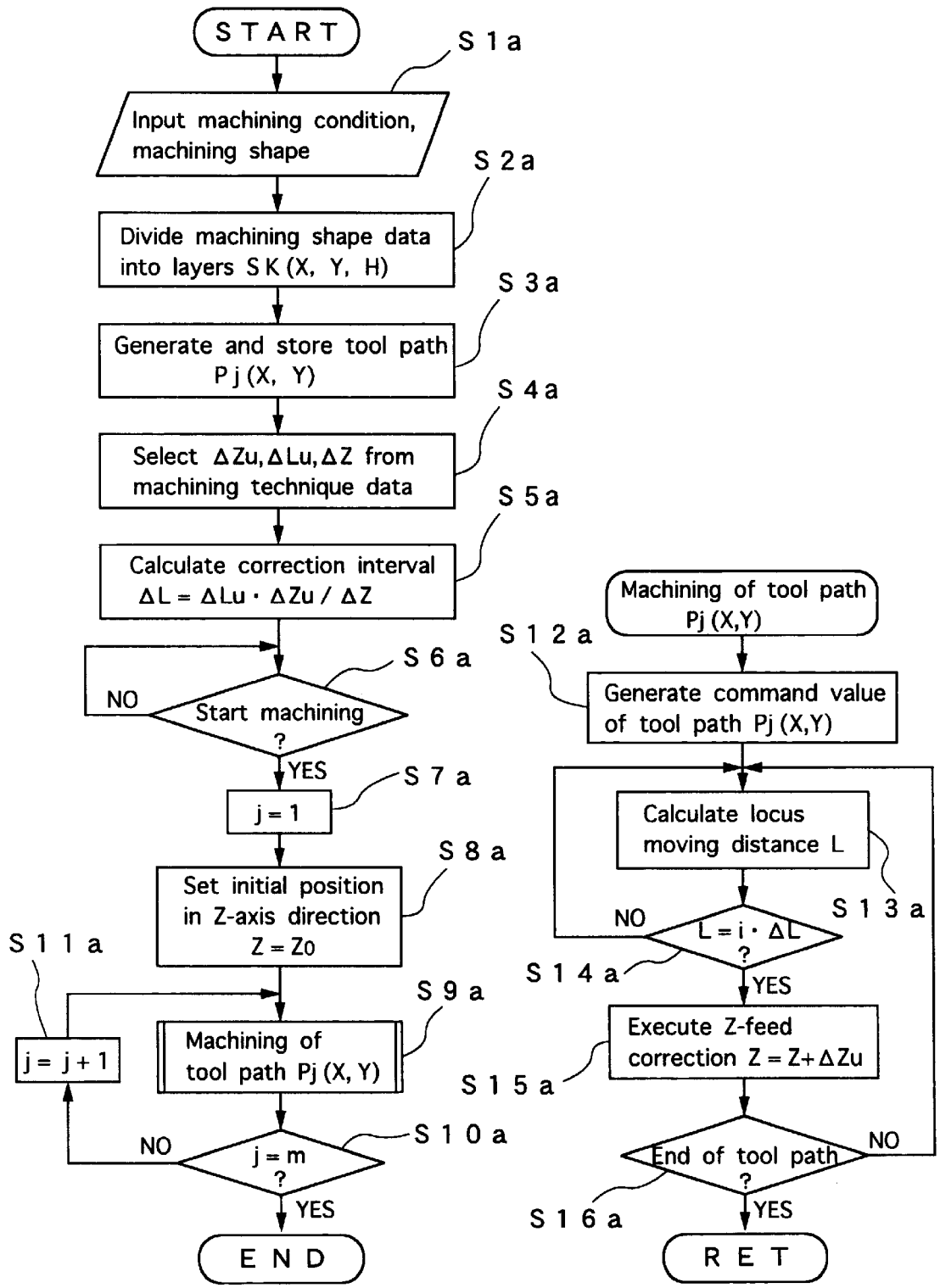
FIGS. 4a and 4b are flowcharts of the electrode wear correcting process for executing the electrode wear correcting method of the second embodiment of the invention.

FIG. 3 is an explanatory view of an electrode wear correcting process, illustrating a principle of an electrode wear correcting method in a second embodiment of this invention. FIG. 4 is a flowchart of the electrode wear correcting process for executing the electrode wear correcting method in the second embodiment of this invention. A fundamental structure for embodying the electrode wear correcting method in this embodiment is the same as the structure drawing of FIG. 42, so that its description is omitted.

This embodiment differs from the first embodiment in an electrode wear correction shown in a process 19d, a process shown in 1ad and its machining technique data 18d, and the processes 12d, 13d, 14d, 15d, 16d, 17d and 20d are substantially the same as those of the first embodiment, so that their description is omitted. The electrode wear correction process 19d and the machining technique data 18d are described in detail in this embodiment.

In the process 19d, each time the electrode moves a unit moving distance ΔL in an X-Y direction, which is given by the machining technique data 18d, the unit moving distance ΔL is corrected according to a correcting moving amount ΔZu and an amount equivalent to an X-Y moving distance in an X-Y plane corresponding to a correcting moving amount ΔZ in a Z-axis direction, namely, a unit moving distance ΔLu. Such a corrected unit moving distance becomes a unit moving distance ΔL in the X-Y direction. The electrode is fed by the correcting moving amount ΔZu in the Z-axis direction each time the locus moving distance L in the X-Y plane on a moving locus in machining reaches the above calculated amount or the unit moving distance ΔL which has been corrected.

Thus, it is possible to remove, from the work, a layer of a constant machining depth, which is decided by the unit moving distance ΔZ in the Z-axis direction and the unit moving distance ΔL in the X-Y direction, in other words, a layer of a machining depth in which an electrode wear amount and an electrode feed amount are balanced to each other. Here, parameters necessary for an electrode wear correction shown in the process 19d need to be stored in the machining technique data led beforehand according to a shape and a material of the electrode, a material of the workpiece and electrical conditions, which are given in the process 17d.

While FIG. 3 shows a case in which the unit moving amount ΔZu in the Z-axis direction and the correcting moving amount ΔLu in the X-Y direction are given from the machining technique data 18d, they may be set in the same value as the least command increment of an X-axis driving means 5, a Y-axis driving means 6, a Z-axis driving means 7 or an NC control means 10. In this case, as a matter of course, it is not necessary to have the correcting moving amount ΔZu in the Z-axis direction and the correcting moving amount ΔLu in the X-Y direction as the machining technique data 18d. Moreover, it is unnecessary to match a machining depth decided by the correcting moving amount ΔZu in the Z-axis direction and the unit moving distance ΔL, namely, a machining depth obtained by one machining path operation to a thickness of a layer intended to be machined. It may serve to store, as the machining technique data 18d, a feed amount in the Z-axis direction corresponding to a correcting moving amount ΔLu in the X-Y direction so that the depth becomes less than the thickness of the above layer. At any rate, in case of embodying this invention, it is enough to store at least the unit moving distance ΔZ in the feed in the Z-axis direction, the correcting moving amount ΔZu in the Z-axis direction and the feed amount in the Z-axis direction corresponding to the unit moving distance ΔL in the X-Y direction. Therefore, it is possible to correct the electrode wear accurately by the machining technique data which is less than that of the prior art.

Next, a case in which the electrode wear correction is processed by a program of an NC control means 10 is described, by use of the flowchart of the electrode wear correcting process in the embodiment of FIG. 4.

Machining conditions such as an electrical machining condition and a machining shape are inputted in step Sla. That is, at least a shape and a material of the electrode, a material of the workpiece and electrical conditions are inputted, and machining technique data corresponding to them are called beforehand. A three-dimensional work shape is divided into some layers in step S2$a$, according to the shape intended to be processed. Namely, machining shape data are divided so as to define layers. Each of the layers is supposed as SK(X, Y, H). Next, an electrode path in the X-Y plane, namely, a tool path Pj(X, Y) is generated for each of the layers which are divided in step S3$a$, and it is stored. Determined in step S4$a$ are a unit moving distance $\Delta Z$ in a feed in the Z-axis direction, a correcting moving amount $\Delta Zu$ in the Z-axis direction and a correcting moving amount $\Delta Lu$ in the X-Y direction, which are given from the machining technique data. In step S5$a$, an amount equivalent to the X-Y moving distance L in the X-Y plane corresponding to the correcting moving amount $\Delta Zu$ in the above Z-axis direction, namely, a corrected unit moving distance $\Delta L$ is calculated on the basis of the unit moving distance $\Delta Z$ in the Z-axis direction, the correcting moving amount $\Delta Zu$ in the Z-axis direction and the correcting moving amount $\Delta Lu$ in the X-Y direction which have been selected from the machining technique data. From $\Delta L/\Delta Lu = \Delta Zu/\Delta Z$, the unit moving distance $\Delta L$ is obtained as follows:

$$\Delta L = \Delta Lu \cdot \Delta Zu / \Delta Z$$

An electrical discharge machining operation is started in step S6$a$. 1 is set in a memory (j=1) in step S7, which records a number of the tool path which has been finished. An initial position in the Z-axis direction, namely, $Z=Z_0$ is set in step S8$a$. $Z_0$ means the initial position. A routine for performing machining along the tool path Pj is called in step S9$a$. In step 10$a$, it is decided whether or not the machining is finished up to the tool path Pm, which is the last one of the tool path Pj, by judging if the value j of the memory is equal to m or not. If the value j of memory is not m, the value j of the memory is incremented in step 11$a$, and the routine from step S9$a$ to step S11$a$ is executed repeatedly.

If the machining routine for the tool path Pj is called in step S9$a$, a command value in the X-Y plane of the tool path Pj is outputted in step S12$a$. Next, the X-Y moving distance L in the X-Y plane of the electrode is calculated as $L=i \cdot \Delta L$ in step S13$a$, and it is decided in step S14$a$ if the electrode has moved by the X-Y moving distance L or not. If the electrode has moved the X-Y moving distance L obtained in step S13$a$, the Z-axis feed amount $Z=Z+\Delta Zu$ is computed for performing a Z-axis feed correction of the electrode in step S15$a$. An end of the tool path Pj is decided in step S16$a$. A routine from step S13$a$ to step S16$a$ continues until the end of the tool path Pj.

As mentioned above, the present embodiment of the electrical discharge machining apparatus applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining apparatus comprises a storage means composed of step S4$a$ for storing a relation between the fixed unit moving distance $\Delta L$ in the X-Y plane selected from the machining technique data and the correcting moving amount $\Delta Zu$ for performing the correction in the Z-axis direction corresponding to the above unit moving distance $\Delta L$ as well as a relation between the fixed unit moving distance $\Delta Z$ in the Z-axis direction and the correcting moving amount $\Delta Lu$ for performing the fixed correction in the above X-Y plane, and a relative position control means composed of step S14$a$ and step S15$a$ for calculating the unit moving distance $\Delta L$ in the above X-Y plane, which is corrected by the correcting moving amount $\Delta Lu$ in the X-Y plane, on the basis of the unit moving distance $\Delta Z$ in the Z-axis direction in step S5$a$ and for feeding the electrode by the fixed moving amount $\Delta Zu$ in the above Z-axis direction each time it reaches the unit moving distance $\Delta L$ in the above X-Y plane, which has corrected an influence of the correcting moving amount $\Delta Lu$ in the X-Y plane in a moving locus L during machining. This is equivalent to the embodiment corresponding to the claim.

Thus, even if the electrode wear amount is large, the electrode is fed by the correcting moving amount $\Delta Zu$ along the Z-axis each time the locus moving distance L in the X-Y plane in machining becomes the unit moving distance $\Delta L$, which has been corrected on the basis of the unit moving distance $\Delta Z$ in the Z-axis direction, the correcting moving amount $\Delta Zu$ in the Z-axis direction and the correcting moving amount $\Delta Lu$ in the X-Y plane corresponding to the unit moving distance $\Delta Z$ in the Z-axis direction. Therefore, it is possible to remove a layer from the workpiece by a constant machining depth, which is determined by the correcting moving amount $\Delta Zu$ in the Z-axis direction and an amount equivalent to the X-Y moving distance in the X-Y plane for the correcting moving amount $\Delta Zu$ or the unit moving distance $\Delta L$, in other words, a machining depth in which the electrode wear amount and the electrode Seed amount are balanced to each other. Consequently, it is possible to decrease machining technique data which are necessary and manually inputted for correcting an electrode wear, and to realize an electrode wear correction in a easier way. In addition, even if a electrode wear amount is large, machining accuracy can be maintained good.

The present embodiment of the electrical discharge machining method applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining method stores a relation between the correcting moving amount $\Delta Zu$ for performing correction in the Z-axis direction and the above unit moving distance $\Delta L$ selected out of the machining technique data and a relation between the correcting moving amount $\Delta Lu$ for performing correction of the fixed unit moving distance $\Delta L$ in the X-Y plane and to the fixed unit moving distance $\Delta Z$ in the Z-axis direction, calculates a correcting amount of the unit moving distance $\Delta L$ in the X-Y plane corresponding to the above correcting moving amount $\Delta Zu$ in the Z-axis direction, in step S4$a$ and step S5$a$, and feed the electrode by the above correcting moving amount $\Delta Zu$ of the Z-axis direction in the Z-axis direction each time a moving distance in the X-Y plane on the moving locus in machining reaches the above calculated amount, as judged in step S13 and step S14. Therefore, it has functions and effects equivalent to the embodiment corresponding to the above claim.

By the way, in the present embodiment, the correcting amount of the unit moving distance ΔL in the X-Y plane is calculated based upon the relation between the correcting moving amount ΔZu for performing correction in the Z-axis direction and the above unit moving distance ΔL and the relation between the correcting moving amount ΔLu for performing correction of the fixed unit moving distance ΔL in the X-Y plane and the fixed unit moving distance ΔZ in the Z-axis direction. However, in practising this invention, it is also possible to perform the feeding operation of the above unit moving amount ΔZu in the Z-axis direction each time the moving locus in the machining reaches the unit moving distance ΔL in the X-Y plane and each time the above moving locus in the machining reaches the unit moving distance ΔZ in the Z-axis direction, on the basis of the unit moving distance ΔL in the X-Y plane and the unit moving distance ΔZ in the Z-axis direction.

That is, such a modified embodiment of an electrical discharge machining apparatus applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. This embodiment comprises a storage means composed of, e.g., step S4a of a routine in FIG. 4, for storing a relation between the fixed unit moving distance ΔL in the X-Y plane selected out of the machining technique data and the correcting moving amount ΔZu for performing correction in the Z-axis direction corresponding to the above unit moving distance ΔL, and a relation between the fixed unit moving distance ΔZ in the Z-axis direction and the correcting moving amount ΔZu for performing correction in the Z-axis direction corresponding to the above unit moving distance ΔZ; and a relative position control means composed of, e.g., step S14a and step S15a of routines in FIG. 4, for performing the feeding operation of the above correcting moving amount ΔZu in the Z-axis direction on the basis of the unit moving distance ΔL in the X-Y plane and the unit moving distance ΔZ in the Z-axis direction each time the moving locus in the machining reaches the unit moving distance ΔL in the X-Y plane and each time the above moving locus in the machining reaches the unit moving distance ΔZ in the Z-axis direction. This is equivalent to the embodiment corresponding to the claim.

Moreover, seen from an aspect of method, it can be an electrical discharge machining method applies voltage between the electrode 1 of a simple shape, such as a bar or cylinder, and a workpiece 2. It performs three-dimensional control by NC control for the electrode, while synthesizing a feed in the Z-axis direction, for correcting a longitudinal wear amount of the electrode 1, with the X-Y plane feed made in the X-Y axis direction, thereby machining a desired three-dimensional shape. The electrical discharge machining method stores the relation between the fixed unit moving distance ΔL in the X-Y plane selected out of the machining technique data and the correcting moving amount ΔZu for performing correction in the Z-axis direction corresponding to the above unit moving distance ΔL, and the relation between the fixed unit moving distance ΔZ in the Z-axis direction and the correcting moving amount ΔZu for performing correction in the Z-axis direction corresponding to the above unit moving distance ΔZ, in step S4a of routines in FIG. 4, and performs a feed of the above correcting moving amount ΔZu in the Z-axis direction each time the moving locus in the machining reaches the unit moving distance ΔL in the X-Y plane and each time the above moving locus in the machining reaches the unit moving distance ΔZ in the Z-axis direction, on the basis of the unit moving distance ΔL in the X-Y plane and the unit moving distance ΔZ in the Z-axis direction, in step S14a and step S15a of the routine in FIG. 4. This is equivalent to the embodiment corresponding to the claim.

In this type of modified embodiment, the electrode is fed by the above correcting moving amount ΔZu in the Z-axis direction on the basis of the unit moving distance ΔL in the X-Y plane and the unit moving distance ΔZ in the Z-axis direction each time the moving locus in the machining reaches the unit moving distance ΔL in the X-Y plane and each time the above moving locus in the machining reaches the unit moving distance ΔZ in the Z-axis direction. Therefore, when the electrode moves on a moving locus of one of the unit moving distance ΔL in the X-Y plane and the unit moving distance ΔZ in the Z-axis direction, especially in case of performing a boring machining only in the Z-axis direction at an initial stage, an electrode wear is compensated.

Third Embodiment

Figure 5:
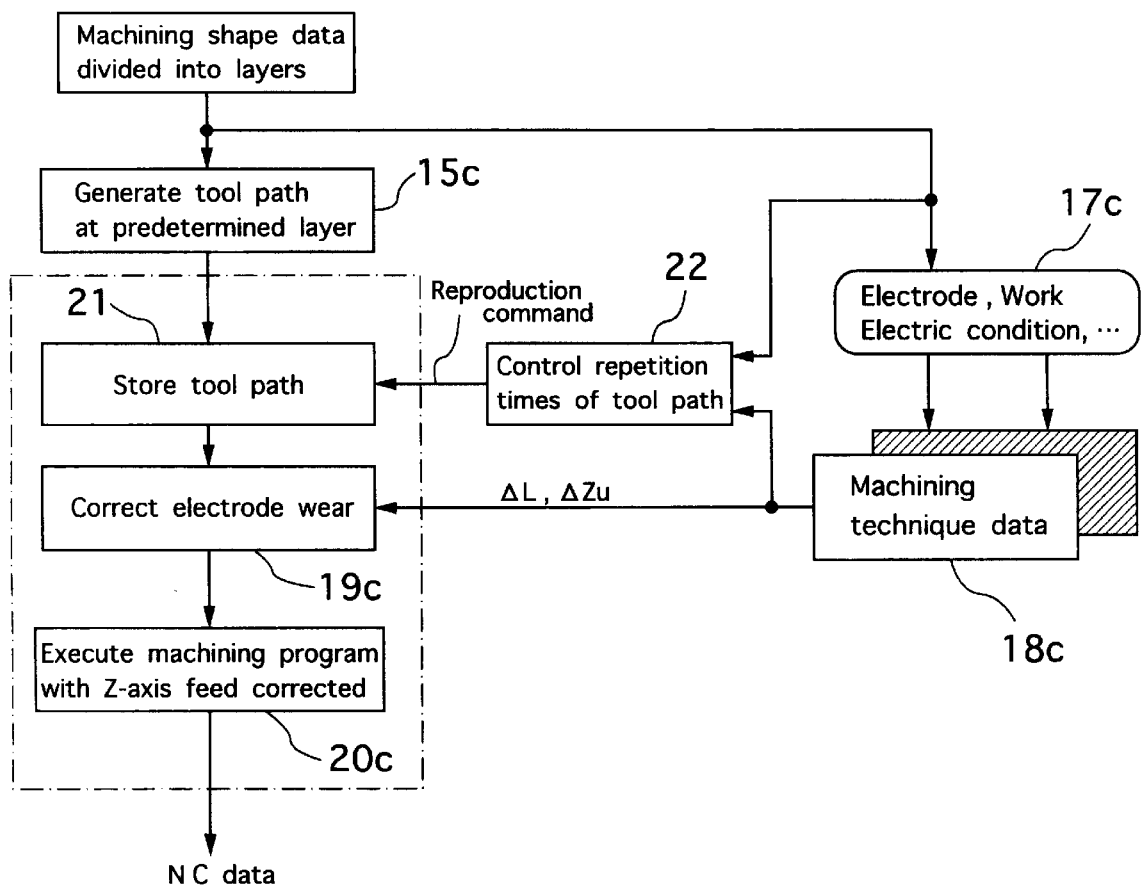
FIG. 5 is an explanatory view of an electrode wear correcting process illustrating a principle of an electrode wear correcting method of a third embodiment of the invention.
Figure 6A:
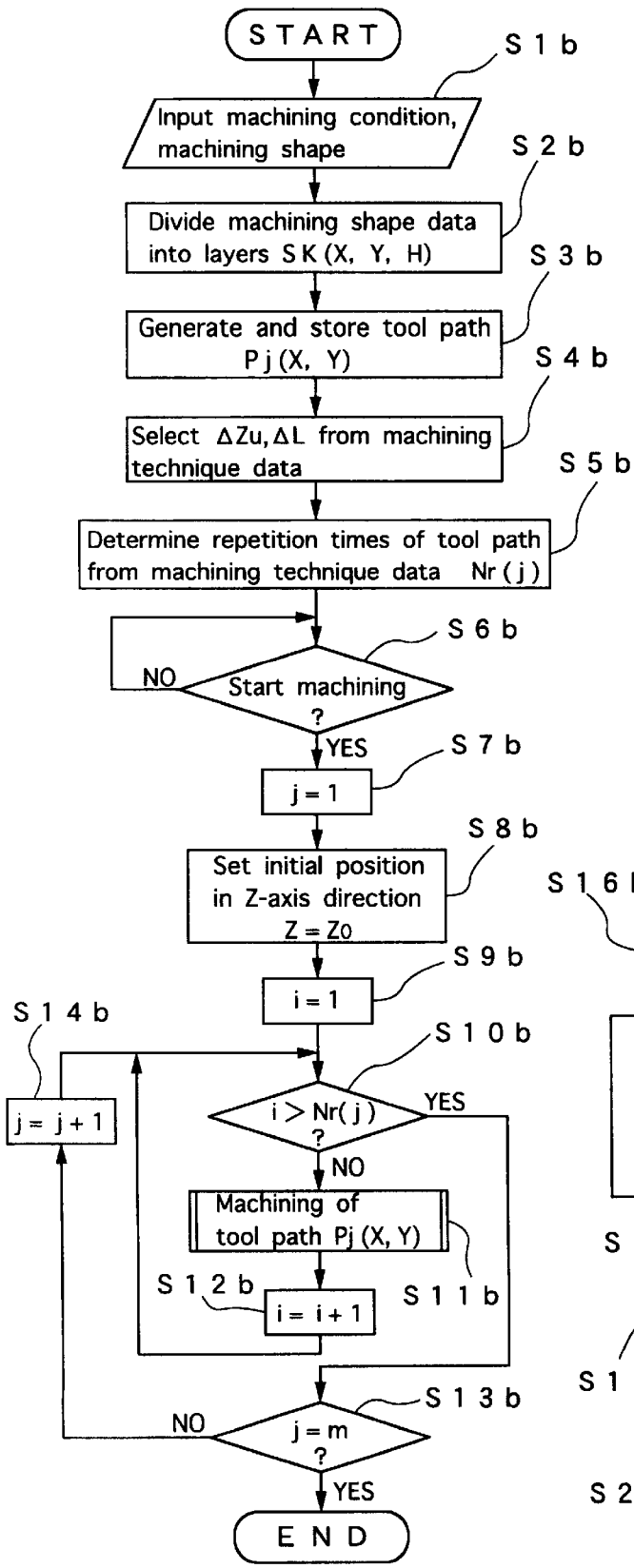
FIGS. 6a and 6b are flowcharts of the electrode wear correcting process for executing the electrode wear correcting method of the third embodiment of the invention.
Figure 6B:
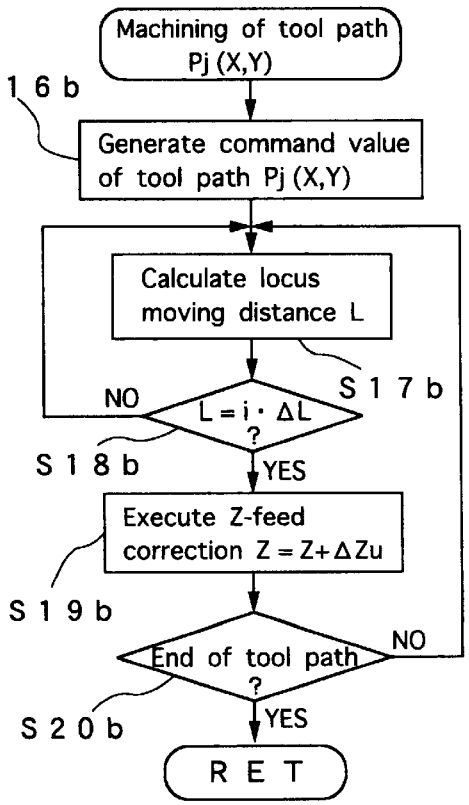

FIG. 5 is an explanatory view of an electrode wear correcting process, illustrating a principle of an electrode wear correcting method in a third embodiment of this invention. FIGS. 6a and 6b are flowcharts of the electrode wear correcting process for executing the electrode wear correcting method in the third embodiment of this invention. A fundamental structure for embodying the electrode wear correcting method in this embodiment is the same as the structure drawing of FIG. 42, so that its description is omitted. Moreover, in the figure, the process 15c, process 17c, process 18c, process 19c and process 20c are the same as those of the beforementioned first embodiment, so that their description is omitted.

In the figure, a process 21 stores a tool path generated in the process 15c. A process 22 decides how many times the tool path is repeated, thereby controlling the repetition times. As described in the above mentioned first embodiment, it is unnecessary to get a whole layer machined, as desired, in one machining path operation in this embodiment, too.

First, a tool path for a layer to be machined is stored in the process 21. On the other hand, it is decided how many times 25 the above stored tool path is repeated, on the basis of an amount equivalent to a thickness of the layer intended to be machined, at least the correcting moving amount ΔZu in the Z-axis direction corresponding to the unit moving distance ΔL in the X-Y plane and the correcting moving amount ΔLu in the X-Y plane corresponding to the above unit moving distance ΔZ, in the process 22. Then, the process 22 outputs a reproduction command of the above stored tool path to the process 21 so as to control the repetition times. Namely, the processes enclosed by the dotted line are executed by the repetition times determined in the process 22.

Here, the electrode wear rate in an actual machining varies depending on a working fluid temperature during machining or a machining chip amount in a machining gap or the like. Therefore, it is a possible that the above required layer thickness cannot be removed accurately by using a machining program in which an electrode wear correction is carried out analytically by the machining technique data 18c and the required layer thickness before machining. In this case, it is necessary to prepare a machining program with a new electrode wear correction performed for correcting the machining depth, in the conventional art. Moreover, in case the machining depth is changed even though the two dimensional shape is the same, it is also necessary to make a machining program with a new electrode wear correction performed. However, according to the present embodiment of the invention, it is possible to easily carry out adjustment or change of the machining depth only by changing the repetition times.

Next, a case in which the electrode wear correction is processed by a program of an NC control means 10 is described, by using a flowchart of the electrode wear correcting process in the embodiment of FIGS. 6a and 6b.

Processing conditions, such as an electrical machining condition and a machining shape, are inputted in step S1b. That is, at least a shape and a material of the electrode, a material of the workpiece and electrical conditions are inputted, and machining technique data corresponding to them is called beforehand. A three-dimensional shape intended to be machined is divided into some layers according to the shape in step S2b. Namely, machining shape data is divided so as to define the layers, and each layer is supposed as SK(X, Y, H). Next, an electrode path in the X-Y plane, namely, a tool path Pj (X, Y) is generated and stored for each of the layers divided in step S3b. Decided in step 4a are a specific correcting unit distance $\Delta L$ given by the machining technique data and the correcting moving amount $\Delta Zu$ in the Z-axis direction, which is given by the machining technique data for feeding the electrode along the Z-axis by that amount $\Delta Zu$ each time the electrode reaches the correcting unit distance $\Delta L$.

In addition, in step S5b, a repetition time Nr(j) of one tool path is decided by the machining technique data and the machining shape data. In step S6b, an electrical discharge machining is started. In step S7b, 1 is set as a value j of a memory (j=1) which records a number of the tool path which has been finished. In step S8b, an initial position Zo is set at a position of the Z-axis direction, namely, a position Z.

In step S9b, 1 is set in a variable i which represents how many times the X-Y moving distance L is longer than the specific correcting unit distance $\Delta L$. In step S10b, it is decided whether or not it is not more than the repetition time Nr(j) of the tool path which is now under the machining operation. When it is decided that it is not more than the repetition time Nr(j) of the currently operated tool path, a routine for performing the machining of the tool path Pj is called in step S11b, and a value i of a memory is incremented in step S12b. Then, step S10b to step S12b are repeated and executed. When it is decided that it is more the repetition time Nr(j) of the currently operated tool path in step S10b, it is decided whether or not the machining operation has been carried out up to the tool path Pm, which is the largest value of the tool path Pj, by the memory value j is equal to m or not, in step S13b. If the value j of the memory is not m, the value j of the memory is incremented in step 14b, and the routine from step S10b to step S13b is executed repeatedly.

If a machining routine for the tool path Pj is called in step S15b, a command value in the X-Y plane of the tool path Pj is outputted in step S16b. Next, the X-Y moving distance L in the X-Y plane is calculated as L=i·$\Delta L$ in step S17b, and it is decided in step S18b whether the electrode has moved by the X-Y moving distance L or not. If the calculated value is equal to the X-Y moving distance L in step S18b, a Z-axis feed amount (Z=Z+$\Delta Zu$) is calculated so as to perform a Z-axis feed correction in step S19b. It is decided if the electrode has reached an end of the tool path Pj or not, in step S20b, and the routine from step S15b to step S20b is continued till the end of it.

As mentioned above, the present embodiment of the electrical discharge machining apparatus divides a three-dimensional shape to be machined into some layers in the Z-axis direction, applies voltage between an electrode 1 of simple shape and a workpiece 2, goes on machining the above each divided layer while synthesizing the feed in the Z-axis direction for correcting a longitudinal wear amount of the electrode 1 with an X-Y plane feed, and performs three-dimensional control by NC control, thereby machining a desired three-dimensional shape. The electrical discharge machining apparatus comprises: a storage means, composed of step S3b and step S4b, for determining X-Y data of the tool path for each layer and the correcting moving amount $\Delta Zu$ in the Z-axis direction corresponding to a specific unit moving distance $\Delta L$ in the X-Y plane given by at least the machining technique data of the tool path for the above each layer; and a repetition time control means, composed of step S5b and step S9b to step S12b, for determining how many times the above tool path is repeated on the basis of an amount equivalent to a thickness of the layer, the correcting moving amount $\Delta Zu$ at least in the Z-axis direction and an amount equivalent to the machining depth decided by an amount equivalent to the X-Y moving distance L in the X-Y plane corresponding to the correcting moving amount $\Delta Zu$ and for controlling the repetition time of the above tool path.

Moreover, the present embodiment of the electrical discharge machining method divides a three-dimensional shape to be machined into some layers in the Z-axis direction, applies voltage between an electrode 1 of simple shape and a workpiece 2, goes on machining the above each divided layer while synthesizing the feed in the Z-axis direction for correcting a longitudinal wear amount of the electrode 1 with an X-Y plane feed, and performs three-dimensional control by NC control, thereby machining a desired three-dimensional shape. The electrical discharge machining method stores the X-Y data of the tool path for each layer in step 3b and the specific unit moving distance $\Delta L$ given by the machining technique data and the correcting moving amount $\Delta Zu$ in the Z-axis direction, for performing the Z-axis feed, in step S4b, decides how many times the above tool path is repeated in step 5b on the basis of an amount equivalent to a thickness of the layer, the correcting moving amount $\Delta Zu$ at least in the Z-axis direction and an amount equivalent to the machining depth decided by an amount equivalent to the X-Y moving distance L in the X-Y plane corresponding to the correcting moving amount $\Delta Zu$, and controls the repetition time of the above tool path in step S9b to step S12b.

Thus, even if the electrode wear amount is large, the electrode is fed along the Z-axis by the correcting moving amount $\Delta Zu$ each time a locus moving distance L in the X-Y plane in the machining operation reaches a correction unit interval $\Delta L$, which is a standard for performing correction in the Z-axis direction. Therefore, it is possible to remove a layer of a constant machining depth, which is determined by the correcting moving amount $\Delta Zu$ in the Z-axis direction and an amount equivalent to the X-Y moving distance in the X-Y plane corresponding to the correcting moving amount $\Delta Zu$ or a correction unit interval $\Delta L$, namely, a machining depth in which the electrode wear amount and the electrode feed amount are balanced to each other. It makes it possible to calculate how many times the above tool path is repeated, too. Moreover, even if the electrode wear amount is large, a machining accuracy can be maintained well. Thus, it is possible to obtain such a high machining speed and machining accuracy as have not been seen conventionally, with respect to the three-dimensional machining using an electrode of simple shape, so that its programming is easy and a machining shape accuracy at an edge portion is improved. Furthermore, it makes a side surface machining of the three-dimensional shape easy and improves the machining accuracy of a corner portion.

Moreover, in the third embodiment of the invention, each process shown in FIG. 5 may be realized as a program in the NC control means 10, or it may be also realized by providing machining means for each. Furthermore, while FIG. 5 shows a modified embodiment based on the first embodiment, it is also possible to obtain the same effect as the above embodiment by using the process 15d, process 17d, process 18d, process 19d and process 20d, respectively, based on the second embodiment instead of the process 15c, process 17c, process 18c, process 19c and process 20c shown in FIG. 5. Namely, it is possible to utilize techniques recited in the first embodiment and the second embodiment.

Fourth Embodiment

Figure 7:
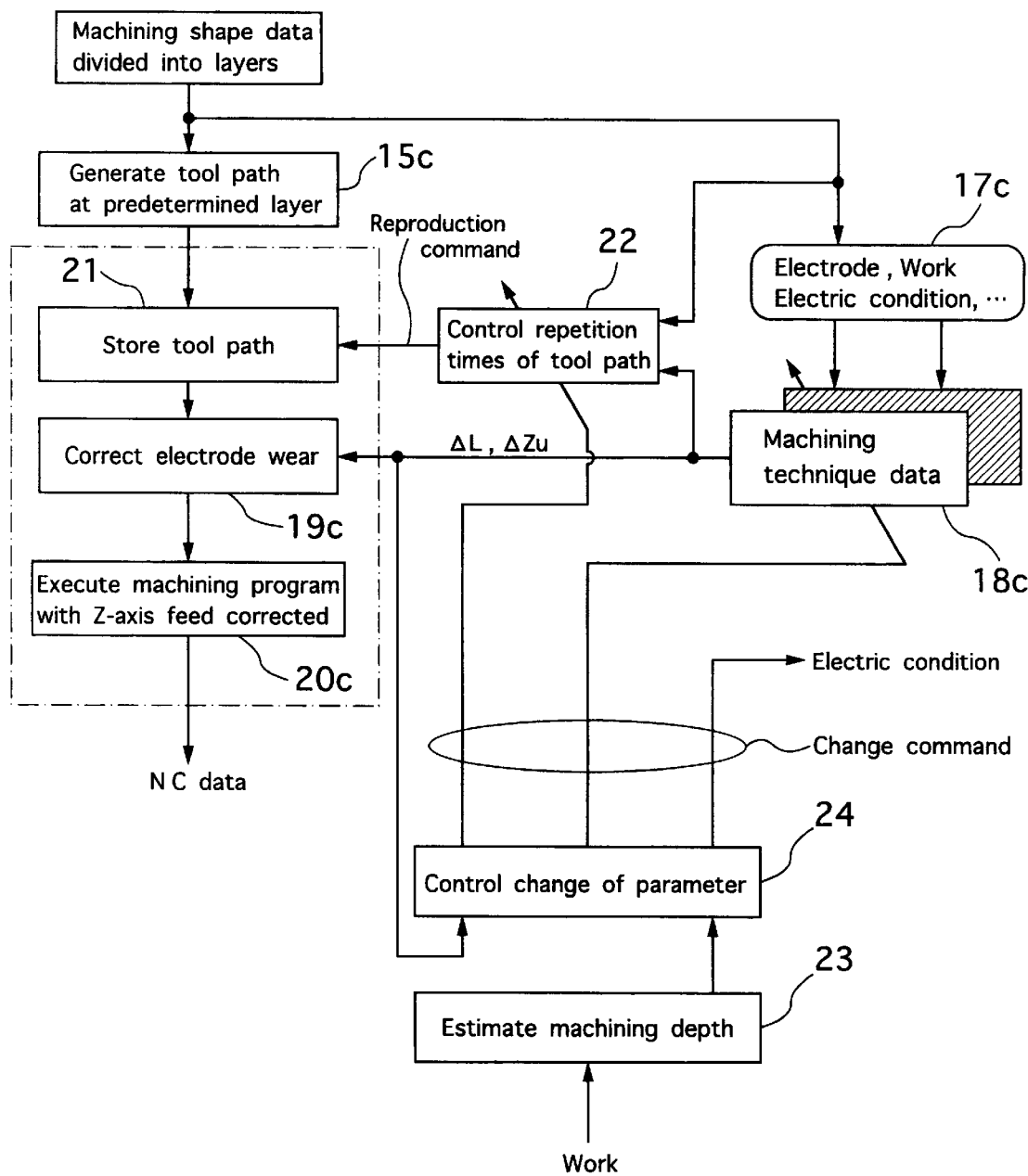
FIG. 7 is an explanatory view of an electrode wear correcting process illustrating a principle of an electrode wear correcting method of a fourth embodiment of the invention.
Figure 8:
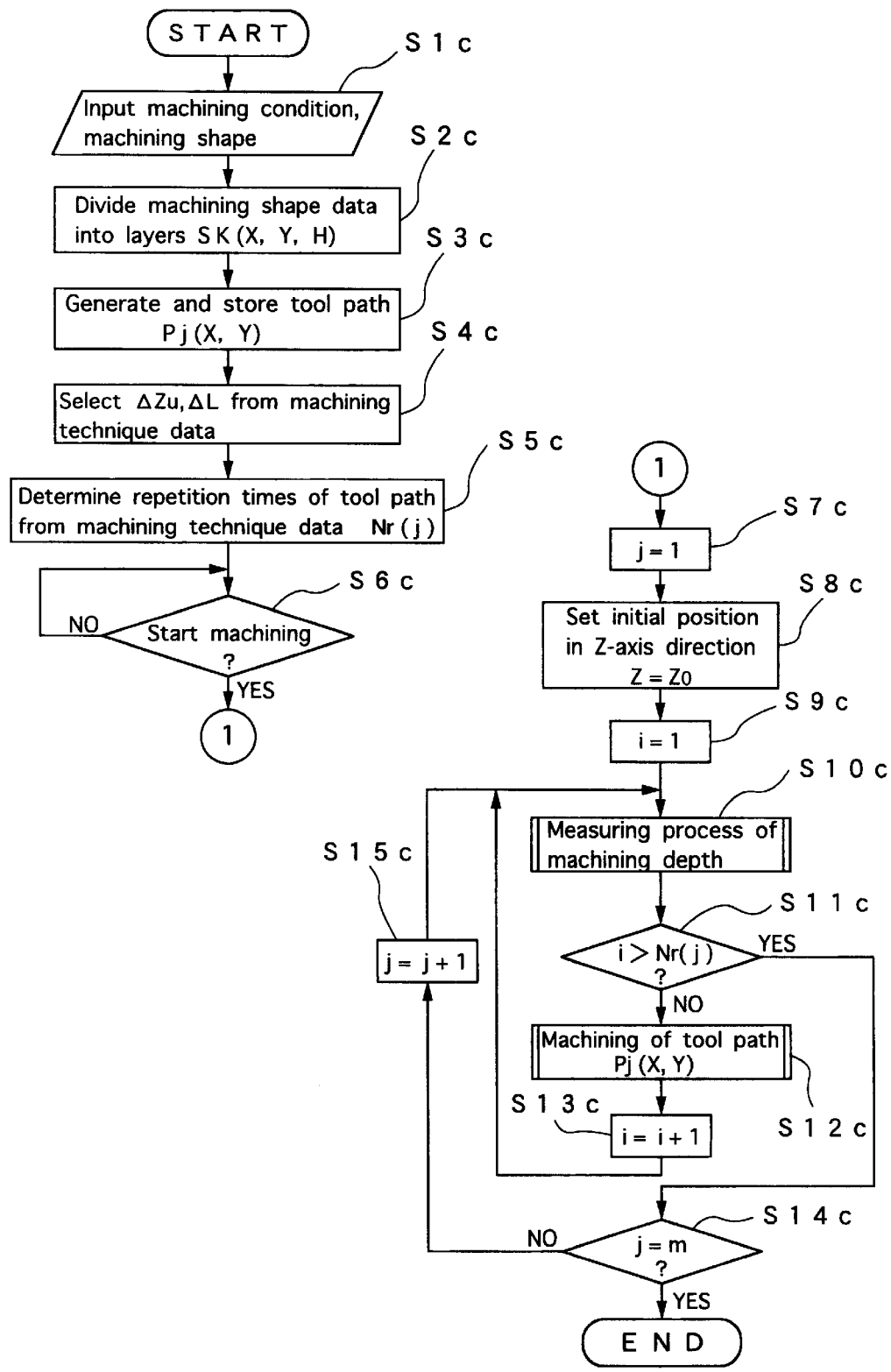
FIG. 8 is a flowchart of a main program of the electrode wear correcting process for executing the electrode wear correcting method of the fourth embodiment of the invention.
Figure 9A:
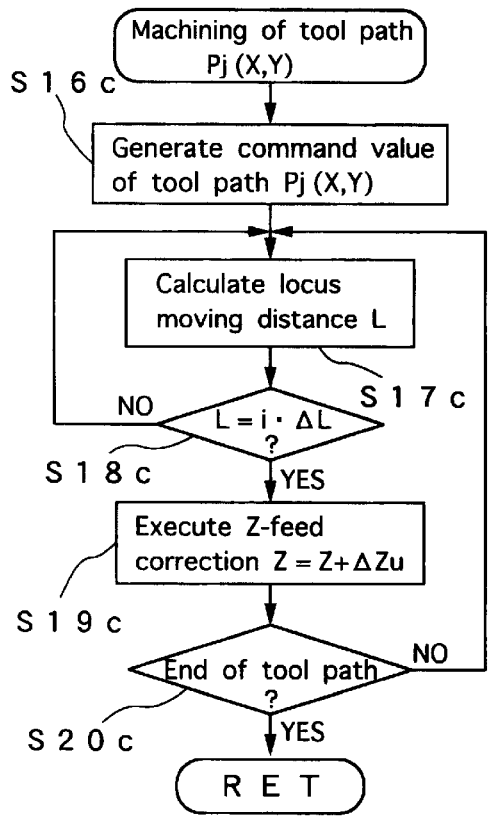
FIGS. 9a and 9b are flowcharts showing an execution program of a tool path and a machining depth measuring process program which are used in the main program in FIG. 8.
Figure 9B:
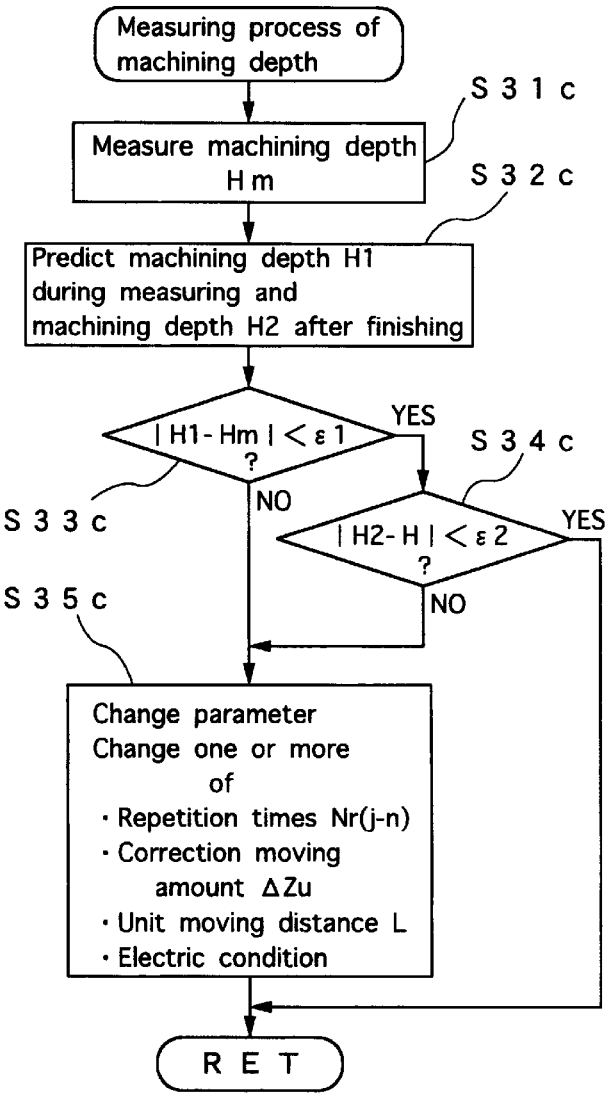

FIG. 7 is an explanatory view of an electrode wear correcting process, illustrating a principle of an electrode wear correcting method in a fourth embodiment of this invention. FIG. 8 is a flowchart of a main program of the electrode wear correcting process for executing the electrode wear correcting method in the fourth embodiment of this invention. FIGS. 9a and 9b are flowcharts showing a tool path executing program and a machining depth measuring program which are used in the main program in FIG. 8. A fundamental structure for executing the electrode wear correcting method in this embodiment is the same as the structure drawing of FIG. 42, so that its description is omitted. Moreover, in the figure, the process 15c, process 17c, process 18c, process 19c, process 20c, process 21 and process 22 are same as those shown in the third embodiment, so that their description is omitted.

In the figure, a process 23 evaluates a machining depth of a workpiece 2 during machining or after machining. A process 24 changes and controls parameters such as a repetition number of times of a tool path, a correcting moving amount $\Delta Zu$ in a Z-axis direction, an amount equivalent to an X-Y moving distance L in an X-Y plane corresponding to the correcting moving amount $\Delta Zu$ in the Z-axis direction, electrical conditions that can adjust an electrode wear amount, etc. In this embodiment, as mentioned in the above third embodiment, it is unnecessary to make a whole layer machined in one tool path scanning. The machining is carried out for each layer while controlling the repetition number of times of the above tool path. At that time, during the repetition time of the tool path of the process 22 or after finishing the repetition number of times, a machining depth of the workpiece 2 is measured by the process 23. The process 24 compares the above measured value with the machining depth which is expected for the repetition number of times at the measuring time. If the above compared value exceeds a is predefined allowable range or it is predicted that it exceeds the allowable range after the repetition number of times, the process 24 changes at least one of following: the rest of the present repetition number of times; repetition number of times to be added to the present one; the correcting moving amount $\Delta Zu$ in the Z-axis direction; the amount equivalent to the X-Y moving distance L in the X-Y plane corresponding to the correcting moving amount $\Delta Zu$ in the Z-axis direction; electrical conditions that are able to adjust the electrode consuming amount. For example, in case the measured machining depth is deeper than the expected machining depth for the preset repetition number of times at the measuring time over the allowable value, at least one of the following is executed: reducing the rest of the preset repetition number of times so as to decrease the correcting moving amount $\Delta Zu$ in the Z-axis direction; enlarging the amount equivalent to the X-Y moving distance L in the X-Y plane corresponding to the correcting moving amount $\Delta Zu$ in the Z-axis direction; adjusting the electrical conditions so that the electrode wear amount increases. To the contrary, if it is smaller than the allowable value, at least one of the following is executed: increasing the rest of the preset repetition number of times; adding new repetition number of times to the preset one; enlarging the correcting moving amount $\Delta Zu$ in the Z-axis direction; decreasing the amount equivalent to the X-Y moving distance L in the X-Y plane corresponding to the correcting moving amount $\Delta Zu$ in the Z-axis direction; adjusting the electrical conditions so that the electrode wear amount decreases. Thus, it is possible to easily perform an adjustment or change of the required machining depth of the layer, as compared with the prior art, by changing the repetition number of times or by adjusting the machining depth in one tool path operation, thereby removing a required layer thickness accurately.

Next, a case in which the electrode wear correction is processed by a program of an NC control means 10 is described, by using flowcharts of the electrode wear correcting process in the embodiment of FIGS. 8, 9a and 9b.

Processing conditions such as an electrical machining condition and a machining shape or the like are inputted in step S1c. That is, at least a shape and a material of the electrode, a material of the workpiece and electrical conditions are inputted, and machining technique data corresponding to them is called beforehand. A three-dimensional shape intended to be machined is divided into some layers according to a desired shape in step S2c. Namely, a machining shape data is divided so as to define layers, and each of the layers is supposed as SK(X, Y, H). Next, an electrode path in the X-Y plane, namely, a tool path Pj(X, Y) is generated and stored for each of the layers which are divided in step S3c. Each time the electrode reaches the unit moving distance $\Delta L$, decided in step S4c are a specific unit moving distance $\Delta L$, which is given by the machining technique data, and the correcting moving amount $\Delta Zu$ in the Z-axis direction, which are prepared for feeding the electrode along the Z-axis by the correcting moving amount $\Delta Zu$ and which is given by the machining technique data.

In addition, in step S5c, a repetition number of times Nr(j) for one tool path is determined by the machining technique data and the machining shape data. In step S6c, an electrical discharge machining is started. In step 57c, 1 is set as a value j of a memory (j=1) which records a number of a tool path that has been finished. In step S8c, an initial position $Z_0$ is set at a position in the Z-axis direction, that is, a position Z.

In step S9c, 1 is set in a variable i that represents how many times the X-Y moving distance L is longer than the specific unit moving distance $\Delta L$. In step S10c, a routine of a machining depth measuring process is called. In step S11c, it is decided whether or not it is not more than the repetition number of times Nr(j) for the tool path in the present machining operation. When it is decided that it is not more than the repetition number of times Nr(j) for the tool path in the present machining operation, a routine for performing the machining for the tool path Pj is called in step S12c, and a value i of a memory is incremented in step S13c. Then, processes from step S10c to step S13c are repeatedly executed. When it is decided that it is more than the repetition number of times Nr(j) for the tool path in the present machining operation in step S11c, it is decided whether or not the machining operation for the tool path Pm, which is the last one of the tool path Pj, is finished, by judging if the memory value j is equal to m or not, in step S14c. If the value j of the memory is not m, the value j of the memory is incremented in step 15c, and the routine from step S10c to step S15c is repeatedly executed.

If the machining depth measuring program is called in step S10c, a machining depth Hm is measured in step S31c, and a predicted value H1 of a machining depth of the workpiece 2 during the repetition number of times of the tool path and a predicted value H2 of a machining depth of the workpiece 2 after the repetition number of times of the tool path are calculated in step S32c. It is decided in step S33c whether or not the absolute value of H1−Hm (H1 minus Hm) is within a fixed error range of epsilon 1 ($\epsilon$1), by comparing the predicted value H1 of the machining depth of the workpiece 2 during the repetition number of times of the tool path with a machining depth Hm at that time, in step S33c. If yes, it is decided in step S34c whether or not the absolute value of H2−H is within a fixed error range of epsilon 2 ($\epsilon$2), by comparing the predicted value H2 of the machining depth of the workpiece 2 after the repetition number of times of the tool path with a finishing machining depth H. If the absolute value of H2−H is within the fixed error range of epsilon 2 ($\epsilon$2) in step S34c, this routine is finished. However, when it is decided that the absolute value of H1−Hm is not within the fixed error range of epsilon 1 ($\epsilon$1) or the absolute value of H2−H is not within the fixed error range of epsilon 2 ($\epsilon$2) in step S33c, at least one of the followings is changed in step S35c: rest of the preset repetition number of times Nr(j−n) of the tool path; the correcting moving amount $\Delta Zu$ in the Z-axis direction; the unit moving distance $\Delta L$ in the X-Y plane corresponding to the correcting moving amount $\Delta Zu$ in the Z-axis direction; electrical conditions which can adjust an electrode wear amount.

If a machining routine for the tool path Pj is called in step S16c, a command value in the X-Y plane of the tool path Pj is outputted in step S17c. Next, the X-Y moving distance L in the X-Y plane for a moving locus is calculated as L=i·$\Delta L$ in step S18c, and it is decided in step S18c whether the electrode has moved the X-Y moving distance L or not. If it is decided in step S18c that it has moved the X-Y moving distance L, a Z-axis feed amount Z=Z+$\Delta Zu$ is calculated so as to perform a Z-axis feed correction in step S19c. It is decided whether the electrode has reached an end of the tool path Pj in step S20c, and processes of the routine from step S17c to step S20c are continued till the end.

As mentioned above, the present embodiment of the electrical discharge machining apparatus divides a three-dimensional shape to be machined into some layers in the Z-axis direction, applies voltage between an electrode 1 of simple shape and a workpiece 2, goes on machining the above each divided layer while synthesizing the feed in the Z-axis direction for correcting a longitudinal wear amount of the electrode 1 with an X-Y plane feed, and performs three-dimensional control by NC control, thereby machining a desired three-dimensional shape. The electrical discharge machining apparatus comprises: storage means, composed of step S3c, for storing at least X-Y data of the tool path for the above each layer; a repetition time control means, composed of step S4c, step S5c and step S7c to step S14c, for deciding how many times the above tool path is repeated on the basis of an amount equivalent to a thickness of the layer, the correcting moving amount $\Delta Zu$ at least in the Z-axis direction and an amount equivalent to the machining depth decided by an amount equivalent to the unit moving distance $\Delta L$ in the X-Y plane corresponding to the correcting moving amount $\Delta Zu$ and for controlling the repetition number of times of the above tool path; a measuring means, composed of step S31c and step 32c, for measuring the machining depth during the above repetition number of times or after the repetition number of times; and an electrical condition control means, composed of step S33c, step S34c and step S35c, for comparing the above measured value with the machining depth that is expected for the repetition number of times and for changing one or more of the rest of the preset repetition number of times, new repetition number of times to be added, the correcting moving amount $\Delta Zu$ in the Z-axis direction, the amount equivalent to the unit moving distance $\Delta L$ in the X-Y plane corresponding to the correcting moving amount $\Delta Zu$ in the Z-axis direction, electrical conditions that are able to adjust the electrode wear, if the above compared value exceeds an allowable range.

Thus, even if the electrode wear amount is large, it is possible to feed the electrode along the Z-axis by the correcting moving amount $\Delta Zu$ each time the locus moving distance L in the X-Y plane in the machining operation reaches the correction unit interval $\Delta L$, which is a standard for performing the correction in the Z-axis direction. Therefore, it is possible to decide how many times the above tool path is repeated on the basis of the correcting moving amount $\Delta Zu$ in the Z-axis direction and an amount equivalent to the machining depth decided by an amount equivalent to the unit moving distance $\Delta L$ in the X-Y plane corresponding to the correcting moving amount $\Delta Zu$, to control the repetition number of times of the above tool path in step S7c to step S14c, to remove a layer of a constant machining depth decided by the correction unit interval $\Delta L$, in other words, a machining depth in which the electrode wear amount and the electrode feed amount are balanced to each other, to decrease the machining technique data manually inputted, which are necessary for correcting an electrode wear, and to realize the electrode wear correction in easier way. Moreover, it is possible to improve a machining accuracy even if the electrode wear amount is large. Therefore, in the three-dimensional machining using an electrode of simple shape, high machining speed and machining accuracy, which have not been in the prior art, is obtained.

In addition, the present embodiment of the electrical discharge machining method divides a three-dimensional shape to be machined into some layers in the Z-axis direction, applies voltage between an electrode 1 of simple shape and a workpiece 2, goes on machining the above each divided layer while synthesizing the feed in the Z-axis direction for correcting a longitudinal wear amount of the electrode 1 with an X-Y plane feed, and performs three-dimensional control by NC control, thereby machining a desired three-dimensional shape. The electrical discharge machining method is the one which: stores at least an X-Y data of the tool path for the above each layer in step S3c; decides how many times the above tool path is repeated on the basis of an amount equivalent to a thickness of the layer, the correcting moving amount $\Delta Zu$ at least in the z-axis direction and an amount equivalent to the machining depth decided by an amount equivalent to the unit moving distance $\Delta L$ in the X-Y plane corresponding to the correcting moving amount $\Delta Zu$ in step s4c and step S5c; goes on machining for each layer while controlling the repetition number of times of the above tool path in step S7c to step S14c; measures the machining depth during the above repetition number of times or after the repetition number of times in step S31c and step S32c; compares the above measured value with a machining depth that is expected for the above repetition number of times in step S33c and step S34c; and changes one or more of the rest of the preset repetition number of times, repetition number of times to be added, the correcting moving amount ΔZu in the Z-axis direction corresponding to the X-Y moving distance L in the X-Y plane, the unit moving distance ΔL in the X-Y plane corresponding to the correcting moving amount ΔZu and the electrical conditions that are able to adjust the electrode wear amount in step S35c, if the above compared value exceeds an allowable range.

Here, the fourth embodiment of the invention has been described, however, each process shown in FIG. 4 may be realized by a program in the NC control means 10, or it may be also realized by providing machining means for each.

Fifth Embodiment

Figure 10:
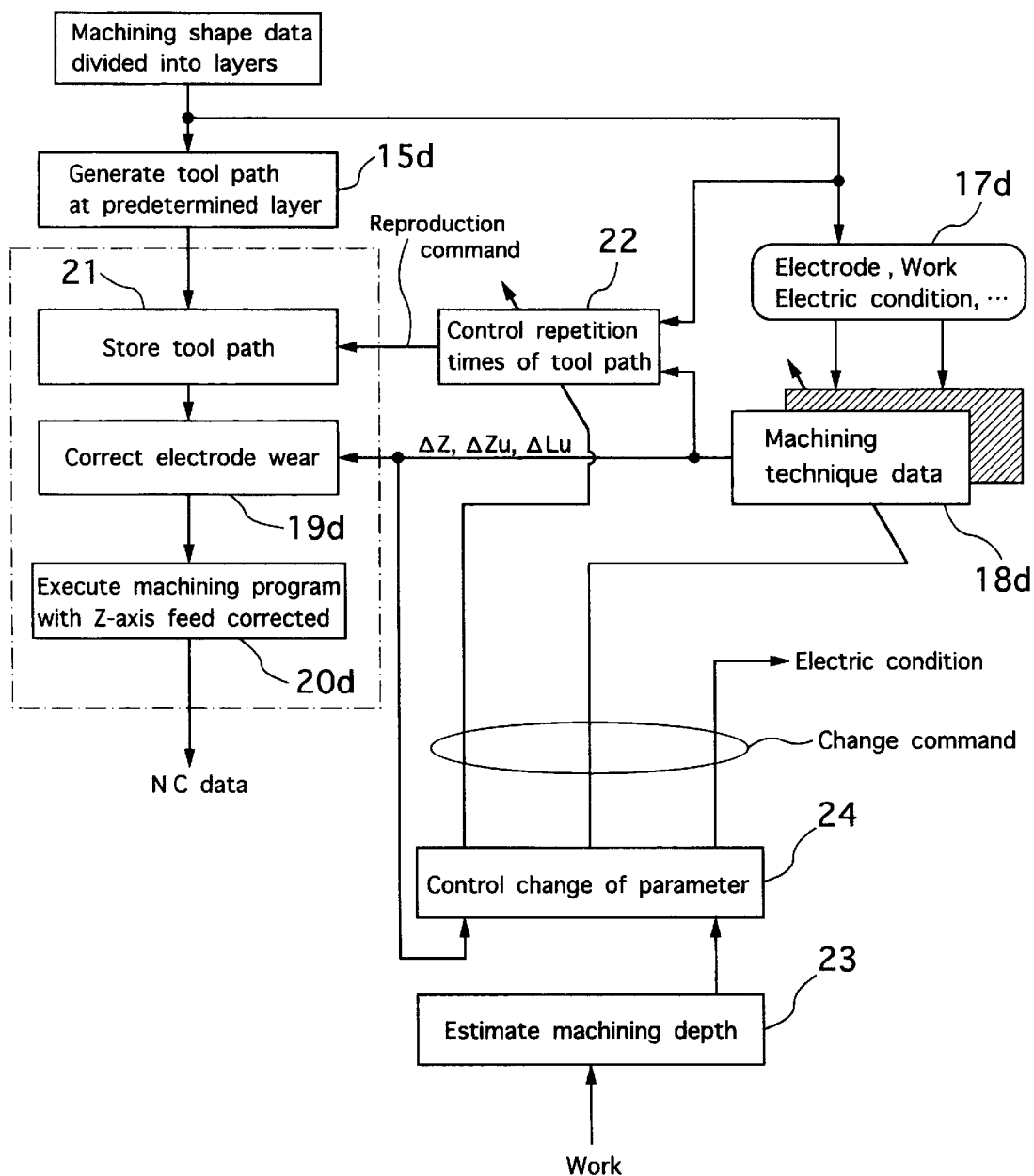
FIG. 10 is an explanatory view of an electrode wear correcting process illustrating a principle of an electrode wear correcting method of a fifth embodiment of the invention.
Figure 11:
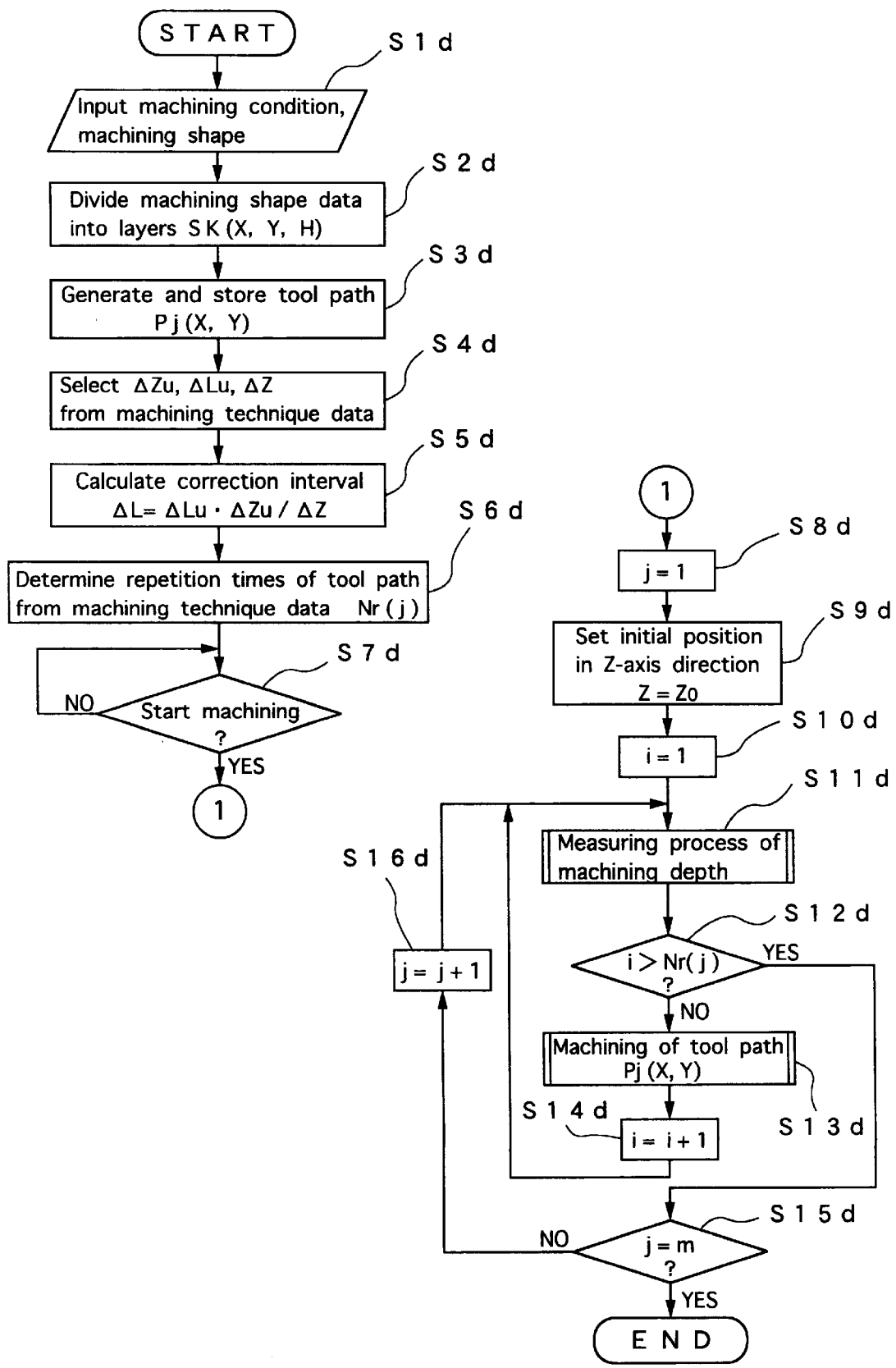
FIG. 11 is a flowchart of the main program of the electrode wear correcting process for executing the electrode wear correcting method of the fourth embodiment of the invention.
Figure 12A:
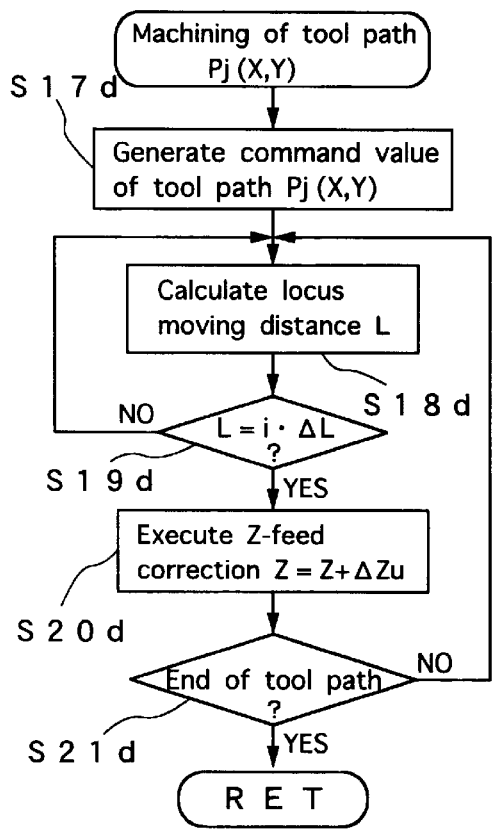
FIGS. 12a and 12b are flowcharts showing an execution program of a tool path and a machining depth measuring process program which are used in the main program of FIG. 11.
Figure 12B:
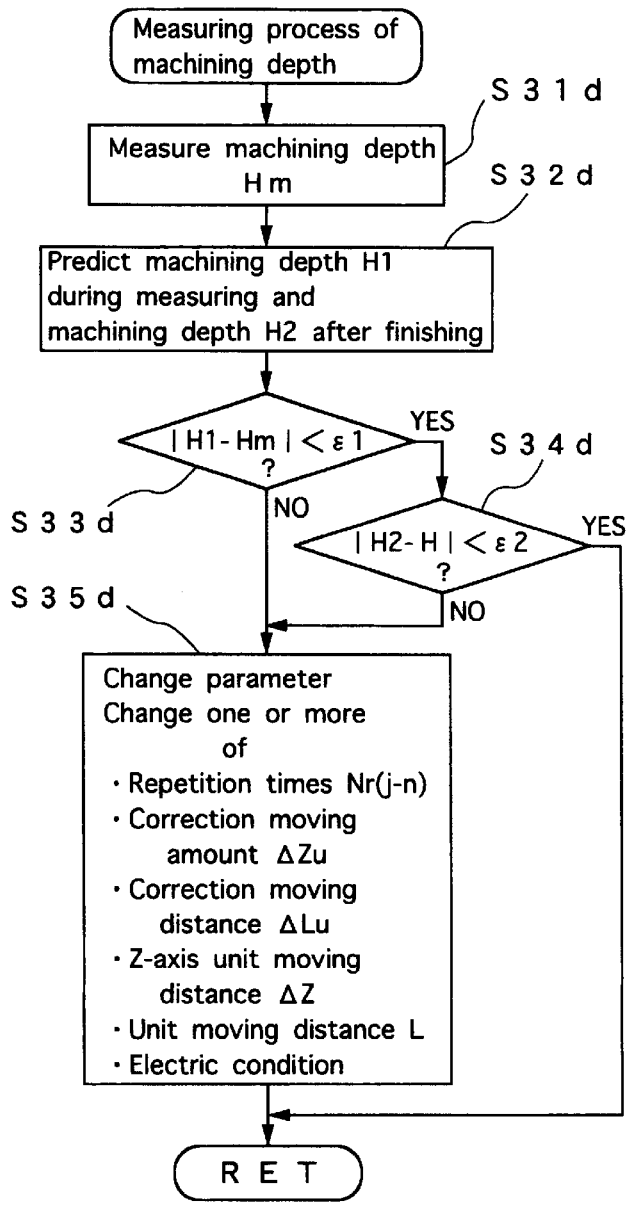

FIG. 10 is an explanatory view of an electrode wear correcting process, illustrating a principle of an electrode wear correcting method in a fifth embodiment of the invention. FIG. 11 is a flowchart of a main program of the electrode wear correcting process for executing the electrode wear correcting method in the fourth embodiment of the invention. FIGS. 12a and 12b are flowcharts showing an additional path executing program and a machining depth measuring program which are used in the main program in FIG. 11. A fundamental structure for conducting the electrode wear correcting method in the embodiment is the same as the structure drawing of FIG. 42, so that its description is omitted. Moreover, in the figure, the process 15d, process 17d, process 18d, process 19d and process 20d are same as those shown in the second embodiment and process 21, process 22 and process 23 are the same as those shown in the fourth embodiment, so that their description is omitted.

In the figure, a process 24 changes and controls parameters such as a correcting moving amount ΔLu in an X-Y direction and a feed amount in a Z-axis direction corresponding to the correcting moving amount ΔLu in the X-Y direction and so on, in addition to repetition times of a tool path, a correcting moving amount ΔZu in the Z-axis direction, the correcting moving amount ΔLu in an X-Y plane corresponding to a unit moving distance ΔZ in the Z-axis direction and electrical conditions that can adjust an electrode wear amount, just like the one shown in the fourth embodiment.

In this embodiment, as mentioned in the above fourth embodiment, during repetition times of the tool path of the process 22 or after finishing the repetition times, a machining depth of a workpiece 2 is measured in the process 23. Then, a comparison is made in the process 24 between the above measured value and the machining depth that is expected for the repetition times in the measuring time. If the above compared value exceeds a predefined allowable range or it is predicted that it exceeds the allowable range after the repetition times finish, at least one of the following is changed: the rest of the preset repetition times, repetition times to be added thereto, a unit moving distance ΔL in the X-Y plane, the correcting moving amount ΔZu in the Z-axis direction corresponding to the unit moving distance ΔL in the X-Y plane, the correcting moving amount ΔLu in the X-Y plane corresponding to the above unit moving distance ΔZ and electrical conditions that are able to adjust the electrode wear amount.

For example, in case the measured machining depth mentioned above is deeper, over the allowable value, than the expected machining depth for the repetition times in the measuring time, at least one of the following is executed:

1) reducing the rest of the repetition times;
2) enlarging the unit moving distance ΔL in the X-Y direction;
3) decreasing the correcting moving amount ΔZu in the Z-axis direction corresponding to the unit moving distance ΔL in the X-Y direction;
4) decreasing the unit moving distance ΔZ in the Z-axis direction;
5) enlarging the correcting moving amount ΔLu in the X-Y plane corresponding to the unit moving distance ΔZ in the Z-axis direction;
6) adjusting the electrical conditions so that the electrode wear amount increases.

To the contrary, if it is smaller, over the allowable value, at least one of the following is executed:

1) increasing the rest of the repetition times;
2) adding the repetition times;
3) decreasing the unit moving distance ΔL in the X-Y direction;
4) enlarging the correcting moving amount ΔZu in the Z-axis direction corresponding to the unit moving distance ΔL in the X-Y direction;
5) enlarging the unit moving distance ΔZ in the Z-axis direction;
6) decreasing the correcting moving amount ΔLu in the X-Y plane corresponding to the unit moving distance ΔZ in the Z-axis direction
7) adjusting the electrical conditions so that the electrode wear amount decreases.

Next, a case in which the electrode wear correction is processed by a program in an NC control means 10 is described, by using the flowcharts of the electrode wear correcting process in the embodiment of FIGS. 11, 12a and 12b.

Processing conditions such as an electrical machining condition and a machining shape or the like are inputted in step S1d. That is, at least a shape and a material of the electrode, a material of the workpiece and electrical conditions or the like are inputted, and machining technique data corresponding to them is called beforehand. The three-dimensional shape intended to be machined is divided into some layers according to a desired shape, in step S2d. Namely, machining shape data is divided so as to define layers, and each of the layers is supposed as SK(X, Y, H). Next, an electrode path in the X-Y plane, namely, a tool path Pj (X, Y) is generated and stored in step s3d for each of the divided layers. The unit moving distance ΔL and the correcting moving amount ΔZu in the Z-axis direction for performing a Z-axis feed are determined by the correcting moving amount ΔZu in the Z-axis direction corresponding to the specific unit moving distance ΔL in the X-Y plane and the correcting moving amount ΔLu in the X-Y plane corresponding to the unit moving distance ΔZ, both of which are selected from the machining technique data, in step S4d.

An amount equivalent to the X-Y moving distance L in the X-Y plane corresponding to the correcting moving amount ΔZu in the above Z-axis direction, namely, a correction unit interval ΔL is calculated on the basis of the unit moving distance ΔZ, the correcting moving amount ΔZu in the Z-axis direction and the correcting moving amount ΔLu in the X-Y direction, which are selected from the machining technique data, in step S5d. The correction unit interval ΔL is found as follows:

$\Delta L = \Delta Lu \cdot \Delta Zu / \Delta Z$

An electrical discharge machining is started in step S7d. 1 is set as a value j of a memory (j=1) which records a number of the finished tool path, in step S8d. An initial position Zo is set at a position in the Z-axis direction, namely, a position Z in step S9d.

In step S10d, 1 is set in a variable i that represents how many times the X-Y moving distance L is longer than the specific unit moving distance ΔL. In step S11d, a routine of a machining depth measuring process is called. In step S12d, it is decided whether or not it is not more than the repetition times Nr(j) of the tool path during the present machining operation. If it is decided that it is not more than the repetition times Nr(j) of the tool path during the present machining, a routine for performing machining of the tool path Pj is called in step S13d, and a value i of a memory is incremented in step S14d. Then, step S11d to step S14d are repeatedly executed. If it is decided in step S12d that it is more than the repetition times Nr(j) of the tool path during the present machining, it is decided whether or not machining for the tool path Pm, which is the last one of the tool path Pj, is performed or not, by judging if the value j of the memory is equal to m or not, in step S15d. If the value j of the memory is not m, the value j of the memory is incremented in step 16d, and the routine from step S11d to step S16d is executed repeatedly.

If a machining depth measuring program is called in step S11d, a machining depth Hm is measured in step S31d, and a predicted value H1 of the machining depth of the workpiece 2 during repetition times of the tool path and a predicted value H2 of the machining depth of the workpiece 2 after the repetition times of the tool path are calculated in step S32d. When the absolute value of H1–Hm is within the fixed error range of epsilon 1 ($\epsilon$1), in step S33d, by comparing the predicted value H1 of the machining depth of the workpiece 2 during the repetition times of the tool path with the machining depth Hm at that time, it is additionally decided whether the absolute value of H2–H is within the fixed error range of epsilon 2 ($\epsilon$2) or not, by comparing the predicted value H2 of the machining depth of the workpiece 2 after the repetition times of the tool path with a finishing machining depth H in step S34d. If the absolute value of H2–H is within the fixed error range of epsilon 2 ($\epsilon$2) in step S34d, this routine is retired. However, when it is decided that the absolute value of H1–Hm is not within the fixed error range of epsilon 1 ($\epsilon$1) in step S33d, or that the absolute value of H2–H is not within the fixed error range of epsilon 2 ($\epsilon$2), at least one of the followings is changed in step S35d: the rest of the repetition times Nr(j–n) of the tool path; the unit moving distance ΔL and the unit moving distance ΔZ in the Z-axis direction for performing the Z-axis feed, which are calculated on the basis of the correcting moving amount ΔZu in the Z-axis direction corresponding to the unit moving distance ΔL in the specific X-Y plane and the correcting moving amount ΔLu in the X-Y plane corresponding to the unit moving distance ΔZ; and electrical conditions which can adjust an electrical wear amount.

If a machining routine of the tool path Pj is called in step S17d, a command value in the X-Y plane of the tool path Pj is outputted in step S18d. Next, the X-Y moving distance L in the X-Y plane is calculated as L=i·ΔL in step S19d, and it is decided in step S19d whether the electrode has moved the X-Y moving distance L or not. If the electrode has moved the X-Y moving distance L which is calculated in step S19d, a Z-axis feed amount Z=Z+ΔZu is calculated so as to perform a Z-axis feed correction in step S20d. It is decided in step S21d whether the electrode has reached an end of the tool path Pj or not, and a process of the routine from step S18d to step S21d is continued till the end.

As mentioned above, the present embodiment of the electrical discharge machining apparatus divides a desired three-dimensional shape into some layers in the Z-axis direction, applies voltage between an electrode 1 of simple shape and a workpiece 2, goes on machining the above each divided layer while synthesizing a feed in the Z-axis direction, for correcting a longitudinal wear amount of the electrode 1, with an X-Y plane feed, and performs three-dimensional control by NC control, thereby machining a desired three-dimensional shape. The electrical discharge machining apparatus of the embodiment comprises: a storage means, composed of step S3d, for storing at least X-Y data of the tool path for the above each layer; a repetition time control means, composed of from step S4d to step S6d and step S8d to step S16d, for deciding how many times the above tool path is repeated in accordance with an amount equivalent to a thickness of the above layer, an amount equivalent to a machining depth, which is determined by the unit moving distance ΔL and the correcting moving amount ΔZu in the Z-axis direction for performing the Z-axis feed, on the basis of the correcting moving amount ΔZu in the Z-axis direction corresponding to the specific unit moving distance ΔL in at least the X-Y plane and the correcting moving amount ΔLu in the X-Y plane corresponding to the above unit moving distance ΔZ, and for controlling the repetition times of the above tool path; a measuring means, composed of step S31d and step 32d, for measuring the machining depth during the above repetition times or after the repetition times; and an electrical condition control means, composed of step S33d to step S34d and step S35d, for comparing the above measured value with the machining depth that is expected for the repetition times, and for changing one or more of the rest of the preset repetition times, repetition times to be added, the unit moving distance ΔL and the correcting moving amount ΔZu in the Z-axis direction for performing the Z-axis feed, which are determined by the correcting moving amount ΔZu in the Z-axis direction corresponding to the specific unit moving distance ΔL in the X-Y plane and the correcting moving amount ΔLu in the X-Y plane corresponding to the above unit moving distance ΔZ, and electrical conditions that are able to adjust the electrode wear amount, if the above compared value exceeds an allowable range.

Therefore, if the electrode wear is large, the following operation is possible each time a locus moving distance L in the X-Y plane in the machining work reaches the correction unit interval ΔL, which is a standard for performing correction in the Z-axis direction: feeding the electrode along the Z-axis by the correcting moving amount ΔZu; deciding how many times the above tool path is repeated on the basis of the machining depth decided by the correcting moving amount ΔZu in the Z-axis direction and an amount equivalent to the moving distance ΔL in the X-Y plane corresponding to the above correcting moving amount ΔZu; going on machining for each layer while controlling the repetition times of the above tool path; measuring the machining depth during the repetition times or after the repetition times; comparing the above measured value with the machining depth that is expected for the repetition times; changing the rest of the preset repetition times, repetition times to be added, the correcting moving amount ΔZu in the Z-axis direction corresponding to the specific unit moving distance ΔL in the X-Y plane, the unit moving distance ΔL and the correcting moving amount ΔZu in the Z-axis direction for performing the Z-axis feed, an amount equivalent to the X-Y moving distance L in the X-Y plane corresponding to the correcting moving amount ΔZu in the Z-axis direction, and electrical conditions that are able to adjust the electrode wear amount, if the above compared value exceeds an allowable range. Therefore, it is possible to remove a layer of the machining depth in which the electrode wear amount and the electrode feed amount are balanced. It decreases the machining technique data manually inputted for correcting the electrode wear, thereby realizing the electrode wear correction in easier way. Moreover, it is possible to improve a machining accuracy even if the electrode wear amount is large. Therefore, in the three-dimensional machining using an electrode of simple shape, high machining speed and machining accuracy which have not been in the prior art can be obtained.

In addition, the present embodiment of the electrical discharge machining method divides a desired three-dimensional shape into some layers in the Z-axis direction, applies voltage between an electrode 1 of simple shape and a workpiece 2, goes on machining the above each divided layer while synthesizing a feed in the Z-axis direction, for correcting a longitudinal wear amount of the electrode 1, with an X-Y plane feed, and performs three-dimensional control by NC control, thereby machining a desired three-dimensional shape. The electrical discharge machining method of the embodiment comprises the steps of: storing in step S3d at least X-Y data of the tool path for the above each layer; decides, in step S4d to step S6d and step S8d to step S16d, how many times the above tool path is repeated in accordance with an amount equivalent to a thickness of the above layer, an amount equivalent to a machining depth, which is determined by the unit moving distance ΔL and the correcting moving amount ΔZu in the Z-axis direction for performing the Z-axis feed, on the basis of the correcting moving amount ΔZu in the Z-axis direction corresponding to the specific unit moving distance ΔL in at least the X-Y plane and the correcting moving amount ΔLu in the X-Y plane corresponding to the above unit moving distance ΔZ, and controlling the repetition times of the above tool path; measuring, in step S31d and step 32d, the machining depth during the above repetition times or after the repetition times; comparing, in step S33d and step S34d, the above measured value with the machining depth that is expected for the repetition times; and changing, in step S35d, one or more of the rest of the preset repetition times, repetition times to be added, the unit moving distance ΔL and the correcting moving amount ΔZu in the Z-axis direction for performing the Z-axis feed, which are determined by the correcting moving amount ΔZu in the Z-axis direction corresponding to the specific unit moving distance ΔL in the X-Y plane and the correcting moving amount ΔLu in the X-Y plane corresponding to the above unit moving distance ΔZ, and electrical conditions that are able to adjust the electrode wear amount, if the above compared value exceeds an allowable range.

It is possible to easily perform an adjustment or change of the required machining depth of the layer, compared with the prior art, by changing the repetition times or adjusting the machining depth in one tool path scanning, thereby to remove accurately the required layer thickness.

Here, the fifth embodiment of the invention is described, however, each process shown in FIG. 5 may be realized by a program in an NC control means 10, or it may be done by using machining means for each.

Sixth Embodiment

Figure 13:
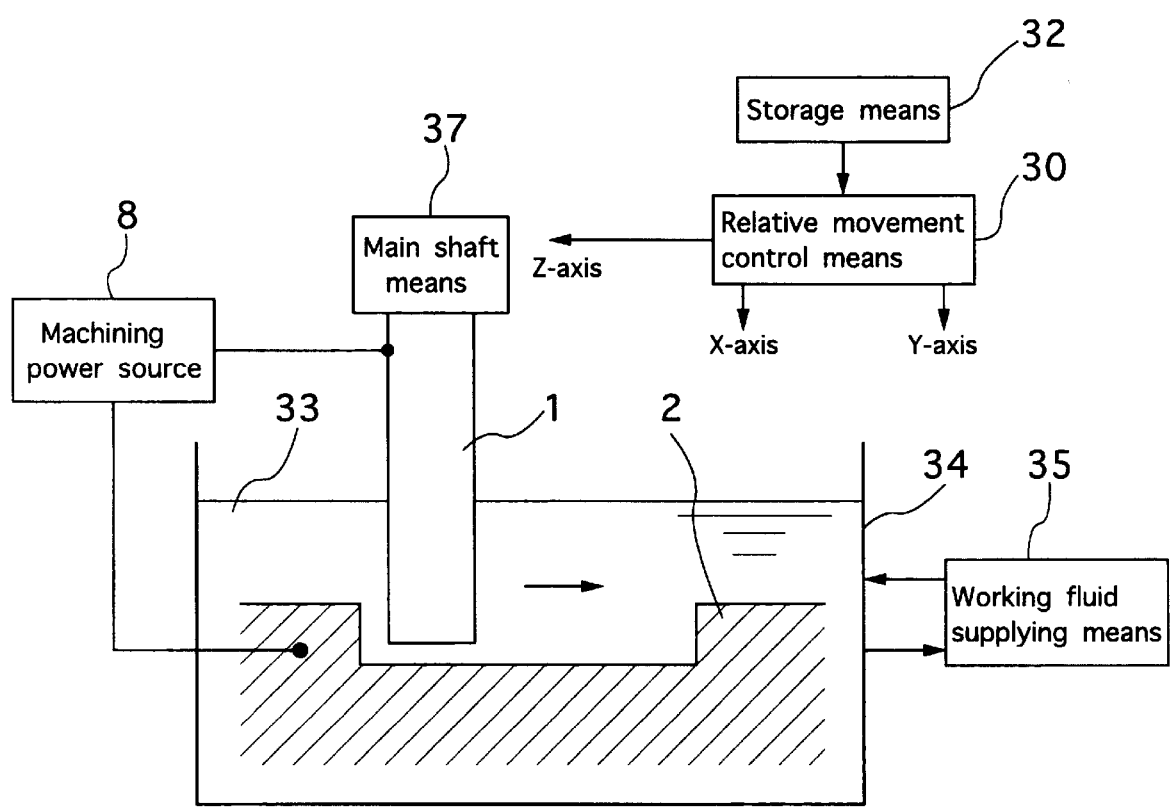
FIG. 13 is a whole structure view of an electrical discharge machining apparatus of a sixth embodiment of the invention.
Figure 14A:
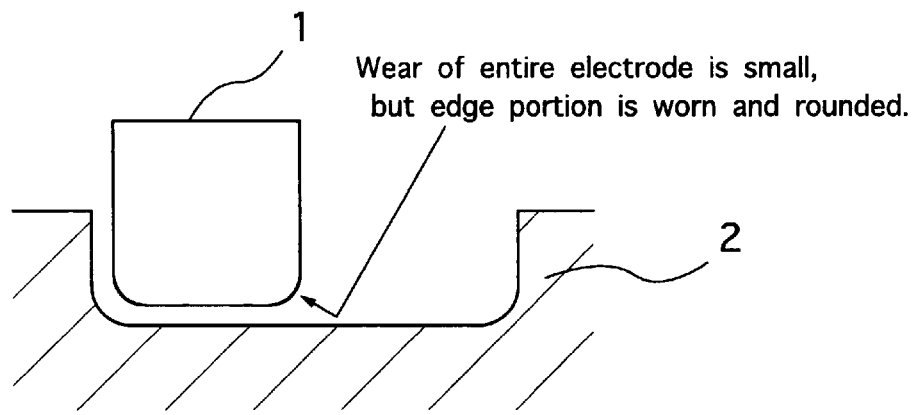
FIG. 14a is an explanatory view of a low wearing condition by an electrical discharge machining in the prior art.
Figure 14B:
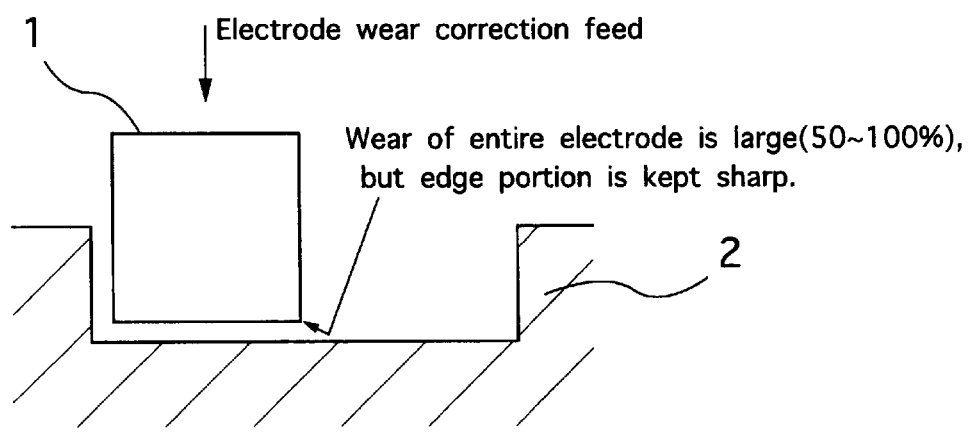
FIG. 14b is an explanatory view of a wearing condition by an electrical discharge machining of the electrical discharge machining apparatus in the sixth embodiment of the invention.
Figure 15:
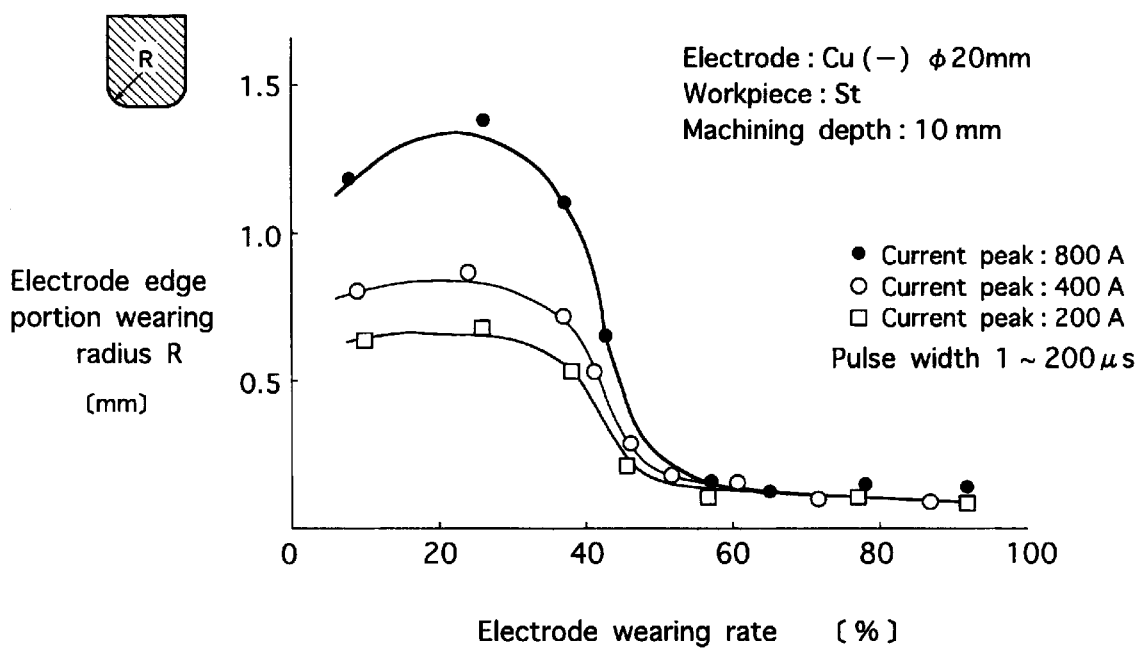
FIG. 15 is a graph showing a relation between an electrode wearing rate and wear of an electrode edge in the electrical discharge machining apparatus of the six embodiment of the invention.
Figure 16A:
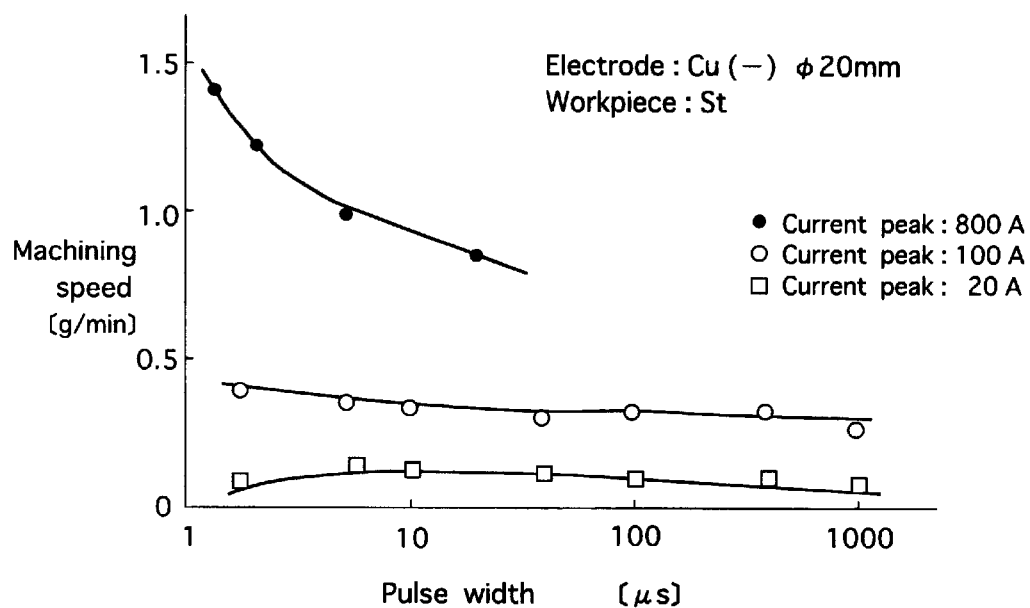
FIG. 16a is a graph showing a relation between pulse width and machining speed in the electrical discharge machining apparatus of the sixth embodiment of the invention.
Figure 16B:
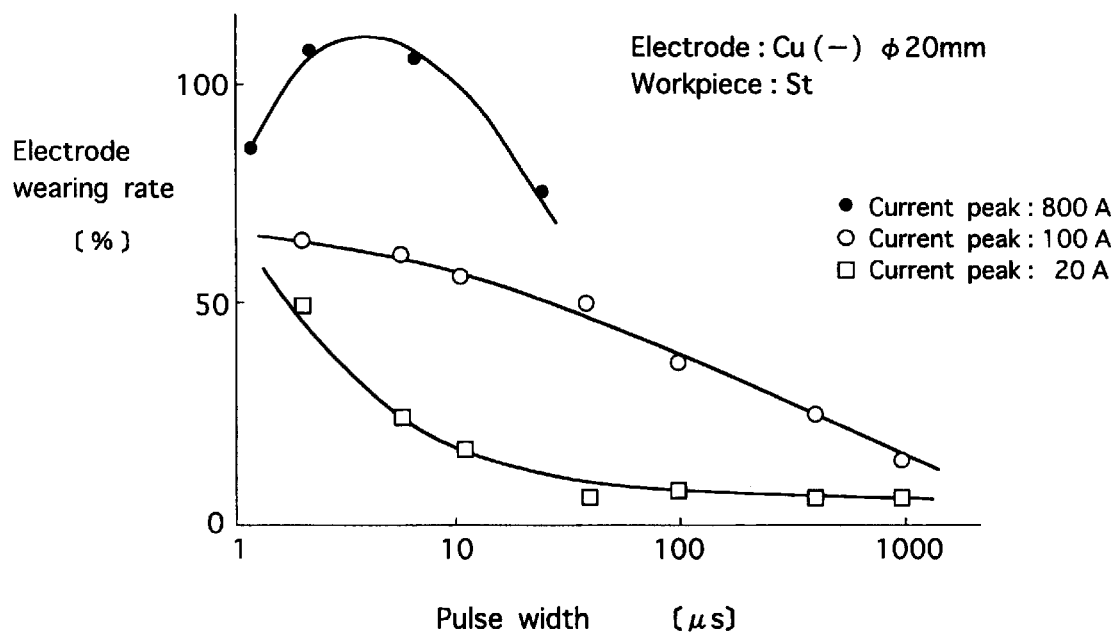
FIG. 16b is a graph showing a relation between the pulse width and the electrode wearing rate.
Figure 17:
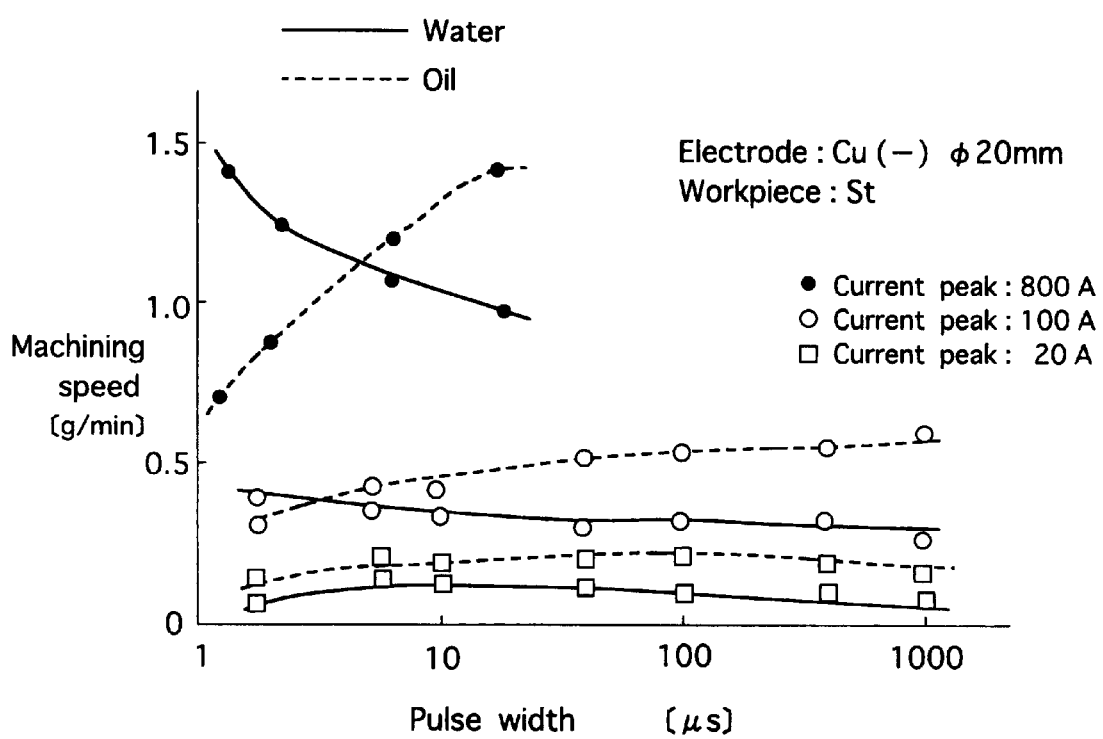
FIG. 17 is a graph showing a relation between the pulse width and the machining speed in the electrical discharge machining apparatus of the sixth embodiment of the invention.

FIG. 13 is a whole structure view of an electrical discharge machining apparatus in a sixth embodiment of the invention. FIG. 14a is an explanatory view of a low wearing condition in an electrical discharge machining of prior art, FIG. 14b is an explanatory view of a wearing condition in an electrical discharge machining of the electrical discharge machining apparatus of the sixth embodiment of the invention. FIG. 15 is a graph showing a relation between an electrode wearing rate and a wear of an electrode edge. FIG. 16a is a graph showing a relation between a pulse width and a machining speed in the electrical discharge machining apparatus in the sixth embodiment of the invention, FIG. 16b is a graph showing a relation between the pulse width and the electrode wearing rate. FIG. 17 is a graph showing a relation between the pulse width and the machining speed in the electrical discharge machining apparatus in the sixth embodiment of the invention.

In FIG. 13, 1 is an electrode of such a simple shape as a tube, cylinder, angular rod, 2 is a workpiece, 8 is a machining power source which applies machining current pulse between poles, 30 is a relative movement control means for synthesizing a feed of the electrode 1 in the Z-axis direction, for correcting a longitudinal wear amount of the electrode, with a feed thereof in the X-Y plane. The control means 30 also controls a repeating movement of the tool path. 32 is a storage means for storing a machining path, 33 is an ion exchanging water as working fluid, 34 is a machining bath, 35 is a working fluid supplying means, 37 is a main shaft means for rotating the electrode 1 of simple shape and driving it in the Z-axis direction.

Next, an operation of the electrical discharge machining apparatus in this embodiment is described referring to FIGS. 13 to 17.

A voltage is applied between the electrode 1 and the workpiece 2 which are facing to each other, and machining of a contour is performed while synthesizing the feed in the Z-axis direction for correcting the longitudinal wear amount of the electrode 1 with the feed in the X-Y plane. Thus, the machining is performed while the electrode is kept stably in a steady shape. As a result, a constant contour can be obtained without compensation for a side surface wear. At that time, the working fluid supplying means 35 supplies the ion exchanging water 33 as the working fluid into the inside of the machining bath 34 and between the poles. Moreover, the machining power source 8 supplies a current of a waveform of high peak and short pulse, the peak of which is 100A or more and pulse width of which is 10 μs or less, between the poles, thereby performing the machining.

In case of performing the machining by this electrode of simple shape 1, a shape of the electrode 1 in the steady state is important. It is necessary to carry out machining while keeping a radius R of an edge portion of the electrode 1 small, as a leading end shape of the electrode, in order to maintain accuracy at the edge portion of a machined work shape. In the machining method of this embodiment, the electrode wear rate has great influence on the shape of the electrode edge portion of the radius R.

For example, as shown in FIG. 14a, in the conventional machining by a common low wearing condition, the wear of the whole electrode 1 is small, however, the edge portion of the electrode 1 is intensively worn and tends to be rounded into a shape of radius R (sagging).

On the other hand, in case of machining while rotating the electrode 1 under a wearing condition as in the present embodiment shown in FIG. 14b, the whole bottom surface of the electrode is worn, so that the shape of the electrode after wearing has a edge portion worn by a small amount. Thus, it is possible to obtain an electrode shape having an edge portion of a smaller radius R. Moreover, FIG. 15 shows a radius R of a worn edge portion of the electrode in relation to the electrode wearing rate, in the present embodiment. It is understood that, the larger the electrode wearing rate, the smaller the radius R of the worn electrode edge tends to be. Moreover, it is understood that, if the electrode wearing rate becomes 40% or more, the electrode wear at the bottom thereof becomes large, and the radius R formed at the electrode edge portion decreases drastically, regardless of the machining conditions. A machining under such conditions is very effective in maintaining accuracy of the edge portion of the machined work shape.

As mentioned above, the present embodiment of the electrical discharge machining apparatus applies voltage between the electrode 1 of simple shape and the work piece 2, performs three-dimensional control by NC control while synthesizing the feed in the Z-axis direction, for correcting the longitudinal wear amount of the electrode 1, with the feed in the X-Y plane, thereby machining a desired three-dimensional shape. The electrical discharge machining apparatus of the present embodiment comprises: a repetition time control means composed of the relative movement control means 30, which controls at least one type of the repeating movement of the tool path while synthesizing the feed in the Z-axis direction for correcting the longitudinal wear amount of the electrode 1 with the feed in the X-Y plane, and the storage means 32, which stores a machining path; the working fluid supplying means 35 for supplying the ion exchanging water 33 as working fluid between poles; and the machining power source 8 for supplying the pulse current of high peak and short pulse, that has a negative polarity at an electrode side, between poles; thereby performing machining under a wearing machining condition of the electrode wearing rate of 40% or more.

Especially in this embodiment, in case water like the ion exchange water 33 is used as the working fluid, as shown in FIG. 16a of which illustrates the machining speed and FIG. 16b of which illustrates the electrode wear rate, in relation to the current pulse width, the waveform of the current pulse has great influence on the machining speed and the electrode wear. First, with respect to the machining speed, as a matter of course, the higher the current peak is, the higher the machining speed. With respect to the pulse width, it is understood that, when a current peak is 100A or less, there is little change in the speed to the pulse width. However, with respect to a high current peak such as 800A, to the contrary, the machining speed improves when the pulse width is smaller. In such an area, in case the electrode polarity is positive (+), the machining efficiency is remarkably lowered. Next, with respect to the electrode wear, the smaller the pulse width is, the more the electrode wear increase. It is understood that an electrode wearing rate of 40% or more is obtained in an area of a pulse width of 20 microseconds ($\mu$s) or less and a current peak of 100A or more.

Accordingly, the present embodiment of the electrical discharge machining apparatus applies voltage between the electrode 1 of simple shape and the work piece 2, performs three-dimensional control by the NC control while synthesizing the feed in the Z-axis direction, for correcting the longitudinal wear amount of the electrode 1, with the feed in the X-Y plane, thereby machining a desired three-dimensional shape. The electrical discharge machining apparatus of the present embodiment comprises: a repetition time control means composed of the relative movement control means 30, which controls at least one type of the repeating movement of the tool path while synthesizing the feed in the Z-axis direction for correcting the longitudinal wear amount of the electrode 1 with the feed in the X-Y plane, and the storage means 32, which stores a machining path; the working fluid supplying means 35 for supplying the ion exchanging water 33 as working fluid between the poles; and the working power source for applying a bipolar voltage between the poles and supplying the pulse current of high peak and short pulse, that has a negative polarity at the electrode side, between the poles, only when an electrical discharge is generated while the electrode side is negative polarity; thereby performing machining under the wearing machining condition of the electrode wearing rate of 40% or more.

Moreover, in the present embodiment of the electrical discharge machining apparatus, the machining power source supplies the pulse current of high peak and short pulse between the poles, while using a pulse current whose peak value is 100A or more and whose pulse width is 20 microseconds ($\mu$s) or less.

FIG. 17 shows a graph in which the machining speed is compared between the case of using oil (kerosine) and the case of using the ion exchanging water 33 as working fluid. It is understood that, in an area where the pulse width is large, the machining speed by oil is about two or three times faster than that by water. To the contrary, in an area where the pulse width is small, the machining speed by water is faster than that by oil. Such tendency is outstanding specially when the current peak is high.

Accordingly, from the results of FIGS. 14a–14b to FIG. 17, it is understood that, if a machining of three-dimensional shape is performed while repeating the machining path by the electrode 1 of simple shape, it is necessary to use not oil but the ion exchanging water 33 as working fluid and to perform machining by the current pulse in the area where the current peak is high and the pulse width is short, in order to perform machining with high machining speed and high accuracy at the edge portion of the machined work shape.

Seventh Embodiment

The sixth embodiment shows an example in which DC voltage is applied from the machining power source 8. However, if the machining is performed while the electrode 1 has a negative polarity, corrosion, rust or discoloration may be produced at the workpiece 2 side due to electrolytic action. In such case, it is possible to perfectly prevent the corrosion due to the electrolytic action by applying a bipolar voltage from the machining power source 8 and, after the electrical discharge is generated owing to the above bipolar voltage, supplying a pulse current of high peak and short pulse, wherein the electrode 1 is negative, between the poles. In case of a die machined by use of such machining power source 8, there is no deterioration on the machined surface or the surface of the workpiece 2, so that advantageous effects are obtained such as the lifetime of the die improves largely.

Moreover, it is common to use copper as a material of an electrode for electrical discharge machining. However, it has been experimentally clarified that, if water is used as the working fluid and machining is performed with the current of waveform of high peak and short pulse like the present embodiment, it is better to use brass as an electrode material. In this case, there arises less frequently a short circuit and the machining speed improves highly. The below table shows its experimental data. From the table, it is understood that the machining speed improves about twice as much as that by copper.

Accordingly, the electrical discharge machining apparatus of the embodiment uses brass for the electrode 1 of simple shape.

TABLE 1

| Material | Machining speed (g/min) | Wear rate (%) |
|---|---|---|
| Copper | 1.02 | 108.3 |
| Brass | 2.11 | 79.9 | wherein: current peak is 1,000A
current pulse width is 10 microseconds

Eighth and Ninth Embodiments

Figure 18:
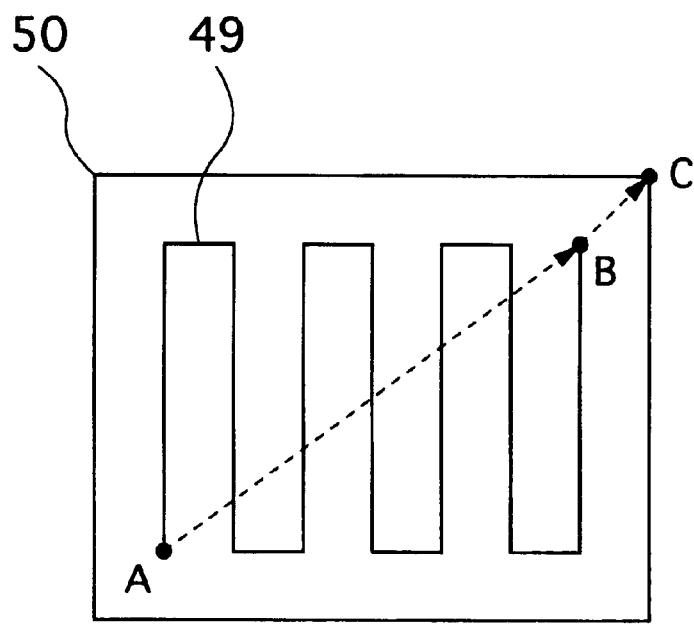
FIG. 18 are explanatory plan views showing examples of an electrical discharge machining method and its apparatus of an eighth embodiment of the invention.
Figure 18:
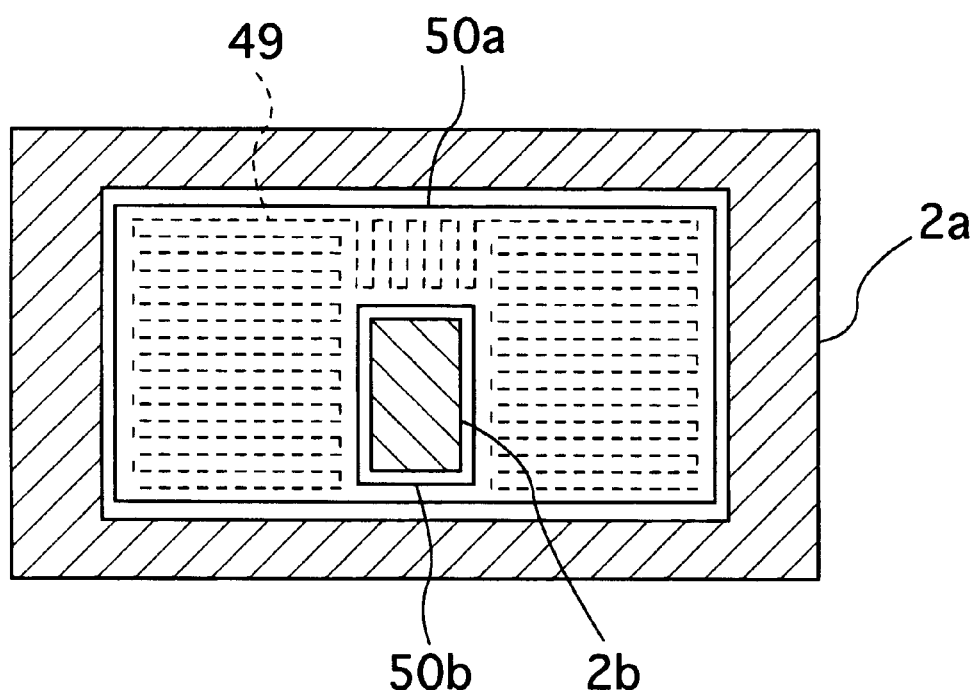
Figure 19:
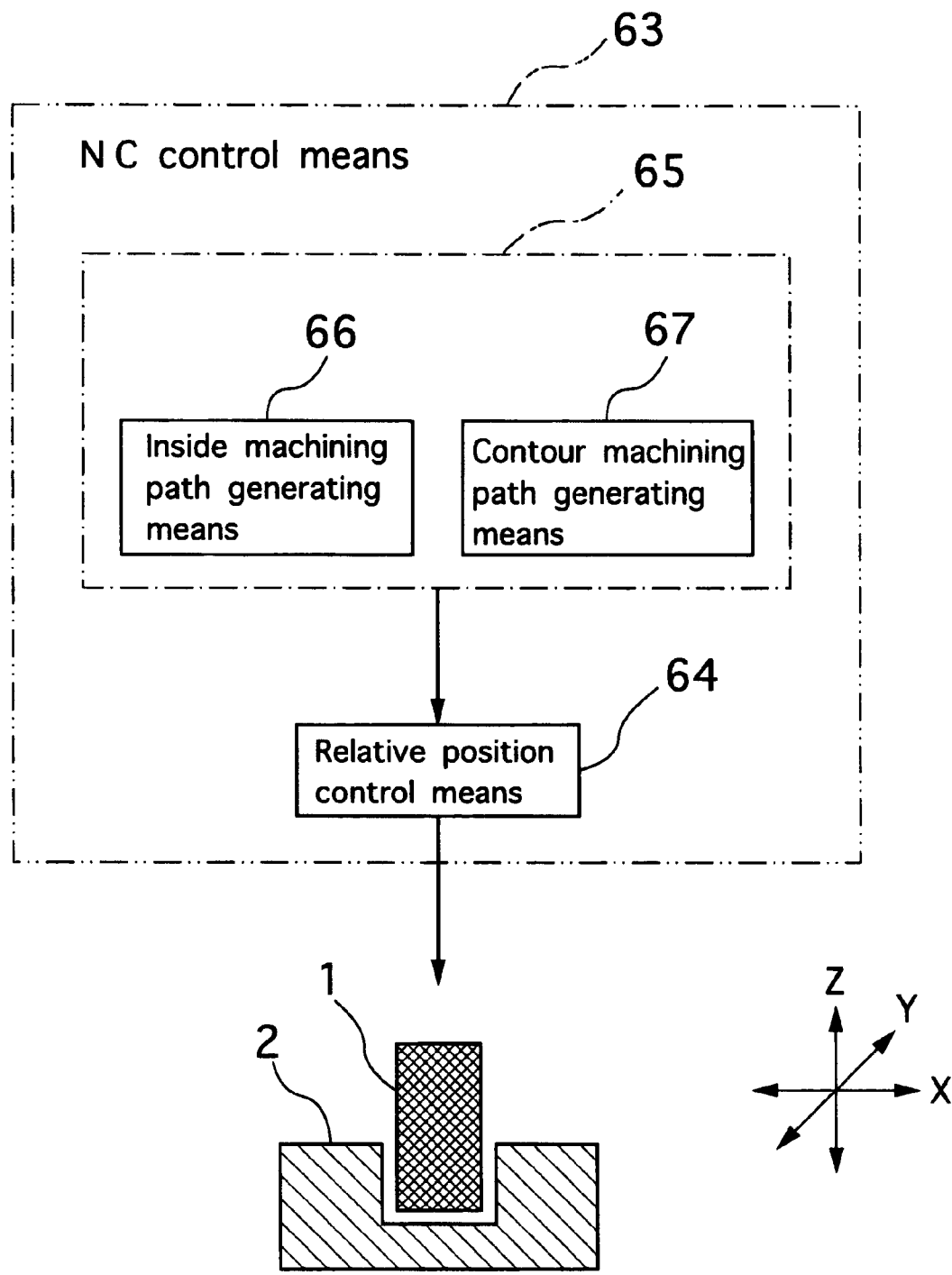
FIG. 19 is a schematic block diagram showing an entire structure of the eighth embodiment of the electrical discharge machining apparatus of the invention.
Figure 20:
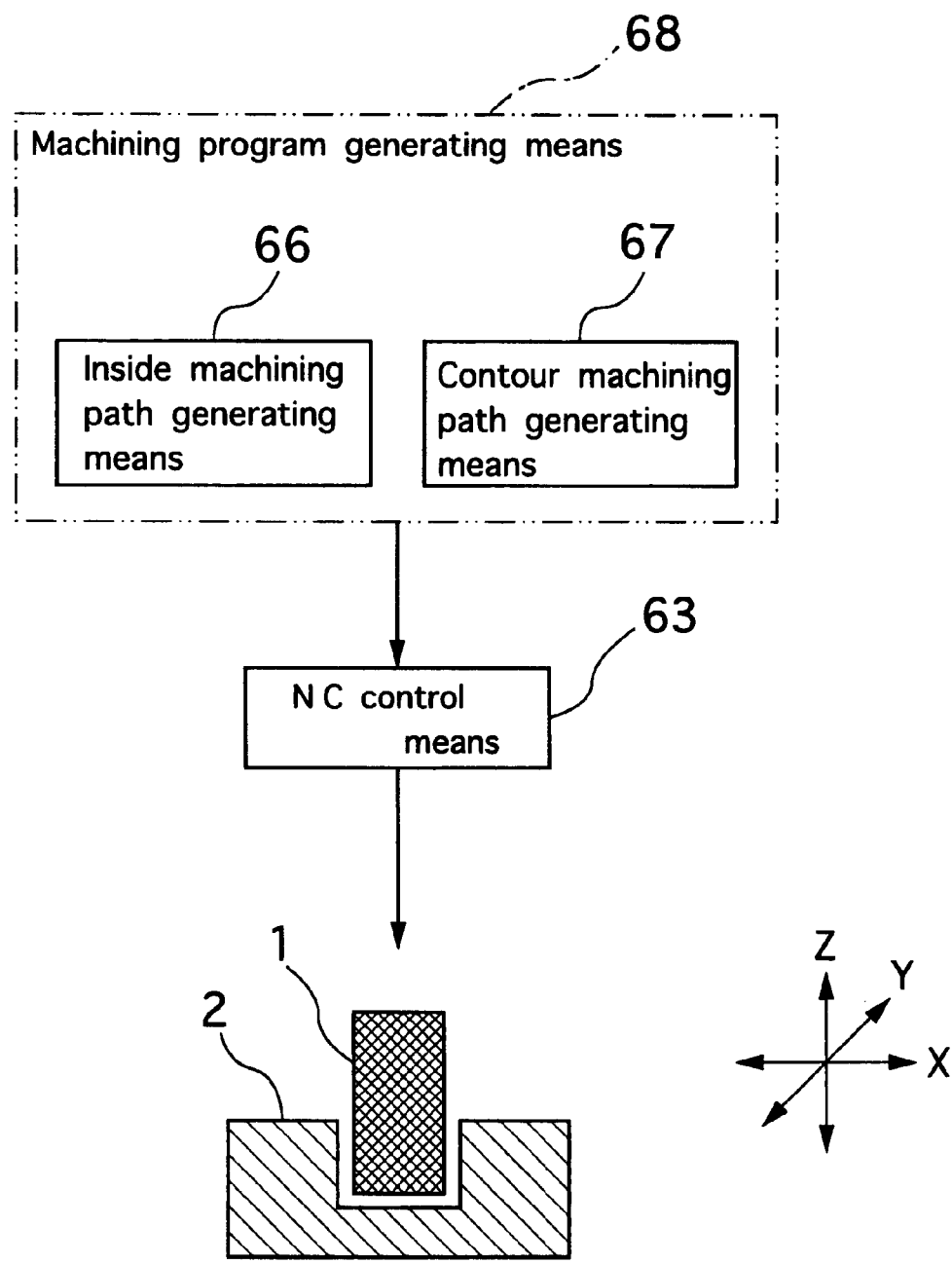
FIG. 20 is a schematic block diagram showing an entire structure of an electrical discharge machining method and its apparatus of a ninth embodiment of the invention.

FIG. 18 is an explanatory plan view showing an example of an electrical discharge machining method and its apparatus in an eighth embodiment of the invention. FIG. 19 is a schematic block diagram showing an entire structure of the eighth embodiment of the electrical discharge machining apparatus of the invention. FIG. 20 is a schematic block diagram showing an entire structure of the electrical discharge machining method and its apparatus of a ninth embodiment of the invention.

In FIG. 18, 2a is a outer peripheral portion of a workpiece cavity, 2b is an unremoved portion inside the workpiece cavity. Machining is performed at a part surrounded by the outer peripheral portion 2a of the workpiece cavity and the unremoved portion 2b inside the workpiece cavity. Element 49 is an inside shape path for machining an inside of such a machined part, Element 50 shows a contour path of the machined part, wherein 50a is a outer peripheral contour path of the cavity, and 50b is a unremoved contour path of the unremoved portion 2b.

In FIG. 19, element 1 is an electrode, element 2 is a workpiece, element 63 is an NC control means, element 64 is a relative position control means for performing relative position control of the electrode 1 and the workpiece 2. Element 65 is a machining path generating means provided inside the NC control means 63. It has an inside machining path generating means 66 for generating the inside shape path 49 and a contour machining path generating means 67 for generating the contour path 50.

Next, an operation of the electrical discharge apparatus of the present embodiment is described.

As in the prior art, machining for the contour is performed by applying voltage between the electrode 1 and the workpiece 2, which are faced to each other, and synthesizing a feed of the Z-axis direction for correcting a longitudinal wear amount of the electrode 1 with the feed in a horizontal direction (x-Y direction), namely, an X-Y plane feed. A constant contour is obtained without compensation for a side surface wear if the machining is carried out while the electrode is kept stably in a steady shape.

As mentioned above, the present embodiment of the electrical discharge machining apparatus applies voltage between the electrode 1 of simple shape and the work piece 2, performs three-dimensional control by NC control while synthesizing the feed in the Z-axis direction for correcting the longitudinal wear amount of the electrode 1 with the feed in an X-Y plane, thereby machining a desired three-dimensional shape. The electrical discharge machining apparatus of the present embodiment comprises: the inside machining path generating means 66 for generating the inside shape path for a machined shape; and the contour machining path generating means 67 for generating the contour path for the machined shape; thereby performing machining while moving the above inside shape path and the contour path repeatedly.

Moreover, the present embodiment of the electrical discharge machining method applies voltage between the electrode 1 of simple shape and the work piece 2, performs three-dimensional control by the NC control while synthesizing the feed in the Z-axis direction for correcting the longitudinal wear amount of the electrode 1 with the feed in the X-Y plane, thereby machining a desired three-dimensional shape. The electrical discharge machining method of the present embodiment carries out the machining by repeatedly moving the inside machining path, for generating the inside shape path in a processed shape, and the contour machining path, for generating the contour path in a processed shape.

Describing more specifically, in FIG. 19, machining path is generated in the machining path generating means 65, which is provided inside the NC control means 63, prior to the machining. Different from the prior art, the machining path generating means 65 is composed of the inside machining path generating means 66 for generating the inside shape path 49 and the contour machining path generating means 67 for generating the contour path 50. The inside machining path generating means 66 generates the inside shape path 49 shown in FIG. 18, and the contour machining path generating means 67 generates the peripheral contour path 50a of the cavity and the remained contour path 50b of the unremoved portion 2b shown in FIG. 18.

With respect to the generation of the machining path, first, a machining area (a portion surrounded by the peripheral portion 2a of the workpiece cavity and the unremoved portion 2b of the workpiece cavity in the example of shape of FIG. 18) is defined. Next, the contour path 50a along the peripheral contour of the machining area is generated by the contour machining path generating means 67. If there is a portion at which the work is remained unremoved like the unremoved portion 2b in the workpiece cavity inside the defined machining area, the remained contour path 50b at this portion is generated at the same time. Then, the inside shape path 49, which is enclosed by the peripheral contour path 50a and the unremoved contour path 50b, is generated by the inside machining path generating means 66. At that time, such a path is generated as a removed amount is substantially the same. Moreover, a free running path is added to connect continuously the inside shape path 49, peripheral contour path 50a and unremoved contour path 50b. This free running path is generated as a path for traveling the electrode once after raising it along the Z-axis.

In this machining, after the machining of the inside shape path 49 from A to B by the relative position control means 64, the electrode is raised and moved along the Z-axis (free running) to the peripheral contour path 50a from B to C. Thereafter, the electrode is lowered along the Z-axis again and machines the peripheral contour path 50a. Moreover, after finishing machining the peripheral contour path 50a, the electrode is raised along the Z-axis and made freely run to a position of the contour path 50b. Thereafter, the electrode is lowered along the Z-axis to perform machining of the unremoved contour path 50b. The reason why the electrode is retracted along the Z-axis and made freely run in the movement from one path to another path is to prevent ununiformity in a removed amount due to machining in moving, since such a ununiformity causes a machining error in a depth direction. The machining of a desired depth is performed while repeating such a machining path.

In the machining in the prior art, a flash or a unremoved portion is produced along an edge of a layer after electrical discharge machining, so that it is necessary to change the machining path pattern in order to remove the remaining material along the edge, each time the layer is changed from one to another. However, in the present embodiment, since the inside shape path 49 and the contour path 50 are respectively generated and the machining is performed while repeating these machining paths, it is possible to prevent any flashes or remained portions along the edge of the layer from being produced after electrical discharge machining. Thus, it is unnecessary to prepare many types of machining paths as in the prior art. Moreover, it is possible to prevent generation of the machining errors by raising the electrode along the Z-axis once it moves from one machining path to another machining path so as to freely run.

While this embodiment shows an example in which the machining path is generated inside the NC control means 63, an external machining program generator may be used for the generation of the machining path. FIG. 20 illustrates an embodiment in which the inside shape path 49 and the contour path 50 are generated by using an external machining program generating means 68.

Namely, in the present embodiment, the external machining program generating means 68 analyzes the data of the NC control means 63 and generates the machining path.

As mentioned above, the present embodiment of the electrical discharge machining method applies voltage between the electrode 1 of simple shape and the workpiece 2, performs three-dimensional control by the NC control while synthesizing the feed in the Z-axis direction for correcting the longitudinal wear amount of the electrode 1 with the feed in the X-Y plane, thereby machining a desired three-dimensional shape. The electrical discharge machining method of the present embodiment performs machining of a machined shape, which has a side surface of an optional angle, by repeatedly machining it while gradually reducing or inwardly changing the contour path of a machined shape.

Tenth Embodiment

Figure 21:
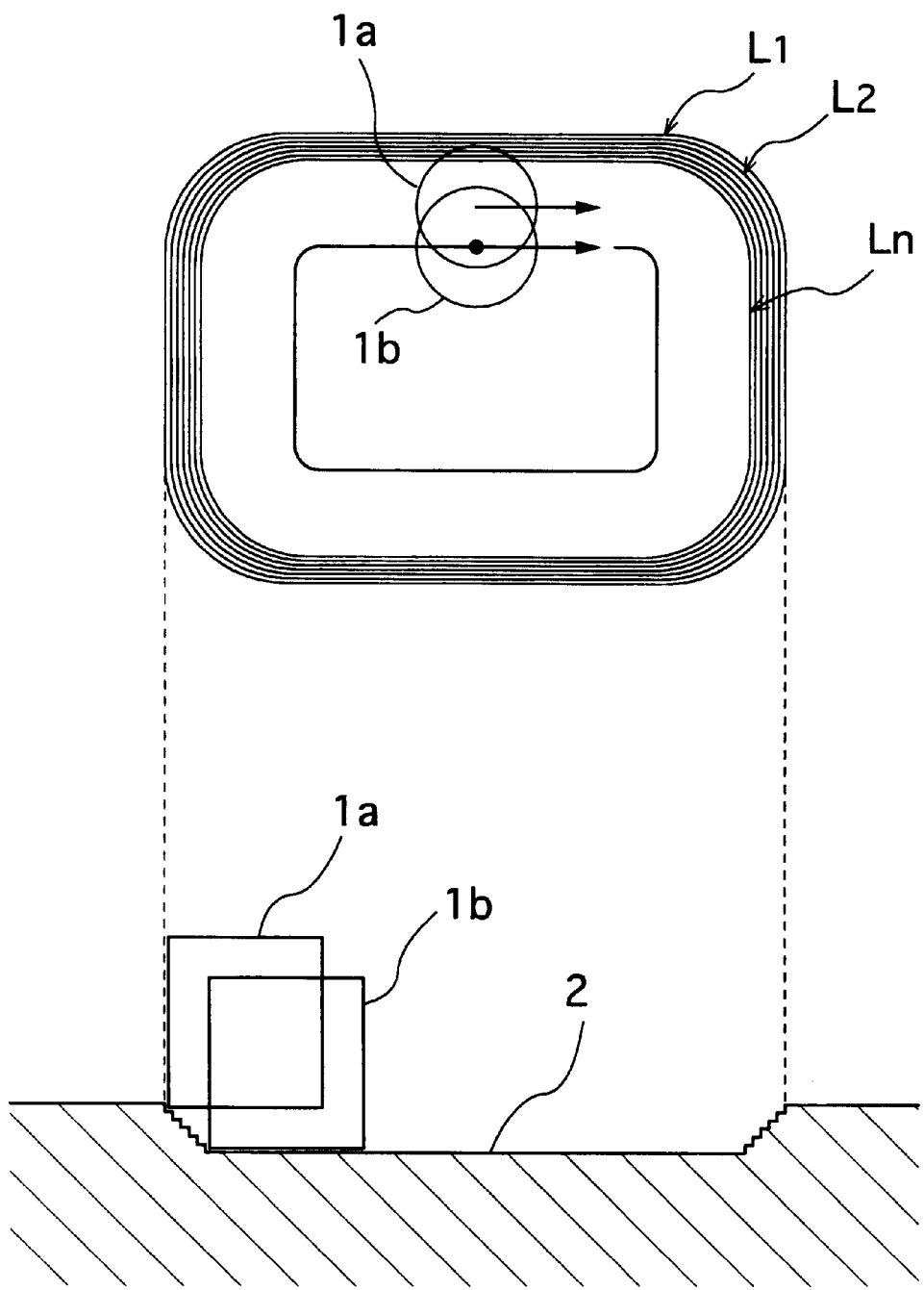
FIG. 21 is an explanatory view showing an electrical discharge machining operation of a tenth embodiment of an electrical discharge machining apparatus of the invention.

FIG. 21 is an explanatory view showing an electrical discharge machining operation of a tenth embodiment of an electrical discharge machining apparatus of the invention. An entire structure of this embodiment is the same as FIG. 19, which is shown by a schematic block diagram, so that its description is omitted. 1*a* is an electrode position on an uppermost surface of a workpiece 2, L1 is a locus of a circumference along which the electrode 1a moves on the uppermost surface of the workpiece 2, 1*b* is an electrode position on a final machining bottom surface of the workpiece 2, Ln is a locus of a circumference along which the electrode 1*b* moves on the final machining bottom surface of the workpiece 2.

Next, the electrical discharge machining operation of this embodiment is described.

As in the eighth embodiment, a machining of a contour is performed while applying voltage between an electrode 1 and the workpiece 2, which are faced to each other, and synthesizing a feed in a Z-axis direction for correcting a longitudinal wear amount of the electrode 1 with the feed thereof in an X-Y plane. A constant contour can be obtained without any compensation for a side surface wear of the electrode, when the machining is carried out while the electrode is kept stably in a steady shape.

In this embodiment, a plurality of paths of the loci L1–Ln are generated as the before-mentioned contour paths. These loci L1–Ln are generated so as to define such paths as their shapes become smaller gradually at regular intervals. The present embodiment in the figure is shown as if steps of stair shape are formed at the circumference, for the convenience of description. However, as a matter of course, they are formed into a smooth and continuous straight line or curved line in practising it into concrete examples.

In the machining operation, after machining of the inside shape path, not shown, by a relative position control means 64, the electrode is raised once along the Z-axis and moved (free running) to a peripheral contour path 50*a*. Then, a machining is performed on the circumferential locus L1 of an outermost contour after lowering the electrode again along the Z-axis. Moreover, after finishing the machining of the circumferential locus L1 of the contour, the electrode is raised along the Z-axis, and a machining is performed again on the inside shape path. Next, a machining is performed on a locus L2. In this way, the machining is repeated on the loci L1→L2→ - - - →Ln of the contour, so that a cavity having a side surface shape with a constant inclination is machined, as shown in FIG. 21.

As mentioned above, the present embodiment of the electrical discharge machining method applies voltage between the electrode 1 of simple shape and the workpiece 2, performs three-dimensional control by NC control while synthesizing the feed in the Z-axis direction for correcting the longitudinal wear amount of the electrode 1 with the feed in the X-Y plane, thereby machining a desired three-dimensional shape. The electrical discharge machining method of the present embodiment is the one for: performing machining of a desired shape having an optional side surface by repeatedly machining while gradually reducing or inwardly changing the contour path in a machined shape.

Accordingly, for example, though a machining method for an inclined surface is shown in the prior art shown in *Electrical Processing Society Journal* (See Vol. 18, No. 36 (1984), pp. 11–17, Kaneko and Tsuchiya: "Three-dimensional Control Electrical Discharge Machining by a Tubular Electrode (fifth report)"), this conventional method performs machining by using only an edge portion of the electrode, so that the electrode shape changes as the machining advances. Therefore, it was necessary to correct a machining error caused by such a change in the electrode shape. However, in the method of the present embodiment, the machining is carried out by us of the whole bottom surface of the electrode over all the loci L1–L2, so that the electrode shape is steady. Therefore, there is no more necessity to correct a machining error caused by the change in the electrode shape as in the prior art. Thus, it is possible to obtain an inclined side surface shape with an extremely high accuracy.

Eleventh Embodiment

Figure 22:
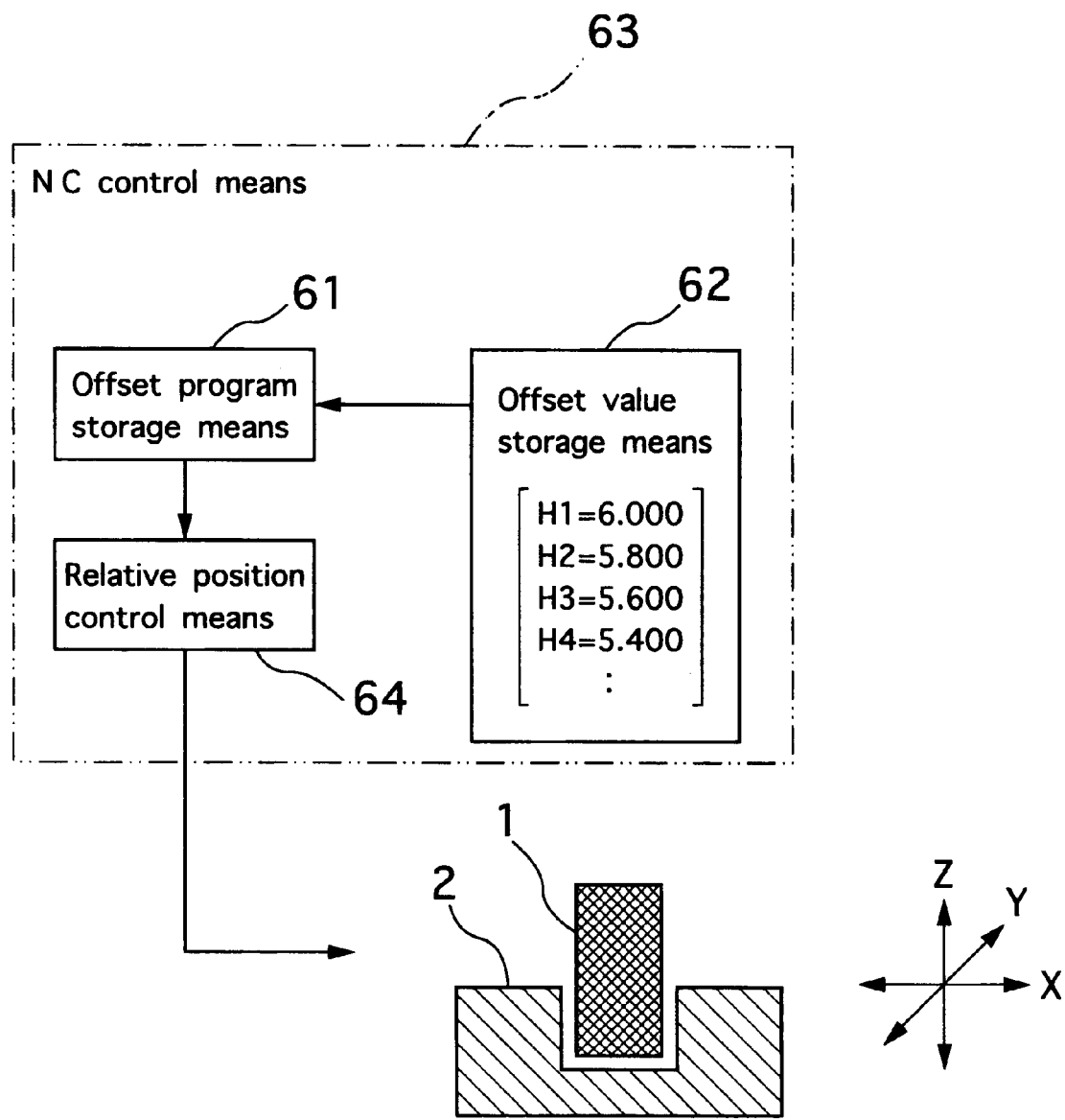
FIG. 22 is a schematic block diagram showing an entire structure of an eleventh embodiment of an electrical discharge machining apparatus of the invention.
Figure 23:
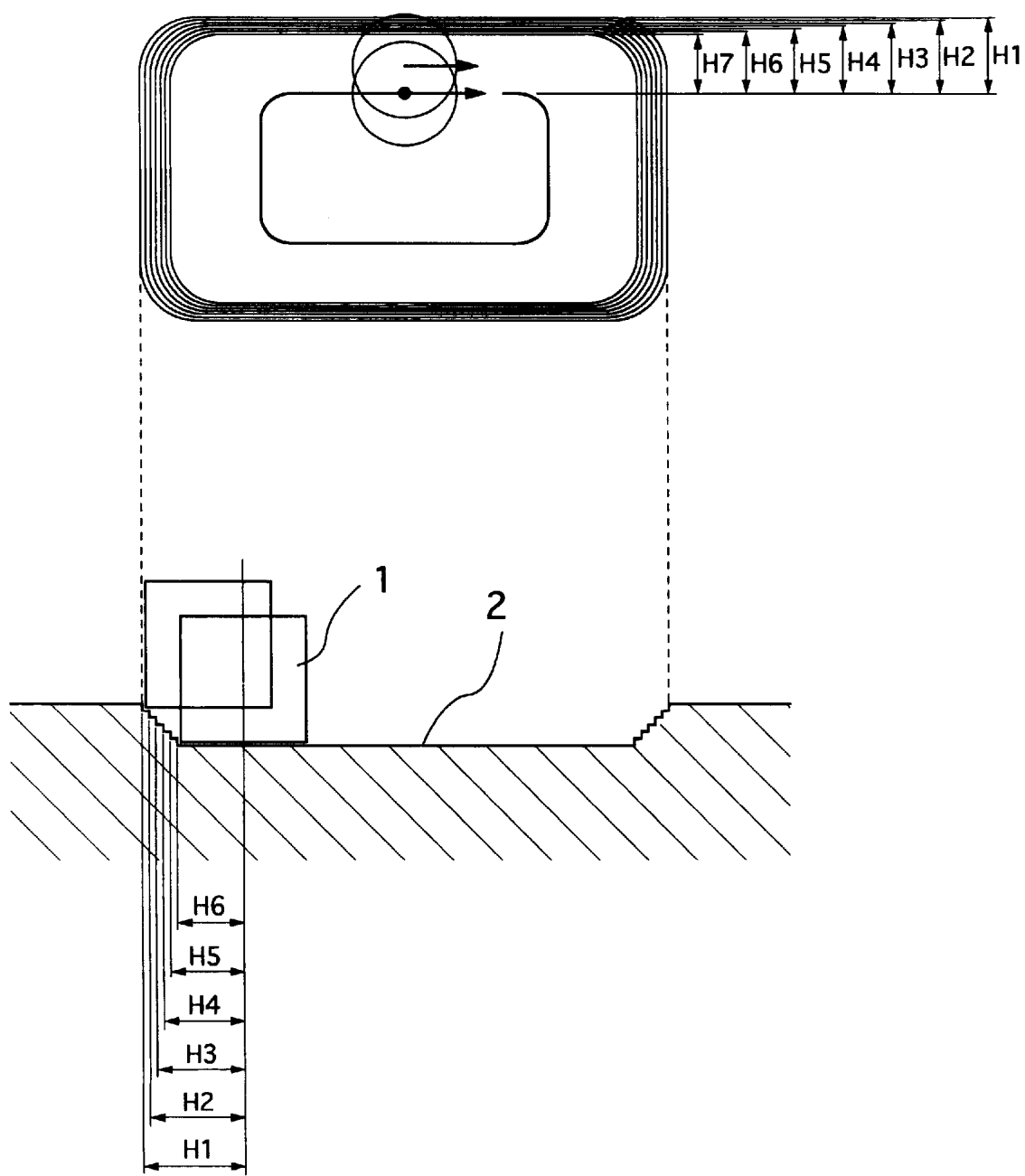
FIG. 23 is an explanatory view showing an electrical discharge machining operation of the eleventh embodiment of the electrical discharge machining apparatus of the invention.
Figure 24:
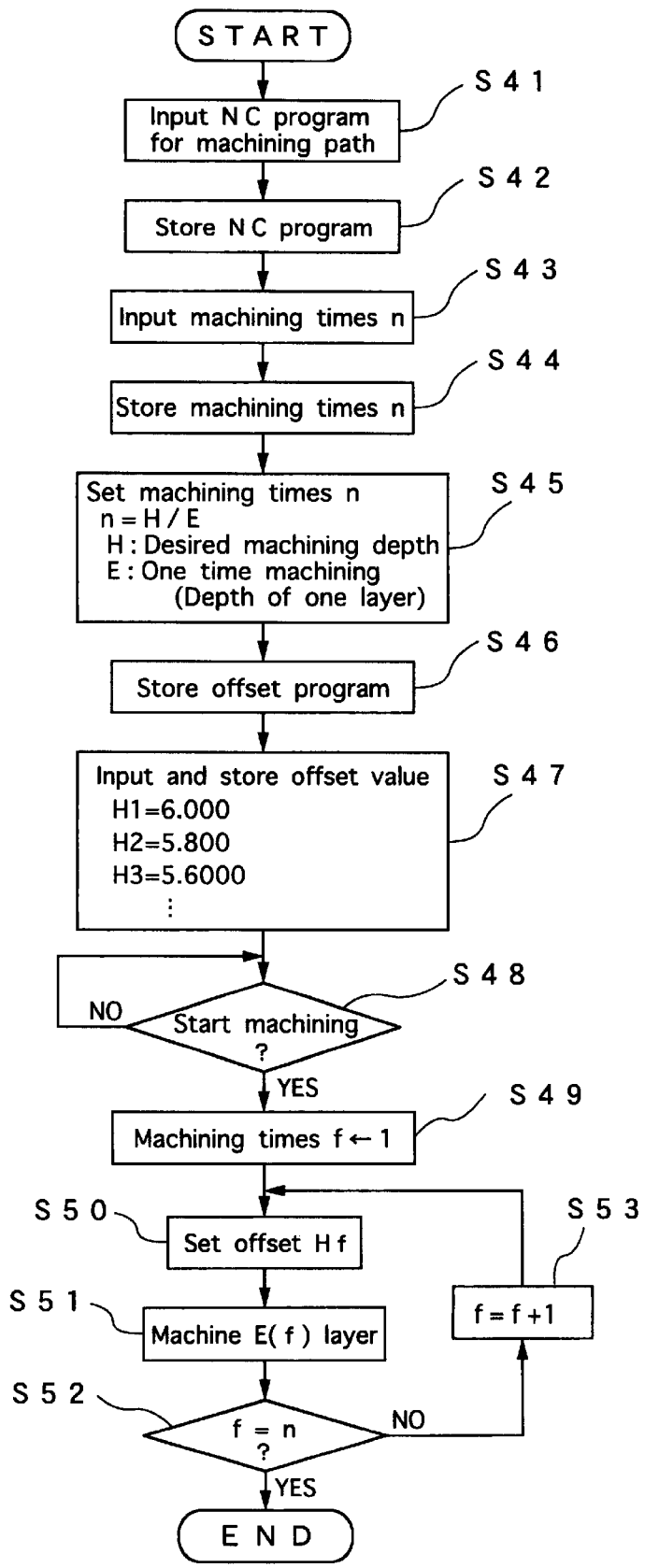
FIG. 24 is a flowchart for executing the electrical discharge machining operation of the eleventh embodiment of the electrical discharge machining apparatus of the invention.
Figure 25:
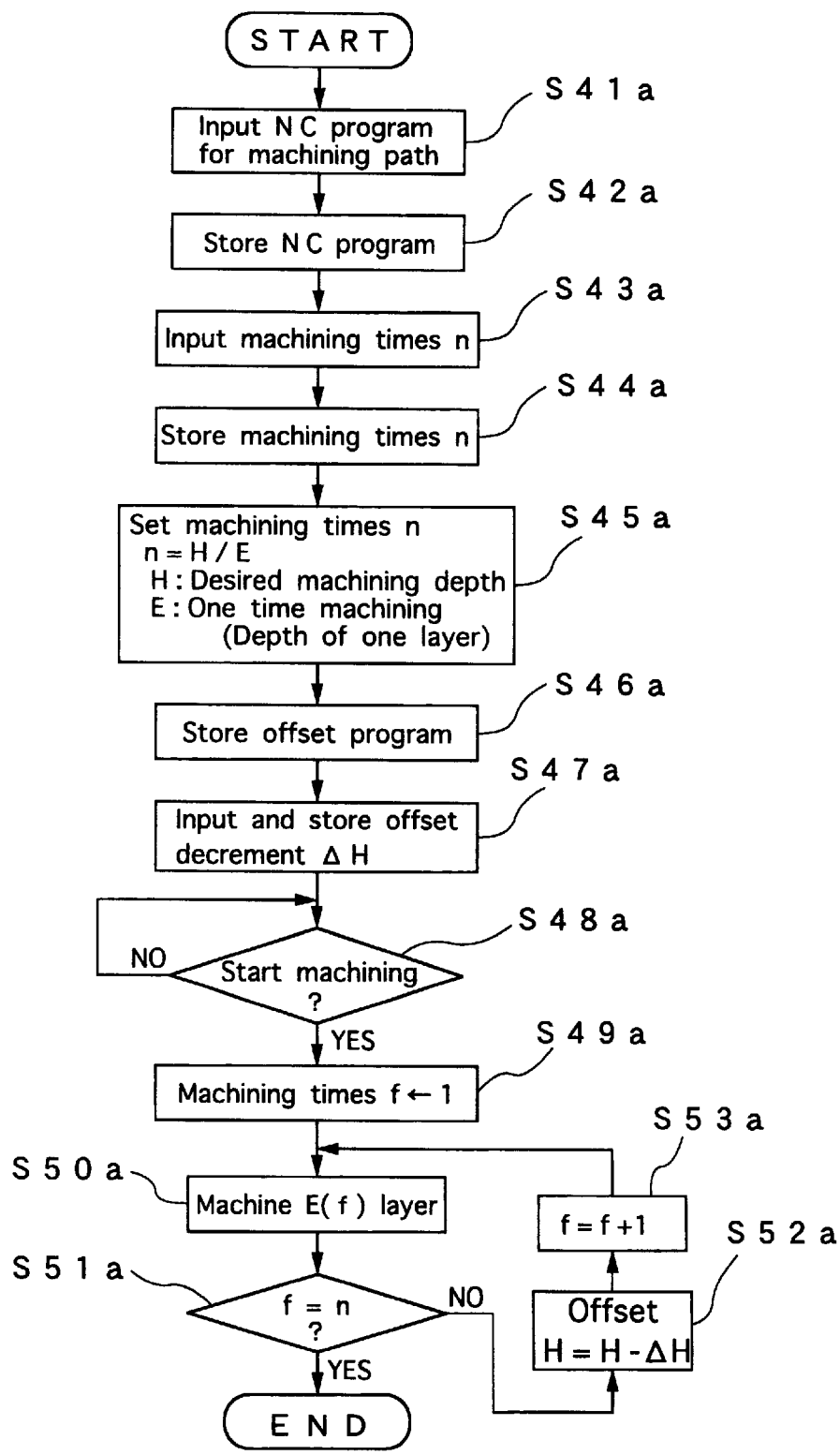
FIG. 25 is a flowchart of other examples for executing the electrical discharge machining operation of the eleventh embodiment of the electrical discharge machining apparatus of the invention.

FIG. 22 is a schematic block diagram showing an entire structure of an eleventh embodiment of an electrical discharge machining apparatus of the invention. FIG. 23 is an explanatory view showing an electrical discharge machining operation of the eleventh embodiment of the electrical discharge machining apparatus of the invention. FIG. 24 is a flowchart of a program for executing the electrical discharge machining operation in the eleventh embodiment of the invention. FIG. 25 is a flowchart of another example of a program for executing the electrical discharge machining operation in the eleventh embodiment of the invention.

In the figures, element 1 is an electrode, element 2 is a workpiece, element, element 63 is an NC control means, element 64 is a relative position control means for performing a relative position control of the electrode 1 and the workpiece 2, Element 61 is an offset program storage means for storing the contour path 50 of the machining shape of the workpiece as a program having an offset information, Element 62 is an offset value storage means for storing a plurality of offset values of the contour path 50 which are changed during machining, H1–Hn are offsets of the contour path at a machining of "n" time, respectively.

Next, an operation of this embodiment will be described.

As in the tenth embodiment, voltage is applied between the electrode 1 and the workpiece 2, which are faced to each other. Then, machining is carried out on the contour while synthesizing a feed in a Z-axis direction for correcting a longitudinal wear amount of the electrode 1 with the feed thereof in an X-Y plane. This machining is performed while the electrode shape is kept stably in a steady shape. Thus, a constant contour can be obtained without any compensation for a side surface wear of the electrode.

In this embodiment,the contour path is defined by a program having offsets, and offset values in the machining of each layer are set and stored beforehand. Thereby, the machining is carried out while changing the contour path step by step.

Namely, in FIG. 23, the offset values H1–Hn in each layer are stored in the offset value storage means 62 prior to machining. The relative position control means 64 repeats machining while making the contour gradually smaller on the basis of these offset values H1–Hn and the contour program having offsets stored in the offset program storage means 61.

Thus, after machining of the inside shape path, not shown, by the relative position control means 64, the electrode is raised once along the Z-axis and moved (free running) to the contour path. Then, the machining of the contour is performed by the outermost offset value HI after lowering the electrode again along the Z-axis. Then, after finishing the machining of the locus L1, the electrode is raised along the Z-axis, and the machining is performed again on the inside shape path. Next, the machining of the contour is performed by the offset value H2. In this way, the machining is repeated step by step on the contour by the offset value H1→H2→ . . . → Hn, so that a cavity having a side surface shape with a constant inclination is machined as shown in FIG. 23. The embodiment is shown in the figure as if steps of stair shape are formed at the circumference, for the convenience of description. However, as a matter of course, they are formed into a smooth and continuous straight line or curved line in practising the embodiment in concrete examples.

Usually, these processes are controlled under a program control by the NC control means 63, as shown in FIG. 24.

First of all, an NC program of the contour path is inputted in step S41, and the inputted NC program is stored in step S42. Number of machining times "n" for dividing the machining shape into the contour paths is inputted in step S43, and it is stored in step S44. Next, a depth "E" of one layer is computed as E=H/n on the basis of the relation between the number of machining times n, a desired machining depth H and the one layer depth E for performing one time machining, in step S45. An offset program is stored on the basis of the one layer depth E in step S46. Offset values are inputted corresponding the respective numbers of machining times, and such offset values are stored in step S47. In the present embodiment, a case in which the offsets are inputted and stored corresponding to the respective numbers of machining times has been described. However, it is possible to perform automatic allocation of the offset values corresponding to the respective numbers of machining times on the basis of the relation between the one layer depth E, which is calculated from step S43 to step S45, and the machining depth H or the relation between the machining times number n and the machining depth H. In this case, it is possible to equally allocate the one layer depths E or allocate it with some weight according to the position.

If it is decided that the machining has started in step S48, an initial value 1 is set as a value t of a memory which stores the number of machining times in step S49. An offset Hf is set as H1 in step S50, and machining is carried out for a layer E(f), e.g., E(1) for the first layer, according to the value f of the number of machining times which are stored in the memory, in step S51. It is decided in step S52 whether the value f of the memory becomes the machining times n or not. The value f of the memory is incremented in step SS3, and a routine from step S50 to step S53 is performed repeatedly till the memory value f becomes the machining times n. When the memory value f becomes the machining times n, this routine is exited.

Moreover, the program control shown in FIG. 24 can be modified into a program control shown in FIG. 25 by the NC control means 63.

The NC program of the contour path is inputted in step S41a, and the inputted NC program is stored in step S42a. Numbers of machining times n for dividing the machined shape into the contour paths are inputted in step S43a, and they are stored in step S44a. Next, one layer depth E is computed as E=H/n on the basis of the relation between a desired machining depth H, one layer depth E for performing one time machining and the machining times number n, in step S45a. An offset program is stored on the basis of the one layer depth E in step S46a. Then, a variation ΔH which is decreased every time is inputted as an offset value, and the variation which is decreased every machining time is stored in step S47a. This embodiment is described with respect to the case in which the variation ΔH, which is decreased every machining time, is inputted and stored. However, it is possible to automatically allocate it as the one layer depth E, which is calculated from step S43a to step S45a, is equal to ΔH (E=ΔH), or allocate the variation ΔH, which is decreased every machining time, on the basis of the relation between the machining times n and the machining depth H. In this case, it is possible to equally allocate the one layer depth E=ΔH or allocate it with some weight according to the position.

If it is decided that the machining has started in step S48a, an initial value 1 is set as a value f of a memory which stores the number of machining times in step S49a. Layers E(f), corresponding to the machining times, are machined in step S50a. It is decided whether the memory value f becomes the machining times n or not in step S51a. The offset H is renewed as H=H−ΔH in step S52a, the value f of the memory is incremented in step S53a, and a routine from step S50a to step S53a is executed repeatedly till the memory value f becomes the machining times n. When the memory value f becomes the machining times n, this routine is ended.

The present embodiment of the electrical discharge machining apparatus applies voltage between the electrode 1 of simple shape and the workpiece 2, performs three-dimensional control by NC control while synthesizing the feed in the Z-axis direction for correcting the longitudinal wear amount of the electrode 1 with the feed in the X-Y plane, thereby machining a desired three-dimensional shape. The electrical discharge machining apparatus of the present embodiment comprises: the offset program storage means 61 for storing the contour path in a machined shape in step S41 to step S45 or step S41a to step S45a as a program, which is given offset information in step S47 or step S47a; and the offset value storage means 62 for storing a plurality of offset values, which change during machining in step S48 to step S53 or in step S48a to step S53a; thereby obtaining a shape having a side surface with an optional angle by repeatedly machining while changing the above offset value step by step.

Thus, even if an electrode wear amount is large, a Z-axis feed of a correcting moving amount ΔZu is performed each time a locus moving distance L in the X-Y plane during machining reaches a correction unit interval ΔL, which is a standard for performing correction in the Z-axis direction. Therefore, it is possible to remove a layer of a machining depth in which the electrode wear amount and an electrode feed amount are balanced, to decrease machining technique data manually inputted for correcting an electrode wear, and to realize the electrode wear correction in easier way. Moreover, it is possible to improve machining accuracy even if the electrode wear amount is large. Therefore, in a three-dimensional machining using an electrode of simple shape, high machining speed and machining accuracy which have not been in the prior art can be obtained.

Particularly, in the present embodiment, the contour path is defined as the program having offsets, as compared with the before mentioned embodiment, so that it is possible to machine an inclined side surface shape by defining only one contour program. Therefore, the programming is easy, and it is possible to improve machining shape accuracy at an edge portion. Moreover, it is possible to easily machine a side surface of a three-dimensional shape and improve machining accuracy at a corner portion.

Twelfth Embodiment

Figure 26:
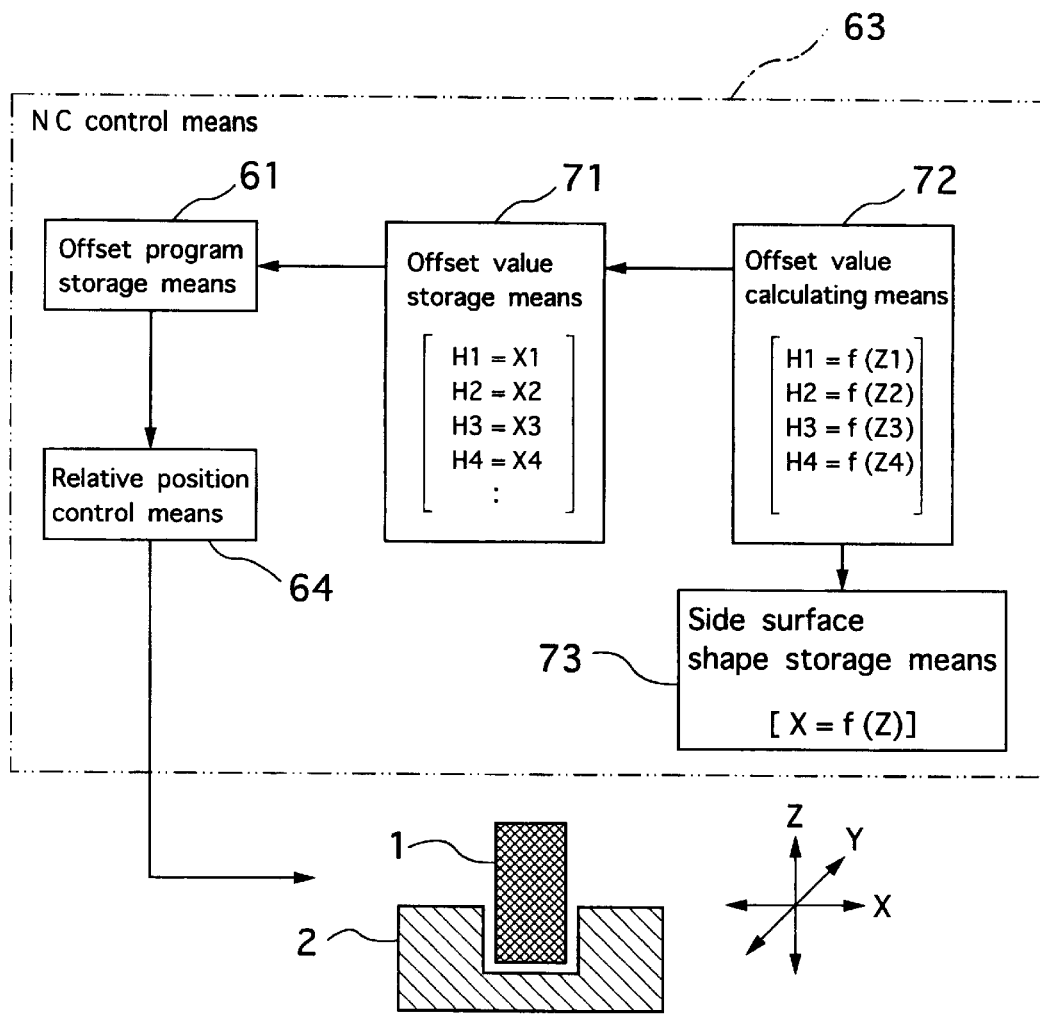
FIG. 26 is a schematic block diagram showing an entire structure of a twelfth embodiment of an electrical discharge machining apparatus of the invention.
Figure 27:
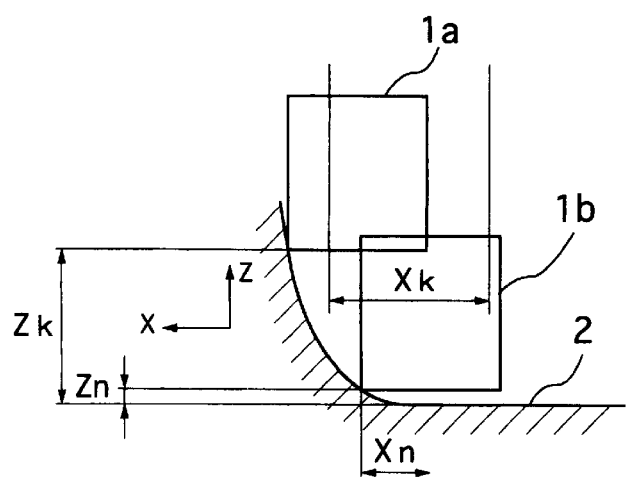
FIG. 27 is an explanatory view showing an electrical discharge machining operation of the twelfth embodiment of the electrical discharge machining apparatus of the invention.
Figure 28:
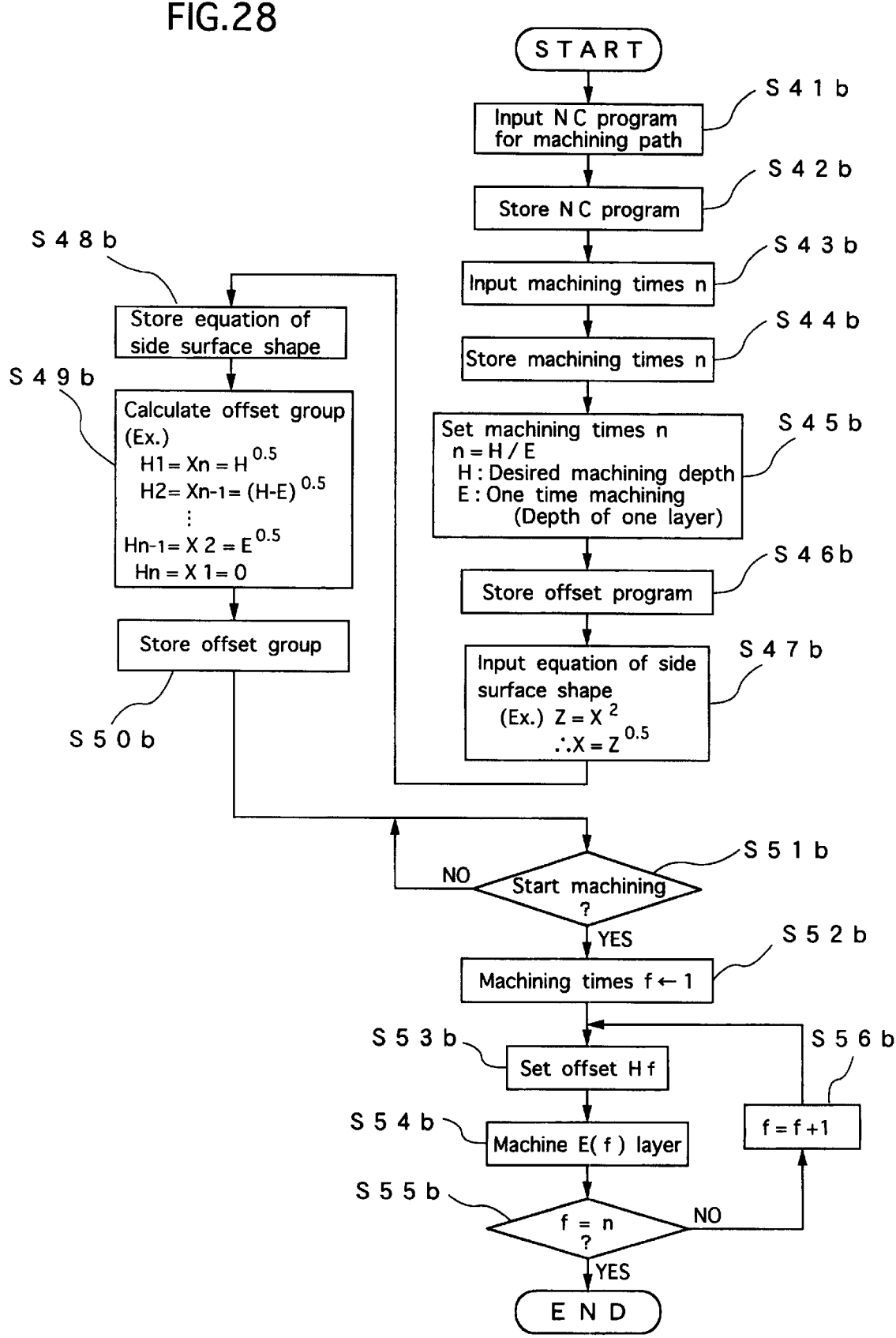
FIG. 28 is a flowchart of an example for executing the electrical discharge machining operation of the twelfth embodiment of the electrical discharge machining apparatus of the invention.

FIG. 26 is a schematic block diagram showing an entire structure of a twelfth embodiment of an electrical discharge machining apparatus of the invention. FIG. 27 is an explanatory view showing an electrical discharge machining operation of the twelfth embodiment of the electrical discharge machining apparatus of the invention. FIG. 28 is a flowchart of an example for executing the electrical discharge machining operation in the twelfth embodiment of the invention.

In the figures, 1 is an electrode, 2 is a workpiece, 63 is an NC control means, 64 is a relative position control means for performing a relative position control of the electrode 1 and the workpiece 2, 61 is an offset program storage means for storing a contour path 50 of a machining shape of the workpiece as a program having offset information, 73 is a side surface shape storage means for storing information about a side surface shape, 72 is an offset value calculating means for calculating an offset value which is changed during machining from the side surface information, 71 is an offset value storage means for storing the plurality of offset value of the contour path 50 which is changed during machining. Moreover, X1–Xn and H1–Hn are offset value of the contour path at a machining of "n" time, respectively, which is calculated on the basis of the side surface information.

Next, an electrical discharge machining operation of this embodiment will be described.

In this embodiment, as the tenth embodiment, the contour path is defined as a program having offsets in the offset program storage means 61, and the machining is performed while changing the contour path step by step. However, the present embodiment is different therefrom in that the offset value in the machining for each layer is not beforehand set and stored, but the offset value is calculated inside the NC control means 63 on the basis of the information about the side surface shape.

Namely, in FIG. 26, the offset value calculating means 72 calculates an offset value in the machining for each layer from a formula about the side surface shape $X=f(Z)$, which is stored in the side surface shape storage means 73. The calculated of set group are stored in the off set value storage means 71. The relative position control means 64 repeats machining while gradually reducing the contour dimension on the basis of this offset information and the contour program having offsets stored in the offset program storage means 61.

Namely, after the machining of the inside shape path, not shown, by the relative position control means 64, the electrode is raised once along the Z-axis and moved (free running) to the contour path. Then, the electrode is lowered again along the Z-axis and the machining is performed for the offset value Hi of the outermost contour path. Then, after finishing machining the locus L1 of the contour, the electrode is raised along the Z-axis, and the machining is performed again on the inside shape path. Next, the machining is performed for the offset value H2 of the contour path. The machining is repeated for the contour by changing the offset value H1→H2→ . . . → Hn, so that a cavity having an optional side surface shape is machined, as shown in FIG. 27.

Usually, these processes are controlled under a program control by the NC control means 63 as shown in FIG. 28.

An NC program of the contour path is inputted in step S41b, and the inputted NC program is stored in step S42b. Number of machining times n for dividing the machining shape into the contour paths is inputted in step S43b, and it is stored in step S44b. Next, one layer depth E is computed as E=H/n from the relation between a desired machining depth H, one layer depth E for performing one time machining and the machining times n, in step S45b. The offset program is stored on the basis of the one layer depth E in step S46b, and an equation which designates a side surface shape is inputted in step S47b. Namely, as shown in FIG. 27, for example, the relation between a Z-axis direction and an X-axis direction is inputted as a equation $Z=X^2$, namely, $X=Z^{1/2}$ and so on, and they are stored in step S48b. Then, an offset which accords with the equation inputted for designating the side surface shape is inputted in step S49b, and it is stored in step S50b. This embodiment has been described with respect to a case in which the offset is inputted and stored corresponding to the respective equations for designating the side surface shape and the machining times. However, it is possible to perform the automatic allocation of the offset values corresponding to the machining times on the basis of the one layer depth E which is calculated in step S43b to step S47b and the machining depth H, or the offset program, the relation between the machining times n and the machining depth H, and the equation for designating the side surface shape.

If it is decided that the machining has started in step S51b, an initial value 1 is set as a value f in a memory which stores the machining times in step S52b. An offset Hf is set in step S53b, and the machining of a layer E(f) is performed corresponding to the number of machining times which is stored in the memory value f in step S54b. It is decided whether the memory value f becomes the machining times n or not in step S55b. The value f of the memory is incremented in step S56b, and a routine from step S53b to step S56b is executed repeatedly till the memory value f becomes the machining times n. When the memory value f becomes the machining times n, this routine is ended.

The present embodiment of the electrical discharge machining apparatus applies voltage between the electrode 1 of simple shape and the workpiece 2, performs three-dimensional control by NC control while synthesizing a feed in a Z-axis direction for correcting a longitudinal wear amount of the electrode 1 with the feed in an X-Y plane, thereby machining a desired three-dimensional shape. The electrical discharge machining apparatus of the present embodiment comprises: the offset program storage means 61 for storing the contour path in a machined shape as a program having offset information in step S46b; the side surface shape storage means 73 for storing information about an side surface shape in step S47b and step S48b; and the offset value calculating means 72 for calculating the offset value, which changes during machining on the basis of the information about the above side surface shape, in step S51b and step S56b; thereby obtaining a shape having a side surface with an optional angle by repeatedly machining while changing the offset value step by step, from the calculated result from the above offset value calculating means.

Thus, even if an electrode wear amount is large, a Z-axis feed of a correcting moving amount ΔZu is performed each time a locus moving distance L in the X-Y plane in the machining reaches a correction unit interval ΔL, which is a standard for performing correction in the Z-axis direction. Therefore, it is possible to remove a layer of a machining depth in which the electrode wear amount and an electrode feed amount are balanced, to decrease machining technique data manually inputted for correcting an electrode wear, and to realize the electrode wear correction in easier way. Moreover, it is possible to improve machining accuracy even if the electrode wear amount is large. Therefore, in a three-dimensional machining using an electrode of simple shape, high machining speed and machining accuracy which have not been in the prior art can be obtained.

In this embodiment, compared with the eleventh embodiment, it is possible to machine an optional complicated side surface shape, because the offset value of the contour path is calculated from the information about the side surface shape. Therefore, the programming is easy, and it is possible to improve machining shape accuracy at an edge portion. Moreover, it is possible to easily machine a side surface of a three-dimensional shape and improve machining accuracy at a corner portion.

Thirteenth Embodiment

Figure 29:
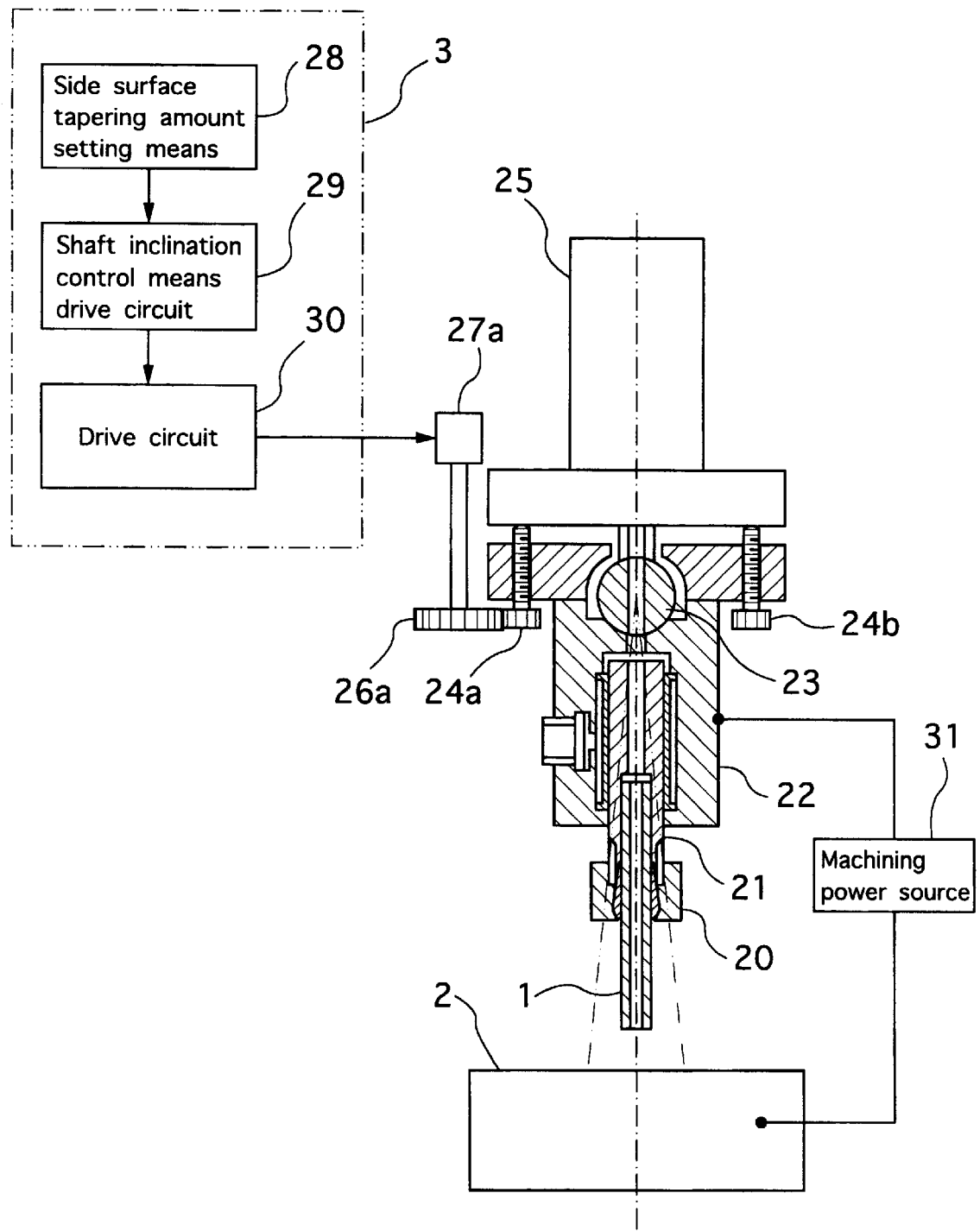
FIG. 29 is a schematic block diagram showing an entire structure of a thirteenth embodiment of an electrical discharge machining apparatus of the invention.
Figure 30:
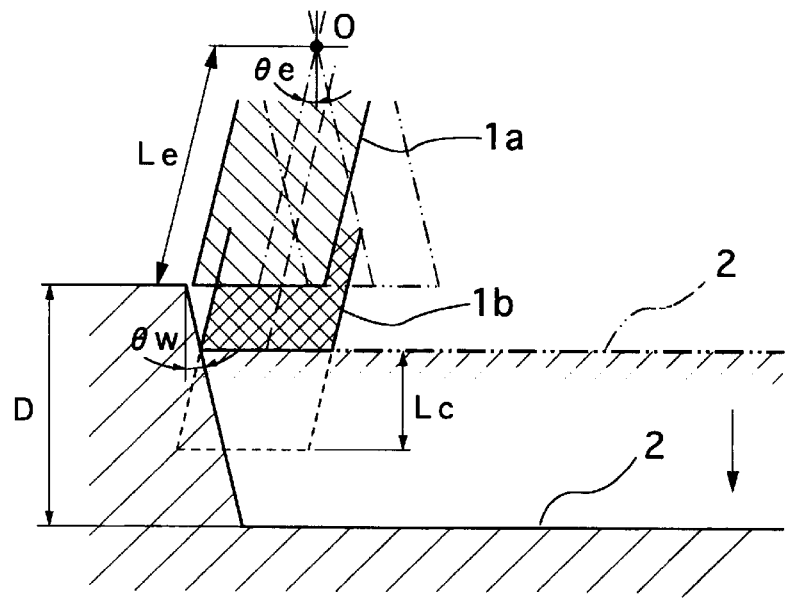
FIG. 30 is a schematic view showing a machining condition in the embodiment of FIG. 29.

FIG. 29 is a schematic block diagram showing an entire structure of the thirteenth embodiment of the electrical discharge machining apparatus of the invention. FIG. 30 is a schematic view showing a machining condition in the embodiment of FIG. 29.

In the figures, 1 is an electrode, 20 is a collet portion for grasping the electrode 1, 21 is a holder for holding the electrode 1 by the collet portion 20, 22 is a clamp mechanism for clamping the holder 21, 23 is a universal joint which is a mechanism for inclining the clamp mechanism 22 together with the electrode 1. 25 is a rotation mechanism held by a Z-axis driving unit not shown and coupled with the clamp mechanism 22 through an angle adjustment mechanism 24a and 24b which adjust an angle by rotating. 26a is a gear mechanism for rotating the angle adjustment mechanism 24a, 27a is an actuator for rotating the gear mechanism 26a, 30 is a driving circuit for driving the actuator 27a, 29 is an axis inclining amount control means for calculating an electrode axis inclining angle from a set value of a side surface taper amount setting means 28 and a driving amount of the actuator (a rotation angle) for obtaining this inclining angle. It gives a driving command to the driving circuit 30. 31 is a power source for machining.

Next, an electrical discharge machining operation of this embodiment will be described.

In this embodiment, machining of an inclined side surface is carried out by setting the rotating electrode inclined previously at a fixed angle to a rotation axis.

Namely, in FIG. 29, the clamp mechanism 22 is connected to the rotation mechanism 25 via the universal joint 23 and can hold the electrode 1 in inclined state at an optional angle, by adjusting the angle adjustment mechanism 24a and 24b. At machining time, the rotation mechanism 25 is driven in that state and the machining is performed while rotating the electrode 1. As shown in a schematic view of FIG. 30 illustrating a machining situation in this embodiment, 1a shows an electrode position at a start time of machining, and 1b shows an electrode position during machining.

As illustrated, the electrode 1 of an initial length Le is rotated while inclined at an angle of θe (theta e) to the electrode rotation axis, and the machining starts at that state. As the machining proceeds, an electrode wear of a length shown by Lc is generated at the electrode position 1b, because the machining is performed while the electrode 1 is worn. As a result, in the figure, supposing an inclined angle of the side surface as θw (theta w) and a desired machining depth as D, $$\tan \theta w = (Lc/D) \cdot \sin \theta e$$

$$\theta w = \tan^{-1}(K \cdot \sin \theta e)$$

where k=Lc/D.

Thereby, a side surface shape of a inclined angle ew (theta w) can be obtained.

As mentioned above, the present embodiment of the electrical discharge machining apparatus applies voltage between the electrode 1 of simple shape and a workpiece 2, and performs three-dimensional control by NC control while synthesizing a feed in a Z-axis direction for correcting a longitudinal wear amount of the electrode 1 with the feed in an X-Y plane, thereby machining a desired three-dimensional shape. The electrical discharge machining apparatus of the present embodiment comprises: an electrode holding means, composed of the holder 21, for fixing the electrode 1 in inclined state at a fixed angle to the electrode rotation axis; and the machining power source 31 for making the electrode wear amount variable; thereby machining and forming the side surface shape having a constant inclination by the contour machining of a desired shape, while rotating the electrode in inclined state at a fixed angle.

Thereby, even if the electrode wear amount is large, the side surface shape having a constant inclination can be machined and formed by the contour machining of a desired shape while rotating the electrode in inclined state at a fixed angle. Therefore, it is possible to decrease machining technique data manually inputted for correcting an electrode wear and to realize the electrode wear correction in easier way. Moreover, it is possible to improve machining accuracy even if the electrode wear amount is large. Therefore, in a three-dimensional machining using the electrode of simple shape, high machining speed and machining accuracy which have not been in the prior art can be obtained.

Accordingly, it is possible to machine a side surface shape having an optional inclined angle by appropriately setting an inclination angle of the electrode according to a wear ratio of the electrode length. Therefore, the programming is easy and it is possible to improve machining shape accuracy of an edge portion. Moreover, it is possible to perform a side surface machining of three-dimensional shape easily and improve machining accuracy of a corner portion.

Fourteenth Embodiment

Figure 31:
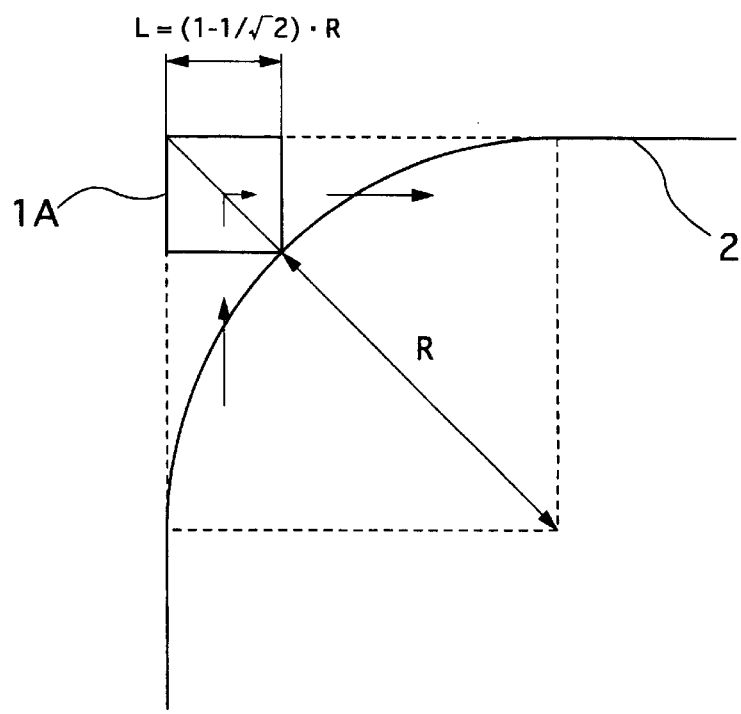
FIG. 31 is an explanatory view showing a fourteenth embodiment of an electrical discharge machining method of the invention.

FIG. 31 is an explanatory view showing a fourteenth embodiment of the electrical discharge machining method of the invention. It shows finishing method for a corner portion machined by a quadrangular tube electrode or a quadrangular column electrode.

In the figure, 1A is a quadrangular column electrode for finishing work, one side length of which is $$L = \left(1 - \frac{1}{\sqrt{2}}\right) \cdot R.$$

Here, R is a radius of a corner which has been formed in the machining using the tubular electrode. 2 is a workpiece.

Next, an electrical discharge machining operation of this embodiment will be described.

As the before mentioned embodiment, a machining of a contour is performed while applying voltage between an electrode 1 and the workpiece 2 which are faced to each other, rotating the electrode 1 and synthesizing a feed in a Z-axis direction for correcting a longitudinal wear amount of the electrode 1 with the feed in an X-Y plane. A constant contour can be obtained without any compensation for a side surface wear, by performing machining while keeping the electrode shape stably in a steady state.

In machining, first, the above machining path is machined repeatedly by the tubular electrode (not shown) of the radius R, thereby performing a rough machining of a desired shape. In this machining, a corner of a radius R is formed at four corner portions as shown in FIG. 31.

Next, the electrode 1 is exchanged for the quadrangular column electrode 1a for finishing corner portions, thereby performing finishing machining of the corner portions. Here, the finishing of the corner portion is not performed by use of a side surface portion of the electrode as in the prior art, but by repeating machining by use of the bottom surface of the electrode. Namely, after exchanging the electrode 1 for the quadrangular column electrode 1A, the electrode is again positioned at the upper surface of the workpiece 2, and the corner portion is repeatedly removed in layers by machining the unremoved corner portions while synthesizing the feed in the Z-axis direction with the X-Y plane feed. When the bottom surface of the quadrangular column electrode 1A reaches a pretreated bottom surface (a bottom surface of a machined shape by the tubular electrode), the finishing work of the corner portion is completed. By this finishing work, it is possible to make an inside corner portion a sharp edge inside corner without a round portion of a radius R.

As mentioned above, a shape and a dimension of the finishing electrode 1a of the quadrangular column shape is very important in order to perform finishing machining for the corner portion with high accuracy while machining it repeatedly by use of the electrode bottom surface.

Next, an electrode wear shape will be described with respect to some examples in which dimensions of the quadrangular column finishing electrodes 1A are different, referring to FIGS. 32a, 32b, 33a and 33b.

FIGS. 32a, 32b, 33a and 33b are explanatory views showing electrode wear shapes in comparison examples, in which dimensional of the quadrangular column finishing electrode 1A are different, of the embodiment of FIG. 19 in the electrical discharge machining method of the invention. In the figures, views in arrow directions illustrate bottom portions of the electrodes, respectively, seen from their side surface.

Figure 32A:
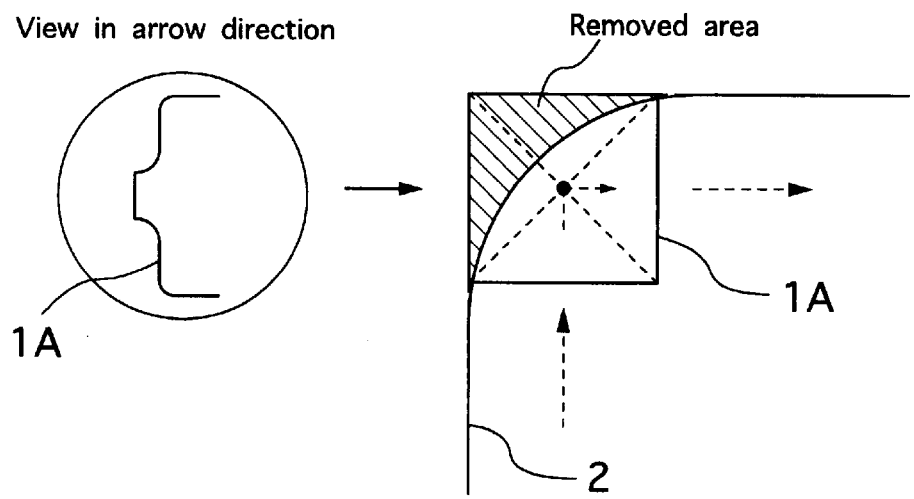
FIGS. 32a and 32b are explanatory views partially showing worn shapes of electrodes in case the dimensions of quadratic prism electrodes for finishing differ from each other in the embodiment of FIG. 19 in the electrical discharge machining method of the invention.
Figure 32B:
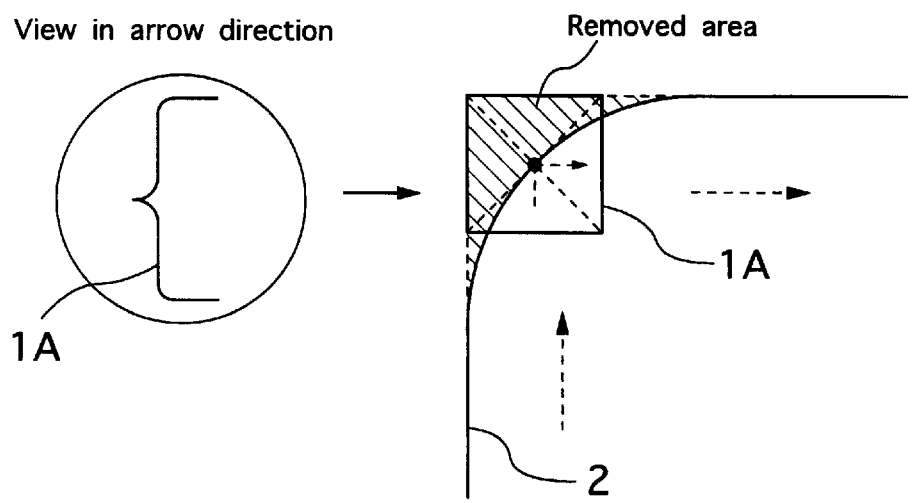

As shown in FIGS. 32a and 32b, in case the dimension of the quadrangular column finishing electrode 1A is comparatively large, a central portion of the quadrangular column electrode 1A is not used in the corner finishing work at four corners. Thus, the wear shape of the electrode bottom surface is made such that the central portion thereof is remained without wear, namely such that the electrode center is protruded. If the corner finishing machining is performed with such a shape of electrode, the electrode bottom surface shape is transferred to the bottom surface shape of the corner portion, and it is impossible to obtain a flat shape thereat.

Figure 33A:
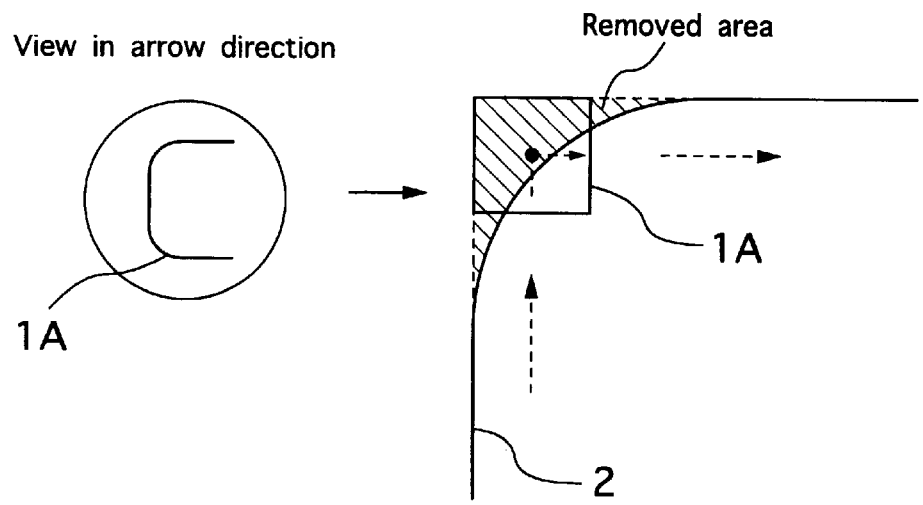
FIGS. 33a and 33b are explanatory views partially showing other examples of worn shapes of electrodes in case the dimensions of quadratic prism electrodes for finishing differ from each other in the embodiment of FIG. 19 in the electrical discharge machining method of the invention.
Figure 33B:
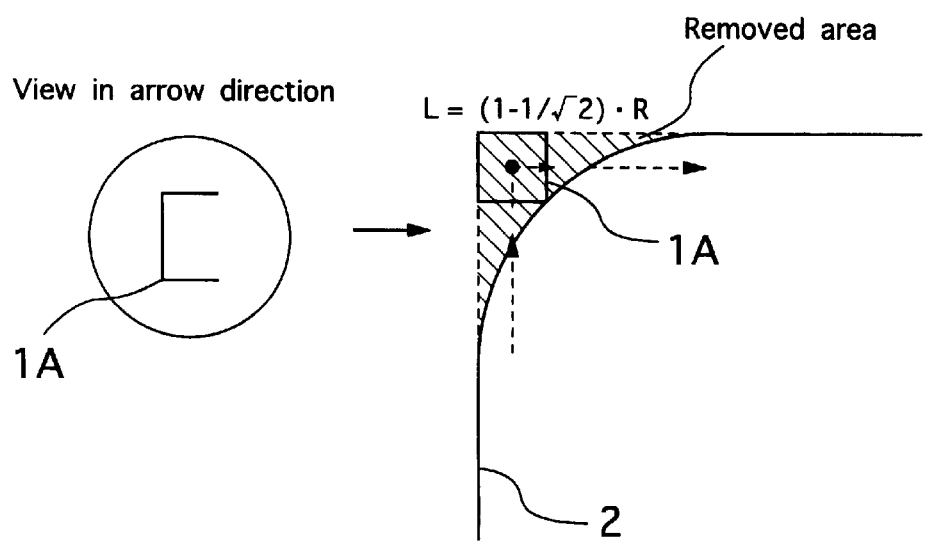

Moreover, in case it is larger to a certain degree than the one side length $$L = \left(1 - \frac{1}{\sqrt{2}}\right) \cdot R$$

of the quadrangular column electrode 1A shown in FIG. 33a, there is not caused any protrusion at the central portion of the electrode even if the corner finishing work at the four corners is performed. However, the electrode bottom surface shape has an edge portion sagged, so that its shape accuracy in corner finishing is deteriorated. These machining errors are caused because part of the electrode bottom surface for finishing is not used for machining in the corner finishing. In case of FIG. 33b, namely, if the machining is performed while the one side length of the quadrangular column electrode 1A is $$L = \left(1 - \frac{1}{\sqrt{2}}\right) \cdot R,$$

the machining is performed by use of all the bottom surface of the quadrangular column finishing electrode 1A at the corner portion. Thus, the quadrangular column electrode 1A is worn uniformly, so that machining with high accuracy is possible using the electrode wearing condition.

As mentioned above, the present embodiment of the electrical discharge machining method applies voltage between the electrode 1 of simple shape and the workpiece 2, performs three-dimensional control by NC control while synthesizing a feed in a Z-axis direction for correcting a longitudinal wear amount of the electrode 1A with the feed in an X-Y plane, thereby machining a desired three-dimensional shape. The electrical discharge machining method is the one in which the inside corner portion of radius R is machined by a cylindrical electrode or tubular electrode, and which finishes thereafter the corner portions, where the above cylindrical electrode or tubular electrode fails to remove, by use of the quadrangular column electrode 1A which has one side length L of a square section is $$L \le \left(1 - \frac{1}{\sqrt{2}}\right) \cdot R.$$

Therefore, it is possible to remove a layer of a machining depth in which an electrode wear amount and an electrode feed amount are balanced, to decrease machining technique data manually inputted for correcting an electrode wear, to realize electrode wear correction in easier way and to improve machining accuracy even if the electrode wear amount is large. In addition, the programming is easy and it is possible to improve machining shape accuracy of edge portions. It is also possible to easily perform side surface machining of three-dimensional shape and to improve machining accuracy of the corner portions.

Fifteenth Embodiment

Figure 34:
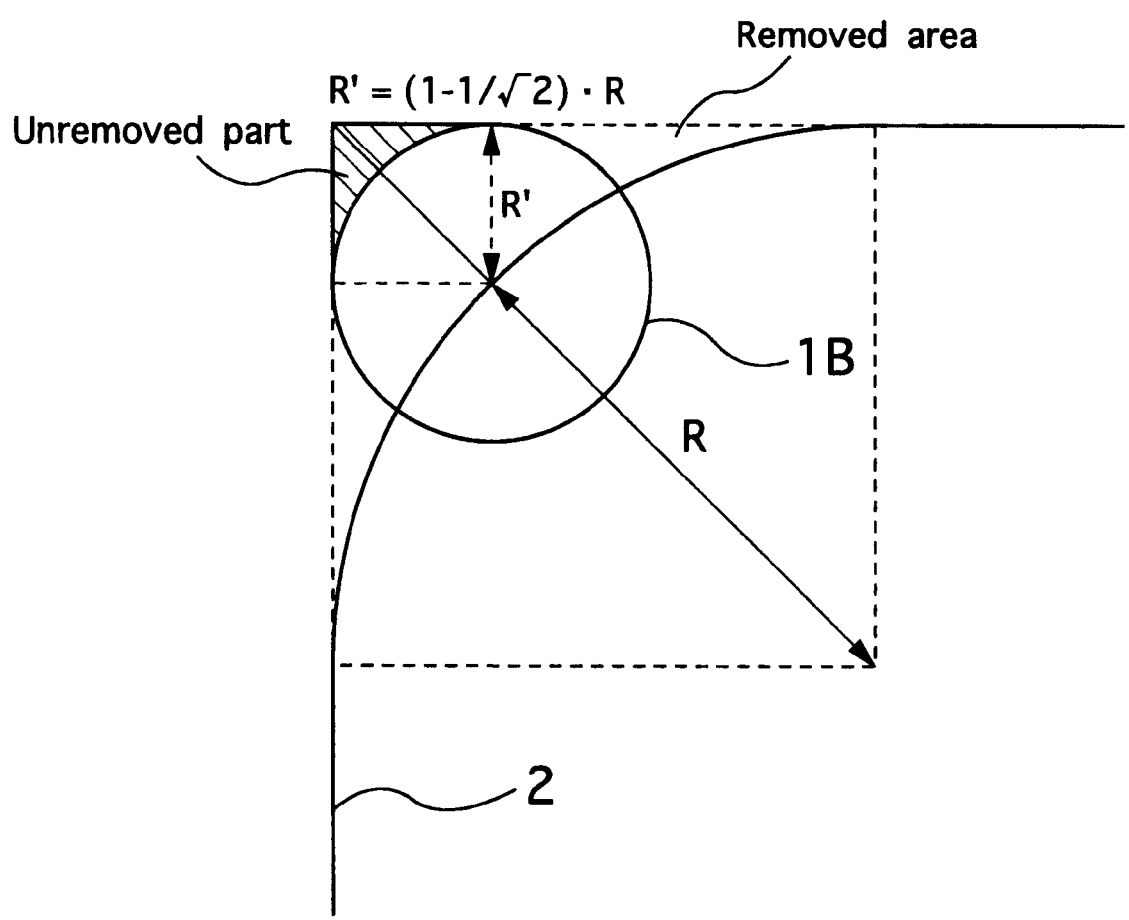
FIG. 34 is an explanatory view showing a fifteenth embodiment of the electrical discharge machining method of the invention.

FIG. 34 is an explanatory view showing a fifteenth embodiment of an electrical discharge machining method of the invention. It shows a finishing method for a corner portion by a cylindrical electrode or a tubular electrode for finishing. FIGS. 35a, 35b, 36a and 36b are explanatory views showing electrode wear shapes in comparison examples, in which dimensions of the cylindrical finishing electrode 1B are different, in the electrical discharge machining method of the embodiment of FIG. 34 of the present invention. In the figures, views in arrow directions illustrate bottom portions of the electrodes, respectively, seen from their side surface.

FIG. 34 illustrates a finishing method for a corner portion machined by a cylindrical electrode or a tubular electrode. 1B is a tubular finishing electrode of a radius $$R' = \left(1 - \frac{1}{\sqrt{2}}\right) \cdot R.$$

Here, R is a corner radius formed by a pretreatment by a tubular electrode. Element 2 is a workpiece.

Next, an electrical discharge machining operation of this embodiment will be described.

As the before-mentioned embodiment, first, machining is repeatedly carried out on the before-mentioned machining path by a tubular electrode of a radius R not shown, thereby performing a rough machining of a desired depth. In this machining, a corner of a radius R is formed at four corner portions as shown in FIG. 34. Next, the electrode 1B is exchanged for the cylindrical electrode 1B for finishing corner portions, thereby performing finishing machining of the corner portions. Here, the finishing of the corner portion is not performed by use of a side surface portion of the electrode as in the prior art, but by repeating machining by use of the bottom surface of the electrode. Namely, after exchanging the electrode 1B for the cylindrical column electrode 1B, the electrode is again positioned at the upper surface of the workpiece, and the corner portion is repeatedly removed in layers by machining the unremoved corner portions while synthesizing the feed in the Z-axis direction with the X-Y plane feed. When the bottom surface of the cylindrical column electrode 1B reaches a pretreated bottom surface (a bottom surface of a machined shape by the tubular electrode), the finishing work of the corner portion is completed. By this finishing work, it is possible to make an inside corner portion an inside corner of a smaller radius R.

As mentioned in the above embodiment, a shape and a dimension of the finishing electrode is very important in order to perform finishing machining for the corner portion with high accuracy while repeating the machining work by use of the electrode bottom surface.

Figure 35A:
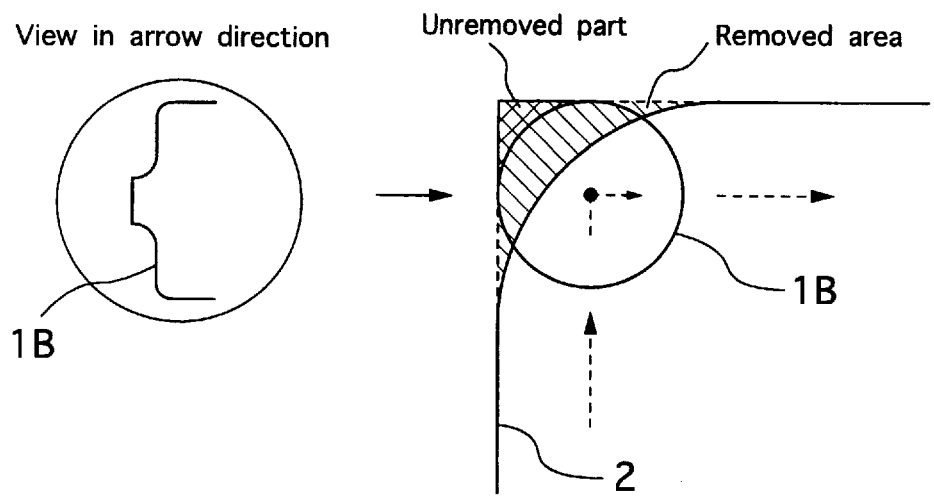
FIGS. 35a and 35b are explanatory views partially showing worn shapes of electrodes in case the dimensions of cylindrical electrodes for finishing differ from each other in the electrical discharge machining method in the embodiment of FIG. 34 of the invention.
Figure 35B:
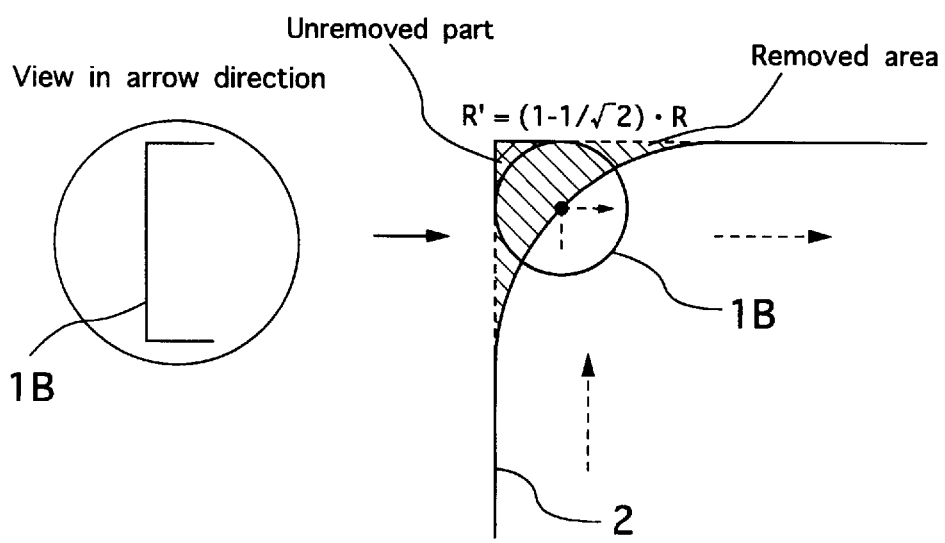

For example, as in FIG. 35a, in case the dimension of the cylindrical finishing electrode 1B is comparatively large, a central portion of the cylindrical electrode 1B is not used in the corner finishing. Thus, the wear shape of the electrode bottom surface is made such that the central portion is remained without wear, namely such that the electrode center is protruded. If the corner finishing machining is performed with such a shape of electrode, the electrode bottom surface shape is transferred to the bottom surface shape of the corner portion, and it is impossible to obtain a flat shape thereat. These machining errors are caused because part of the finishing electrode bottom surface is used for machining in the corner finishing. In addition, in case of FIG. 35b, namely, if the machining is performed while the radius of the cylindrical electrode 1B is $$R' = \left(1 - \frac{1}{\sqrt{2}}\right) \cdot R,$$

the machining is performed by use of all the bottom surface of the cylindrical finishing electrode 1B at the corner portion. Thus, the cylindrical electrode 1B is worn uniformly, and a machining with high accuracy is possible using the electrode wearing condition. Such case as FIG. 35b is not limited to the cylindrical finishing electrode 1B. It is the same even in the case of using the tubular electrode.

Figure 36A:
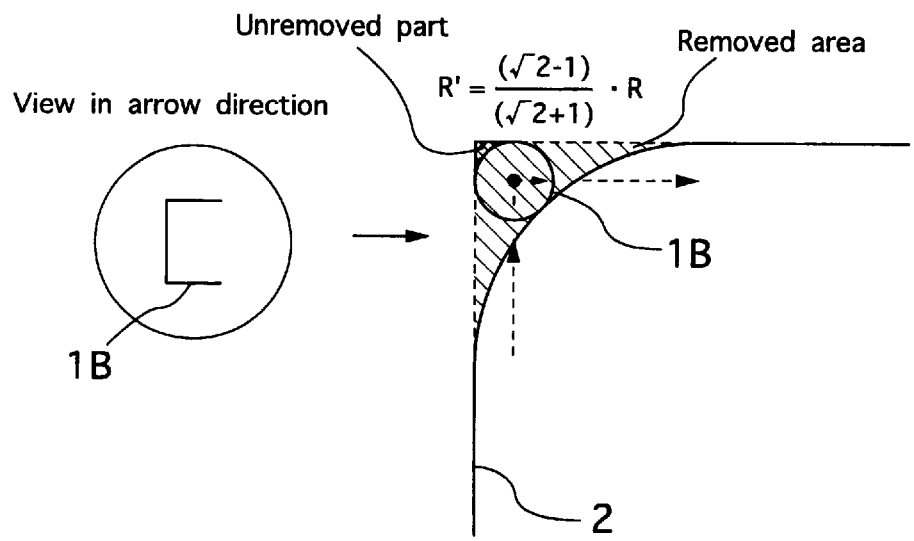
FIGS. 36a and 36b are explanatory views showing worn shapes of electrodes in case dimensions of cylindrical electrodes for finishing differ from each other in the electrical discharge machining method of the embodiment of FIG. 34 of the invention.
Figure 36B:
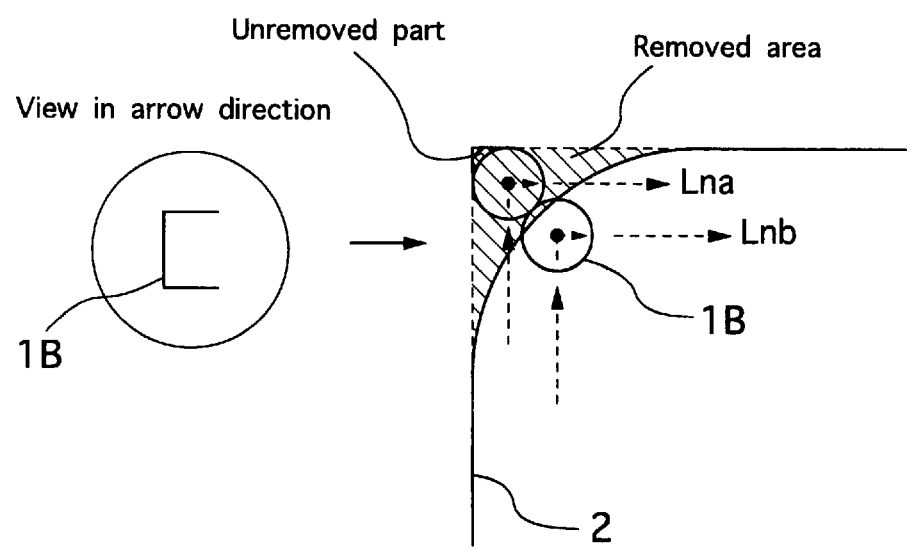

In addition, as shown in FIGS. 36a and 36b, in case the shape of the electrode is smaller than the above, the electrode wear becomes uniform and a desired machining is possible. However, as shown in FIG. 36b, in case the shape of the electrode is still smaller, it is necessary to perform finishing by a plurality of paths as shown by loci Lna and Lnb. In this case, it is necessary that the center of the electrode goes into an inside of the unremoved corner portion (a meshed part in the figure) at a path of the second time. In such a case as FIG. 36b, a machining error is caused in machining on the path of the second time, because an overlapping part is generated between the loci of an outside and an inside. Such a case as FIGS. 36a and 36b is not limited to the cylindrical finishing electrode 1B. It is the same even in the case of using the tubular electrode.

As mentioned above, the present embodiment of the electrical discharge machining method applies voltage between the electrode 1B of simple shape and the workpiece 2, performs three-dimensional control by NC control while synthesizing a feed in a Z-axis direction for correcting a longitudinal wear amount of the electrode 1B with the feed in an X-Y plane, thereby machining a desired three-dimensional shape. The electrical discharge machining method of the embodiment is the one in which the inside corner portion of radius R is machined by a cylindrical or tubular electrode, and which finishes thereafter the corner portions, where the above cylindrical or tubular electrode 1B fails to remove, by use of the cylindrical finishing electrode 1B which has a radius R'

$$\text{of } R' \le \left(1 - \frac{1}{\sqrt{2}}\right) \cdot R.$$

Therefore, the electrode 1B is exchanged for the cylindrical or tubular finishing electrode 1B, and the corner portion is repeatedly removed in layers thereafter. When the bottom surface of the cylindrical finishing electrode 1B reaches a pretreated bottom surface (a bottom surface of a work shape machined by the tubular electrode), the finishing machining of the corner portion is completed. By this finishing work, it is possible to make an inside corner portion a smaller inside corner portion than the radius R of the locus along which the electrode 1B moves.

Sixteenth Embodiment

Figure 37A:
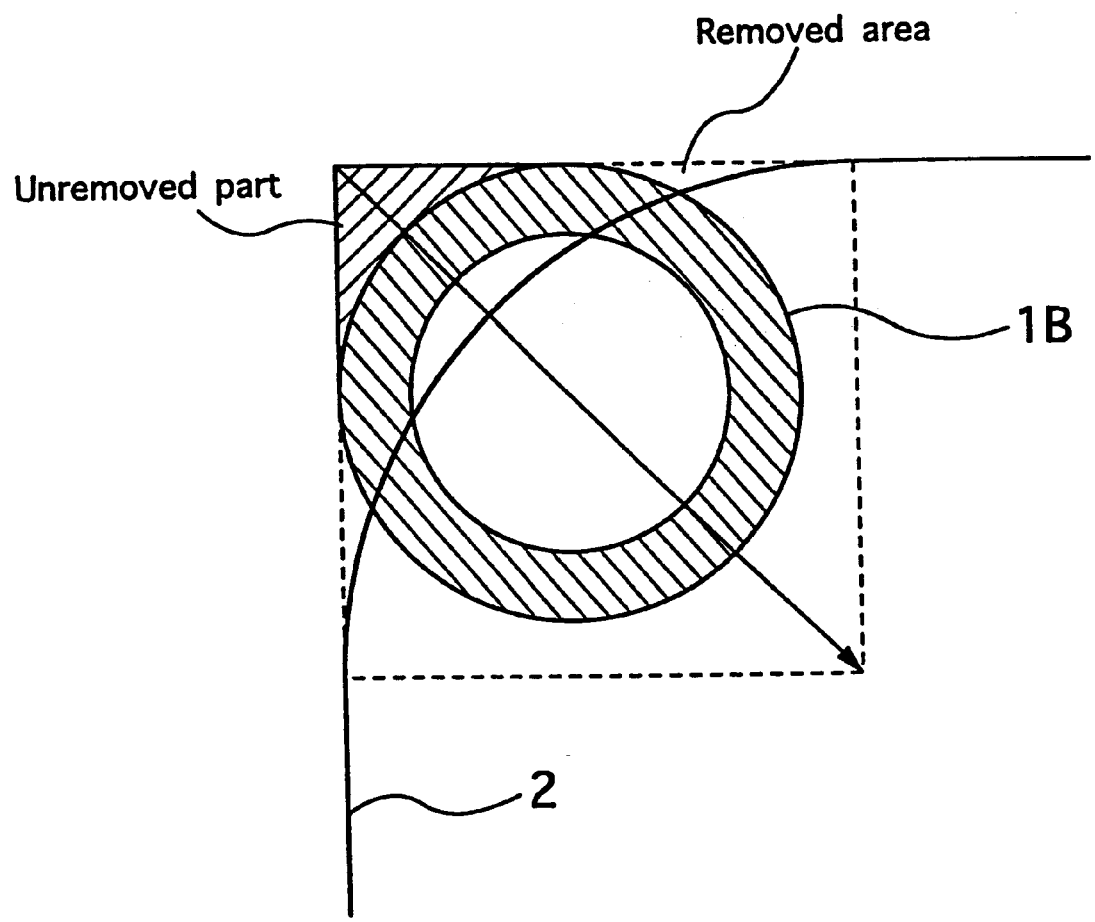
FIG. 37a is an explanatory view showing a sixteenth embodiment of the electrical discharge machining method of the invention.
Figure 37B:
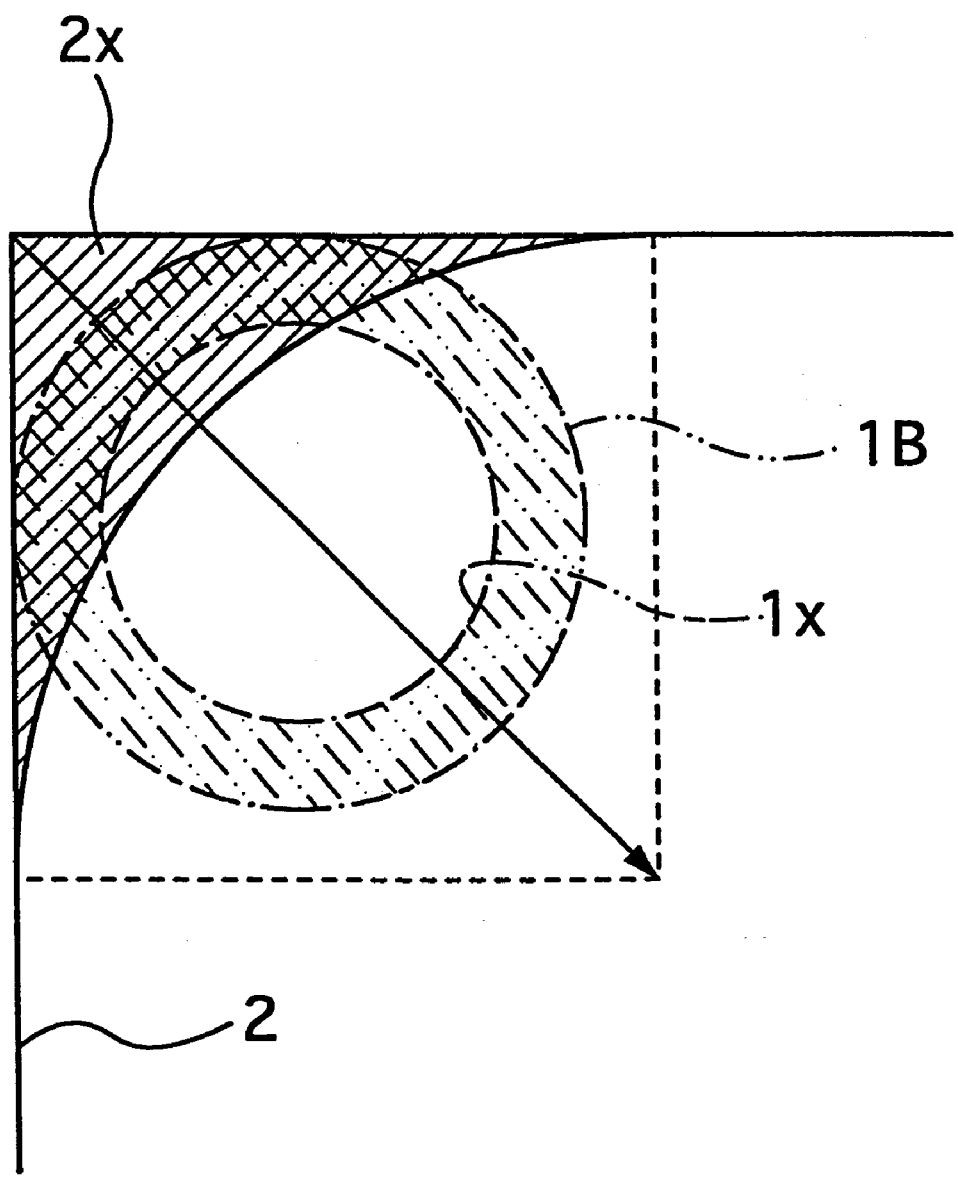
FIG. 37b is an explanatory view showing a sixteenth embodiment of the electrical discharge machining method of the invention illustrating the corner portion which the cylindrical electrode or tubular electrode fails to remove.

FIGS. 37a and 37b explanatory views; showing a sixteenth embodiment of the electrical discharge machining method of the invention. They show a finishing method for corner portions by use of a tubular finishing electrode.

In the figures, 1B is a tubular electrode which has a part of a liquid hole portion overlapped on a pretreating tubular electrode locus, or overlapped on a corner portion of radius R which the pretreating tubular electrode has failed to remove in pretreating machining work. 2 is a workpiece.

Next, an electrical discharge machining operation of this embodiment will be described.

In the premachining work, the above mentioned machining path is repeatedly machined by the tubular electrode of the radius R, thereby performing a rough machining of a desired depth. In this machining, a corner of a radius R is formed at a corner portion as shown in FIG. 37a. Namely, the above mentioned machining path is repeatedly machined by the tubular electrode of the radius R not shown, thereby performing a rough machining of a desired depth. In this machining, a corner of a radius R is formed at a corner portion as shown in FIG. 37a. Next, the electrode is exchanged for the tubular electrode 1B for finishing corner portions, thereby performing machining of the corner portions. Here, the finishing of the corner portion is not performed by use of a side surface portion of the electrode as in the prior art, but by machining repeatedly by use of the bottom surface of the electrode. Namely, after exchanging the electrode for the tubular finishing electrode 1 9, the tubular finishing electrode 1B is again positioned on an the upper surface of the workpiece, and the machining of the remaining portion at the corner is performed while synthesizing a feed in a Z-axis direction with an X-Y plane feed. Thus, the corner portion is removed repeatedly in layers. When the bottom surface of the tubular electrode 1B reaches a premachined bottom surface (a bottom surface of a work shape machined by the tubular electrode), the finishing machining of the corner portion is completed. By this finishing, it is possible to make an inside corner portion an inside corner of a smaller radius R.

As mentioned above, the present embodiment of the electrical discharge machining method applies voltage between the electrode 1B of simple shape and the workpiece 2, performs three-dimensional control by NC control while synthesizing the feed in the Z-axis direction for correcting a longitudinal wear amount of the electrode 1B with the feed in an X-Y plane, thereby machining a desired three-dimensional shape. The electrical discharge machining method of the embodiment is the one in which the inside corner portion of radius R is machined by a cylindrical or tubular electrode 1B, and which finishes thereafter the corner portions, which the above cylindrical or tubular electrode 1B fails to remove, by use of the tubular electrode 1B of such a shape as part of the liquid hole portion covers the corner portion which the above cylindrical or tubular electrode 1B fails to remove (see FIG. 37b, illustrating liquid. supplying hole portion 1×and unremoved corner portion 2×)

In this embodiment, if the finishing of the corner portions, which the above first cylindrical electrode fails to remove, is performed by use of the tubular electrode 1B of such a shape as part of the liquid hole portion covers the corner portion of radius R, which the cylindrical electrode of pretreatment, namely, the above first cylindrical electrode fails to remove as shown in FIG. 37, the machining is performed by use of all the bottom surface of the tubular finishing electrode 1B at the corner portion as in the above embodiment. Thus, the electrode is uniformly worn and machining with high accuracy is possible using electrode wearing condition.

Therefore, even if the electrode wear amount is large, it is possible to remove a layer of a machining depth in which an electrode consuming amount and an electrode feed amount are balanced. Moreover, easy programming is possible in three-dimensional machining using an electrode of simple shape, and it is possible to improve machining shape accuracy of an edge portion. The side surface machining of three-dimensional shape is easily carried out, thereby improving machining accuracy at the corner portion.

Seventeenth Embodiment

Figure 38:
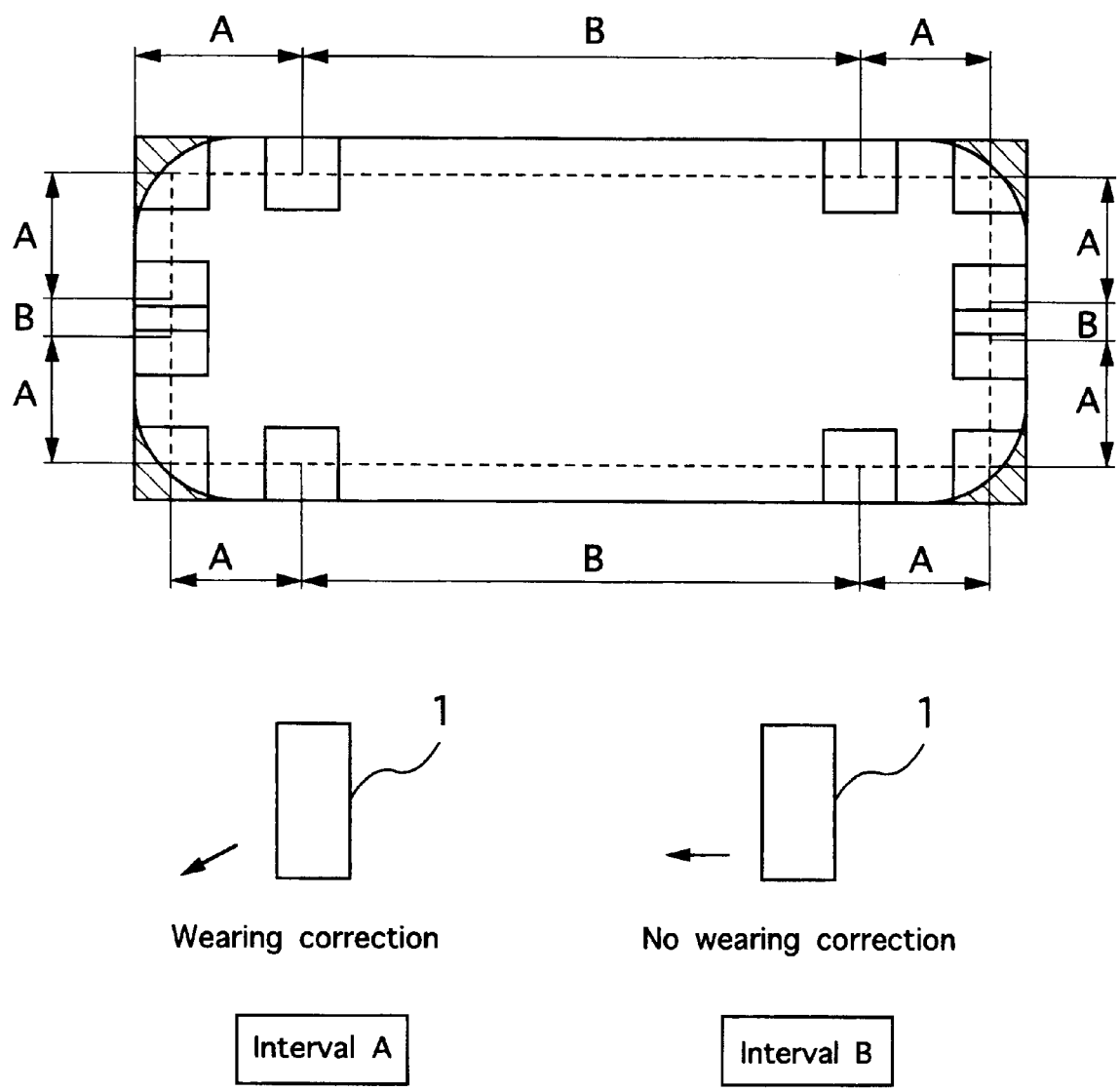
FIG. 38 is an explanatory view showing a seventeenth embodiment of the electrical discharge machining method of the invention.

FIG. 38 is an explanatory view showing a seventeenth embodiment of the electrical discharge machining method of the invention.

In FIG. 38, 1 is an electrode and 2 is a workpiece. In the figure, an interval A is a machining interval of a corner finishing portion, and a interval B is a free-running interval as a free-running portion except the corner portion.

Figure 39:
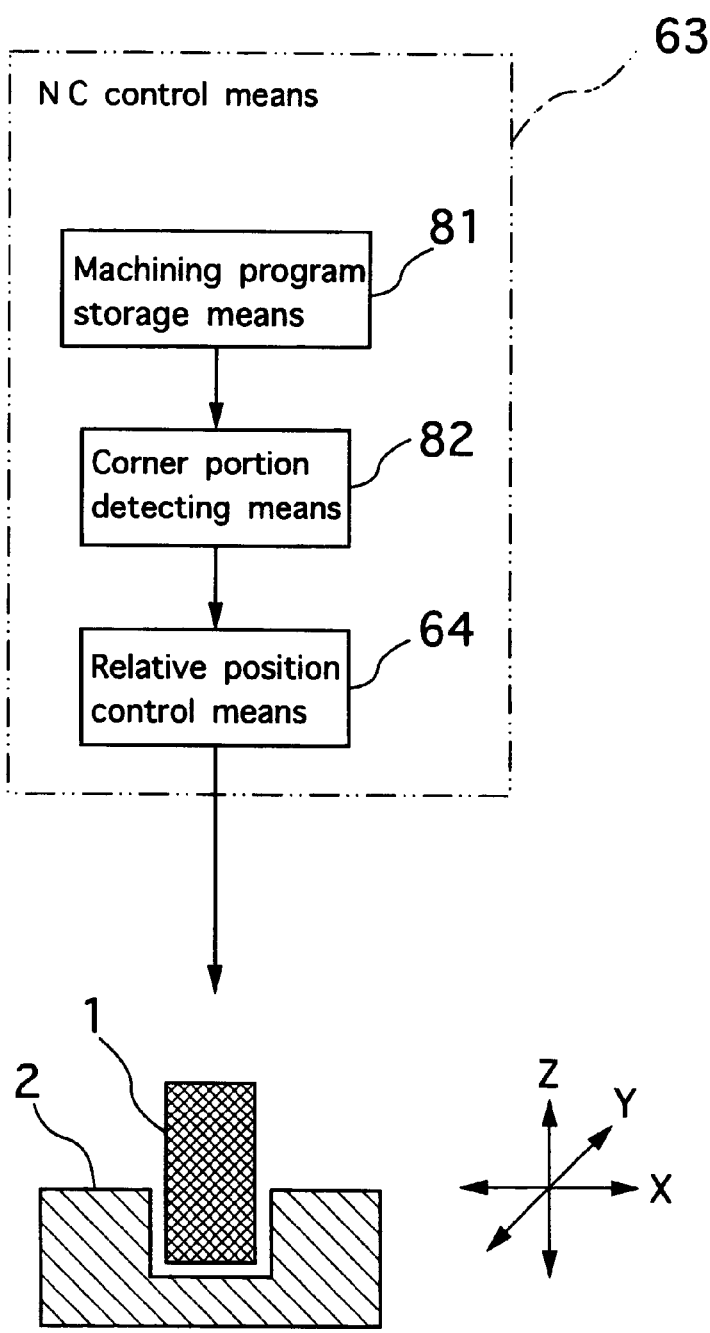
FIG. 39 is a schematic block diagram showing an entire structure of a seventeenth embodiment of the electrical discharge machining apparatus of the invention.

FIG. 39 is an schematic block diagram showing an entire structure of the seventeenth embodiment of the electrical discharge machining apparatus of the invention.

In FIG. 39, 1 is the electrode, 2 is the workpiece, 81 is a machining program storage means for storing a machining program information, 82 is a corner portion judging means for judging whether a portion which is now processed is in the machining interval A of the corner finishing portion or the free-running interval B other than corner portions, according to the machining program information stored in the machining program storage means 81. Concretely, the corner portion judging means 82 can make such a decision depending on whether or not the machining program is on a straight machining. 64 is a relative position control means, such as a servo mechanism and so on, for controlling a relative position of the electrode 1 and the workpiece 2, and 6 3 is an NC control means.

Next, an electrical discharge machining operation of this embodiment will be described.

As the before-mentioned embodiment, voltage is applied between the electrode 1 and workpiece 2, which are faced to each other, while a feed in a Z-axis direction for correcting a longitudinal wear amount of the electrode 1 is synthesized with the feed in an X-Y plane, so as to carry out a machining of a contour. Thus, a constant contour can be obtained without any compensation for a side surface wear by performing machining while keeping the electrode shape stably in a steady state.

In a specific machining work, first, the machining path is repeatedly machined by a tubular electrode of radius R not shown, thereby performing a rough machining of a desired depth. In this machining, a corner of radius R is formed at a corner portion. Next, the electrode 1 is exchanged for the electrode 1 for finishing corner portions, thereby performing finishing machining of the corner portions. Here, the finishing of the corner portion is not performed by use of a side surface portion of the electrode as in the prior art, but by machining it repeatedly by use of the bottom surface of the electrode. Namely, after exchanging the electrode 1 for the finishing electrode 1, the electrode is again positioned on the upper surface of the workpiece 2. Then, the machining of the remaining portion at the corner is performed while synthesizing the feed in the Z-axis direction with an X-Y plane feed, so that the removal of the corner portion is performed repeatedly in layer shape. When the bottom surface of the finishing electrode 1 reaches a pretreated or premachined bottom surface (a bottom surface of a work shape machined by the tubular electrode), the finishing machining of the corner portion is completed. By this finishing work, it is possible to finish the inside corner portion.

As mentioned above, the present embodiment of the electrical discharge machining apparatus applies voltage between the electrode 1 of simple shape and the workpiece 2, performs three-dimensional control by NC control while synthesizing the feed in the Z-axis direction for correcting the longitudinal wear amount of the electrode 1 with the feed in the X-Y plane, thereby machining a desired three-dimensional shape. The electrical discharge machining apparatus of the embodiment comprises: a well-known electrode exchanging means for exchanging a plurality of electrodes; the corner portion judging means 82 for judging whether a position which is now machined is a corner portion or not; and the relative position control means 64 for controlling the electrode so as to perform machining in the slanting direction while synthesizing the feed in the Z-axis direction for correcting the longitudinal wear amount of the electrode with the X-Y plane feed at the corner portion and so as to perform only the X-Y plane feed at parts other than the corner portion; thereby exchanging the electrode for the finishing electrode 1 after performing machining by the electrode 1 of cylindrical or tubular shape, and performing finishing machining of the corner portion on the basis of a command from the above relative position control means 64.

In the finishing machining of such a shape as shown in FIG. 38, the finishing electrode 1 is moved in the moving direction shown by the arrow, so that the finishing machining of four corners is repeatedly performed in order. A portion shown by the machining interval A in the figure is an interval to perform electrical discharge at the corner portion, and a portion shown by the free-running interval B is an interval for free-running where no electrical discharge is generated. In the corner finishing of such a shape, the free-running interval B is long. Therefore, if a feed for correction of an electrode length wear (Z-axis feed) is performed in the free-running interval B, the electrode is too much fed, so that there arises an abnormal machining at a next corner portion like short circuit. Accordingly, the machining is performed in the slanting direction while synthesizing the feed in the Z-axis direction with the X-Y plane feed so as to correct the length wear of the electrode in the machining interval A. However, only the X-Y plane feed is performed in the free-running interval B except the corner portion.

Namely, in FIG. 39, the corner portion judging means 82 judges whether a portion which is now machined is the corner portion (the machining interval A) or not (the free-running interval B) on the basis of the information from the machining program storage means 81. Since the distance of the machining interval A at the corner changes depending on a shape or a dimension of a corner R in a pretreatment or the finishing electrode, the corner portion judging means 82 is structured such that it can make judgement of the corner machining interval more correctly from such electrode shape information. The relative position control means 64 performs machining in the slanting direction while synthesizing the feed in the Z-axis direction with the X-Y plane feed so as to correct length wear of the electrode in the machining interval A, and performs only the X-Y plane feed in the free-running interval B other than the corner portion, on the basis of the judged result by the corner portion judging means 82. By performing such judgement control, the feed in the Z-axis direction of the electrode is stopped at the free-running portion, and an appropriate finishing machining is possible for only the corner portion.

It is possible to reduce a moving dead time in the free-running interval B by increasing a moving feed gain in a horizontal direction movement (the free-running interval B) at portions other than the corner portion or increasing an upper limit of a feed speed, thereby performing it at higher speed than the usual machining feed, from the judged result of the corner portion judging means 82.

The interpole control means in this embodiment performs the horizontal direction movement at portions other than the corner portion at higher speed than the usual machining feed.

Moreover, an interpole detecting means may be provided instead of the corner portion judging means 15, so as to detect if interpole space is opened or not due to decrease of discharge frequency or increase of average machining voltage or the like during machining. Thus, if the interpole space is opened or nearly opened, the Z-direction feed is stopped to perform only the X-Y plane feed by the interpole detecting means.

As mentioned above, the present embodiment of the electrical discharge machining apparatus applies voltage between the electrode 1 of simple shape and the workpiece 2, performs three-dimensional control by the NC control while synthesizing the feed in the Z-axis direction for correcting the longitudinal wear amount of the electrode 1 with the feed in the X-Y plane, thereby machining a desired three-dimensional shape. The electrical discharge machining apparatus of the embodiment comprises the interpole detecting means for detecting if the interpole space is opened or not due to decrease of discharge frequency or increase of an average machining voltage or the like during machining. Then, if it is detected by the above interpole detecting means that the interpole space is opened or nearly opened, the Z-direction feed is stopped and only the X-Y plane feed is carried out.

Therefore, even if an electrode wear amount is large, it is possible to remove a layer of a machining depth in which an electrode wear amount and an electrode feed amount are balanced, to decrease machining technique data manually inputted for correcting an electrode wear, to realize electrode wear correction in easier way and to improve machining accuracy even if the electrode wear amount is large. In addition, the programming is easy, and it is possible to improve machining shape accuracy of edge portions, to perform side surface machining of three-dimensional shape easily and to improve the machining accuracy of the corner portions.

Eighteenth Embodiment

Figure 40:
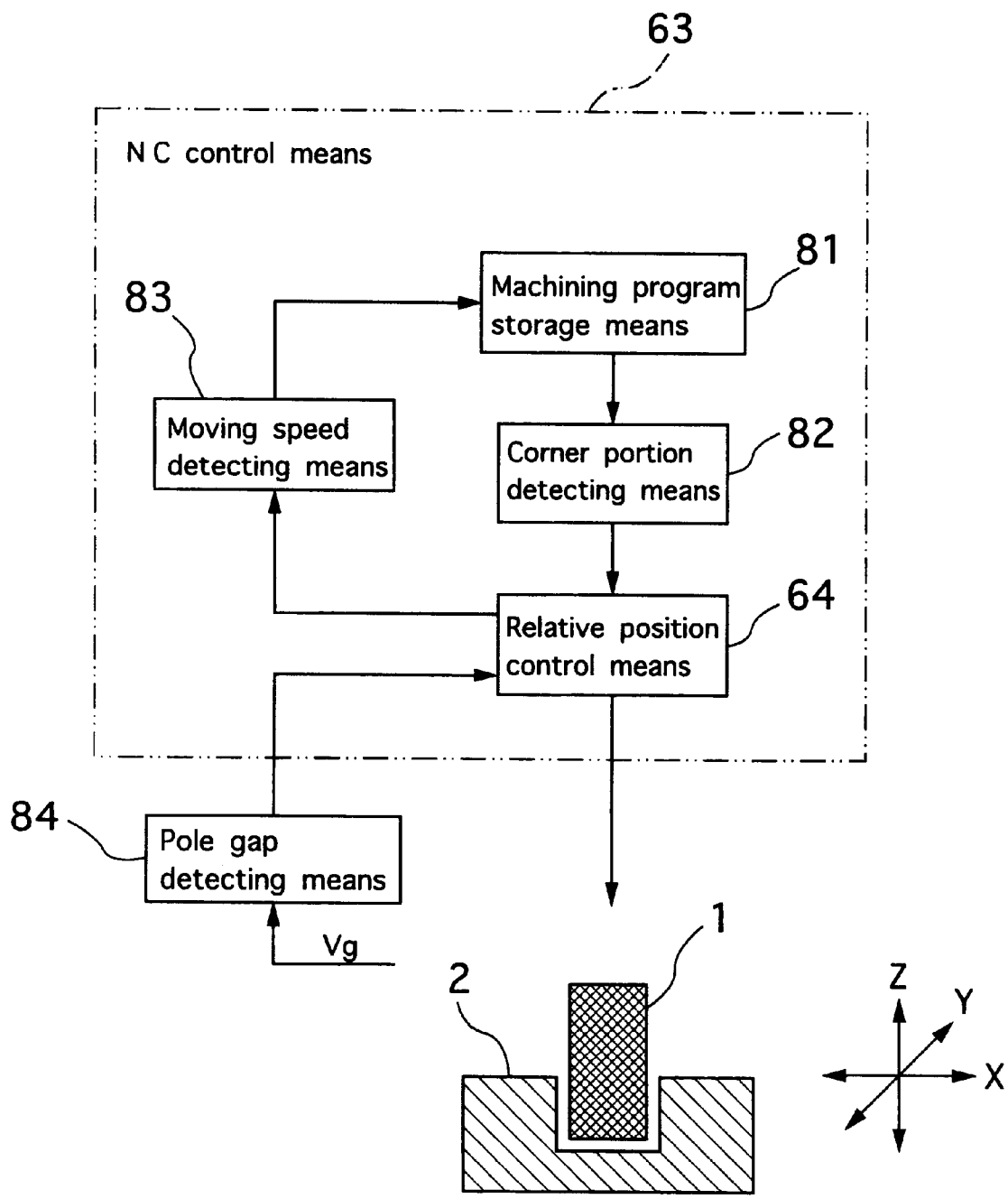
FIG. 40 is a schematic block diagram showing an entire structure of a eighteenth embodiment of the electrical discharge machining apparatus of the invention.

FIG. 40 is a schematic block diagram showing an entire structure of an eighteenth embodiment in the electrical discharge machining apparatus of the invention.

In FIG. 40, 1 is an electrode, 2 is a workpiece, 81 is a machining program storage means for storing machining program information, 82 is a corner portion judging means for judging whether a portion which is now machined is a corner portion (a machining interval A) or not (a free-running interval B), 64 is a relative position control means for controlling a relative position of the electrode 1 and the workpiece 2, 83 is a moving speed detecting means for detecting that the electrode 1 reaches a bottom surface based on a change of a machining feed speed, and 63 is an NC control means. 84 is an interpole detecting means for detecting an average voltage Vg between the poles and detects that the interpole space is opened due to decrease of discharge frequency or increase of an average machining voltage or the like during machining. It is possible to judge if the interpole space is opened or nearly opened via the interpole detecting means 84.

Next, an electrical discharge machining operation of this embodiment will be described.

As the above mentioned embodiment, first, the before-mentioned machining path is repeatedly machined by a tubular electrode of radius R not shown, thereby performing a rough machining of a desired depth. Next, the electrode is exchanged for the electrode 1B for finishing the corner portion to perform a finishing machining of the corner portion.

In the finishing machining of a shape shown in FIG. 38, the electrode is moved in the direction shown by the arrow to repeatedly perform the finishing machining of the four corners in order.

Namely, in FIG. 40, the corner portion judging means 82 judges whether a portion which is now machined is the corner portion (the machining interval A) or not (the free-running interval B) on the basis of the information from the machining program storage means 81. The relative position control means 64 performs machining in the slanting direction while synthesizing a feed in a Z-axis direction with an X-Y plane feed, so as to correct the length wear of the electrode for finishing the corner portion 1 in the machining interval A, and performs only the X-Y plane feed in the free-running interval B other than the corner portion, on the basis of the judged result of the corner portion detecting means 82. Moreover, the relative position control means 64 detects the average voltage Vg between the poles by the interpole detecting means 84 so as to control the electrode feed speed by the detected voltage. Namely, if the average voltage Vg decreases, it means that a gap between the poles becomes narrower, so that it reduces the feed speed. To the contrary, if the average voltage Vg increases, it means that the gap between the poles becomes wider, so it controls the feed speed to be higher. Therefore, it is possible to judge a state of electrical discharge between the poles by the increase and decrease of the feed speed. Since the electrical discharge is not generated at the free-running interval B, the feed speed is faster. However, when the electrode 1B for finishing the corner portion reaches the bottom surface, the electrical discharge is generated even at the free-running interval B, so that the feed speed is lowered. The moving speed detecting means 83 detects this reduction of the feed speed, thereby detecting that the finishing electrode 1 reaches the bottom surface. Then, the NC control means 63 judges completion of the finishing machining and terminates the finishing machining.

As mentioned above, the electrical discharge machining apparatus of the embodiment comprises: the moving speed detecting means 83 for detecting the reduction of the horizontal direction moving speed at portions other than the corner potion; and the corner portion judging means 82 for judging if the electrode for finishing the corner portion reaches the bottom surface formed in the rough machining, from the detected result by the above moving speed detecting means 83 and judges complete time of the finishing machining by the above corner portion judging means 82. Therefore, since a waste machining is not performed in the finishing machining, it is possible to improve machining shape accuracy, to perform a side surface machining of three-dimensional shape easily and to improve machining accuracy of the corner portion.

Nineteenth Embodiment

Figure 41:
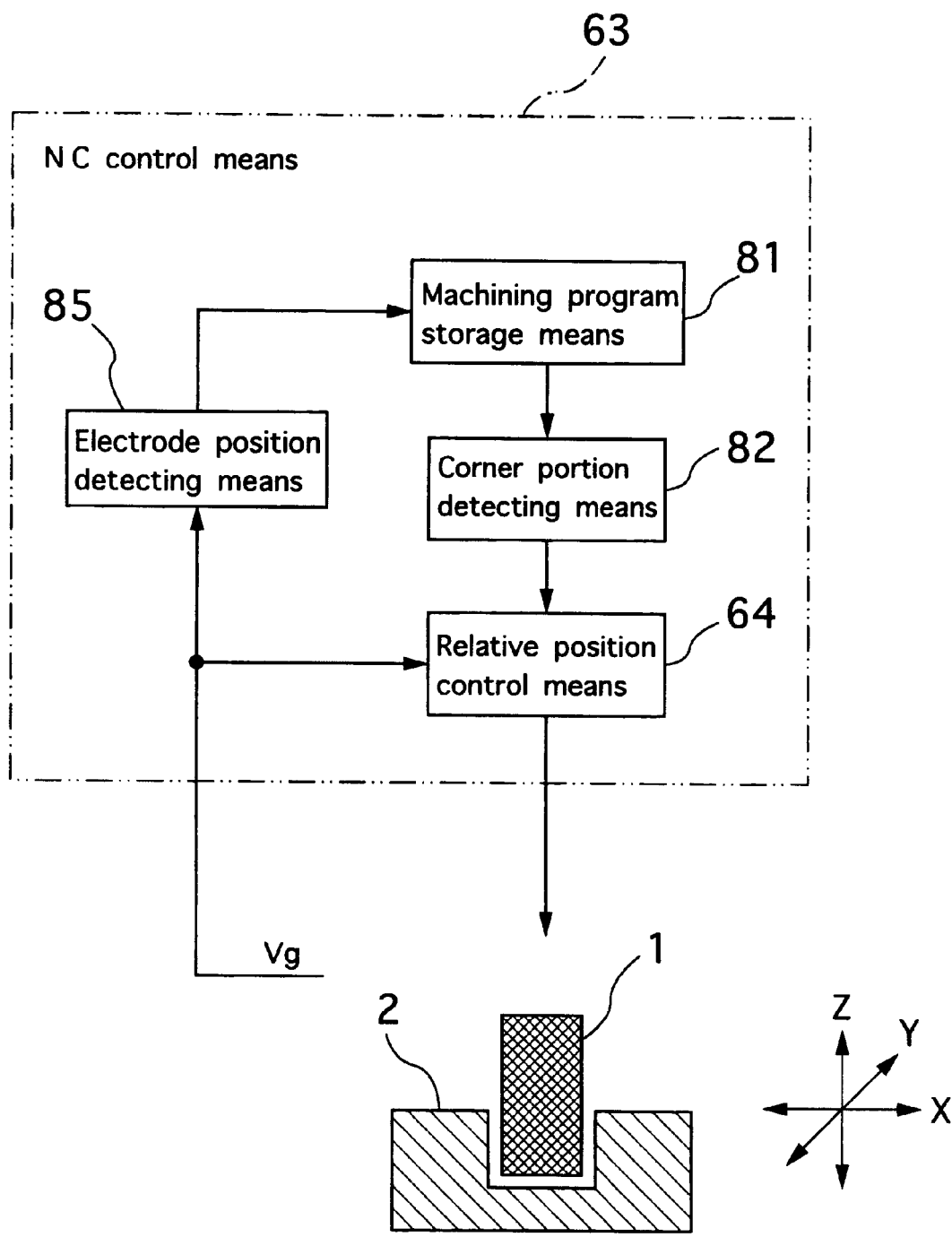
FIG. 41 is a schematic block diagram showing an entire structure of a nineteenth embodiment of the electrical discharge machining apparatus of the invention.

FIG. 41 is a schematic block diagram showing an entire structure of a nineteenth embodiment of the electrical discharge machining apparatus of the invention.

In the FIG. 41, 1 is an electrode, 2 is a workpiece, 81 is a machining program storage means for storing a machining program information, 82 is a corner portion judging means for judging whether a portion which is now machined is a corner portion (a machining interval A) or not (a free-running interval B), 64 is a relative position control means for controlling a relative position of the electrode 1 and the workpiece 2, 85 is an electrode position detecting means for detecting that the electrode 1 for finishing the corner potion reaches a bottom surface from a change of an average machining voltage, and 63 is an NC control means.

Next, an electrical discharge machining operation of this embodiment will be described.

As the above mentioned embodiment, first, the before-mentioned machining path is repeatedly machined by a tubular electrode or cylindrical electrode 1 of radius R not shown, thereby performing a rough machining of a desired depth. Next, the electrode is exchanged for the electrode 1 for finishing the corner portion to perform a finishing machining of the corner portion.

In FIG. 41, the corner portion judging means 82 judges whether a portion which is now machined is the corner portion (the machining interval A) or not (the free-running interval B) on the basis of the information from the machining program storage means 81. The relative position control means 64 performs machining in the slanting direction while synthesizing a feed in a Z-axis direction with an X-Y plane feed, so as to correct the length wear of the finishing electrode 1 in the machining interval A, and performs only the X-Y plane feed in the free-running interval B other than the corner portion, on the basis of the judged result of the corner portion judging means 82. The relative position control means 64 detects the average voltage Vg between poles so as to control the electrode feed speed by the detected voltage. In the above embodiment, it is detected by the increase and decrease of this feed speed whether the finishing electrode 1 reaches the bottom surface or not. However, in this embodiment, it is detected by a change of the average voltage between the poles whether the finishing electrode 1 reaches the bottom surface or not. Namely, if the finishing electrode 1 reaches the bottom surface, electrical discharge is generated even in the free-running interval B, so that the average voltage Vg becomes lower. The electrode position detecting means 85 detects that the electrode for finishing 1 reaches the bottom surface by detecting this decrease of the feed speed. Then, the NC control means 63 judges completion of the finishing machining and terminates the finishing machining.

As mentioned above, the electrical discharge machining apparatus of the embodiment comprises: the electrode position detecting means 85 for detecting the increase of the electrical frequency or the reduction of the average machining voltage during machining; and the corner portion judging means 82 for judging if the electrode 1 for finishing the corner portion reaches the bottom surface formed by rough machining, from the detected result by the above electrode position detecting means 85, and judges complete time of the finishing machining by the above corner portion judging means 82. Therefore, since a waste machining is not performed in the finishing machining, it is possible to improve machining shape accuracy, to perform a side surface machining of three-dimensional shape easily and to improve machining accuracy of the corner portion.

As mentioned above, according to the electrical discharge machining method and its apparatus of the first and second aspects of the invention, the correcting moving amount is stored for performing correction in the Z-axis direction corresponding to the fixed unit moving distance in the X-Y plane, and feeding is performed of the fixed correcting moving amount in the above Z-axis direction each time the moving distance in the X-Y plane on the moving locus in the machining reaches the above unit moving distance. Thus, it is possible to perform an electrode wear correction easily by less machining technique data than prior arts. Therefore, even if the electrode wear amount is large, it is possible to remove a layer of a machining depth in which an electrode wear amount and an electrode feed amount are balanced, to decrease machining technique data manually inputted for correcting the electrode wear, to realize electrode wear correction in an easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount.

According to the electrical discharge machining method and apparatus of the third and fourth aspects of the invention, the relation is stored between the fixed unit moving distance in the X-Y plane and the correcting moving amount for performing correction in the Z-axis direction corresponding to the above unit moving distance, and feeding is performed of the fixed moving amount in the above Z-axis direction each time the moving distance in the X-Y plane on the moving locus in the machining reaches the above unit moving distance. Thus, it is possible to perform the electrode wear correction easily by less machining technique data than the prior art, just like the electrical discharge machining method and its apparatus. Therefore, even if the electrode amount is large, it is possible to remove a layer of a machining depth in which the electrode wear amount and the electrode feed amount are balanced, to decrease machining technique data manually inputted for correcting the electrode wear, to realize the electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount. Moreover, it stores the relation between the unit moving distance in the X-Y plane and the correcting moving amount for performing correction in the Z-axis direction corresponding to the above unit moving distance, so that automatic setting is possible for adjusting the correcting moving amount to perform correction in the Z-axis direction to the ability of the NC control.

According to the electrical discharge machining method and its apparatus of the fifth and sixth aspects of the invention, the relation is stored between the specific unit moving distance in the X-Y plane and the correcting moving amount for performing correction in the Z-axis direction corresponding to the above unit moving distance as the specific unit moving distance and angle in the X-Y plane, and feeding is performmed of the fixed correcting moving amount in the above Z-axis direction each time the moving distance in the X-Y plane on the moving locus in the machining reaches the above unit moving distance. Thus, it is possible to perform the electrode wear correction easily by less machining technique data than the prior art, just like the electrical discharge machining method and its apparatus. Therefore, even if the electrode wear amount is large, it is possible to remove a layer of a machining depth in which the electrode wear amount and the electrode feed amount are balanced, to decrease machining technique data manually inputted for correcting the electrode wear, to realize the electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount. Moreover, they store the relation between the unit moving distance in the X-Y plane and the correcting moving amount for performing correction in the Z-axis direction corresponding to the above unit moving distance as an angle, so that automatic setting is possible for adjusting the correcting moving amount to perform correction in the Z-axis direction to the ability of the NC control.

According to the electrical discharge machining method and its apparatus of the seventh and eighth aspects of the invention, the relation is stored between the fixed unit moving distance in the X-Y plane and the correcting moving amount for performing correction in the Z-axis direction corresponding to the above unit moving distance and the relation between the fixed unit moving distance in the Z-axis direction and the correcting moving amount for performing correction in the Z-axis direction corresponding to the above unit moving distance, a fixed corrected unit moving distance in the X-Y plane is calculated on the basis of the above unit moving distance in the X-Y plane and the above unit moving distance in the Z-axis direction, and the above feeding of the fixed moving amount in the Z-axis direction is performed each time the moving locus in the machining reaches the above corrected unit moving distance in the X-Y plane. Thus, it is possible to perform the electrode wear correction easily by less machining technique data than prior arts. Therefore, even if the electrode wear amount is large, it is possible to remove a layer of a machining depth in which the electrode wear amount and the electrode feed amount are balanced, to decrease machining technique data manually inputted for correcting the electrode wear, to realize electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount.

According to an electrical discharge machining method and its apparatus of the ninth and tenth aspects of the invention, the method and apparatus store the relation between the fixed unit moving distance in the X-Y plane and the correcting moving amount for performing correction in the Z-axis direction corresponding to the above unit moving distance and the relation between the fixed unit moving distance in the Z-axis direction and the correcting moving amount for performing correction in the Z-axis direction corresponding to the above unit moving distance, and perform the above feed of the fixed moving amount in the Z-axis direction on the basis of the above unit moving distance in the X-Y plane and the above unit moving distance in the Z-axis direction each time the unit moving distance in the X-Y plane on the moving locus in the machining reaches the above unit moving distance in the X-Y plane and each time such unit moving distance reaches the above fixed unit moving distance in the Z-axis direction on the moving locus in the machining. Thus, it is possible to perform the electrode wear correction easily by less machining technique data than the prior art. Therefore, even if the electrode wear amount is large, it is possible to remove a layer of a machining depth in which the electrode wear amount and the electrode feed amount are balanced, to decrease machining technique data manually inputted for correcting the electrode wear, to realize electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount. Especially, even in case of carrying out the moving only in the Z-axis direction, the above feed of the fixed moving amount in the Z-axis direction is performed each time the electrode reaches the fixed unit moving distance. Therefore, treatment with high accuracy is possible in boring machining, too.

According to the electrical discharge machining method and its apparatus of the eleventh and twelfth aspects of the invention, the method and apparatus store at least X-Y data of the tool path for each layer, decide how many times the above tool path should be repeated on the basis of the amount equivalent to the machining depth determined by the amount equivalent to the thickness of the above layer, the correcting moving amount at least in the Z-axis direction and the amount equivalent to the X-Y moving distance in the X-Y plane corresponding to the above correcting moving amount, and control the repetition times of the above tool path. Thus, it is possible to perform electrode wear correction easily by less machining technique data than the prior art. Moreover, it is easy to make a machining program for the electrode wear correction even if the layer depth is adjusted or changed. Therefore, even if the electrode wear amount is large, it is possible to remove a layer of a machining depth in which the electrode wear amount and the electrode feed amount are balanced, to decrease machining technique data manually inputted for correcting the electrode wear, to realize the electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless o f the electrode wear amount and moreover to simplify the machining program making work for the electrode wear correction.

According to the electrical discharge machining method and its apparatus of the thirteen and fourteenth aspects of the invention, the method and apparatus store at least X-Y data of the tool path for each layer, decide how many times the above tool path should be repeated on the basis of the amount equivalent the machining depth determined by the amount equivalent to the thickness of the above layer, the correcting moving amount at least in the Z-axis direction and the amount equivalent to the X-Y moving distance in the X-Y plane corresponding to the above correcting moving amount, perform machining for each layer while controlling the repetition times of the above tool path, measure the machining depth during the above repetition times or after the above repetition times, compare the above measured value with the machining depth expected for the above repetition times and, if the above compared value exceeds an allowable range or it is predicted that it exceeds the allowable range after the repetition times finish, change at least one or more of the rest of the repetition times, repetition times to be added, the correcting moving amount in the Z-axis direction, the amount equivalent to the X-Y moving distance in the X-Y plane corresponding to the correcting moving amount in the Z-axis direction and electrical conditions that can adjust the electrode consuming amount. Thus, it is possible to perform the electrode wear correction easily by less machining technique data than the prior art. Moreover, it is possible to simplify the machining program making work for the electrode wear correction even if the layer depth is adjusted or changed. Furthermore, it is possible to remove a required depth of a layer accurately. Therefore, even if the electrode wear amount is large, it is possible to remove a layer of a machining depth in which the electrode wear amount and the electrode feed amount are balanced, to decrease machining technique data manually inputted for correcting the electrode wear, to realize the electrode wear correction in easier way and to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount and to simplify the machining program making work for the electrode wear correction.

According to the electrical discharge machining method and its apparatus of the fifteen and sixteenth aspects of the invention, the method and apparatus store at least X-Y data of the tool path for each layer, decide how many times the above tool path should be repeated on the basis of the amount equivalent to the machining depth decided by the amount equivalent to the thickness of the above layer, the correcting moving amount at least in the Z-axis direction and the amount equivalent to the X-Y moving distance in the X-Y plane corresponding to the above correcting moving amount, perform machining for each layer while controlling the repetition times of the above tool path, measure the machining depth during the above repetition times or after the above repetition times, compare the above measured value with the machining depth expected for the above repetition times and, if the above compared value exceeds an allowable range or it is predicted that it exceeds the allowable range after the repetition times finish, change at least one or more of the rest of the repetition times, the repetition times to be added, the correcting moving amount in X-Y direction, the feed amount in the Z-axis direction corresponding to the correcting moving amount in the X-Y direction, the correcting moving amount in the Z-axis direction, the amount equivalent to the X-Y moving distance in the X-Y plane corresponding to the correcting moving amount in the Z-axis direction and the electrical conditions that can adjust the electrode consuming amount. Thus, it is possible to perform the electrode wear correction easily by less machining technique data than the prior art. Moreover, it is possible to simplify machining program making work for the electrode wear correction even if the layer depth is adjusted or changed. Furthermore, it is possible to remove a required depth of a layer accurately. Therefore, even if the electrode wear amount is large, it is possible to remove a layer of a machining depth in which the electrode wear amount and the electrode feed amount are balanced, to decrease machining technique data manually inputted for correcting the electrode wear, to realize the electrode wear correction in easier way and at the same time, to improve machining accuracy even if the electrode wear amount is large. As a result, in the three-dimensional machining using an electrode of simple shape, there is an effect that it is possible to obtain high machining speed and machining accuracy which are not in the prior art regardless of the electrode wear amount and to simplify the machining program making work for the electrode wear correction.

According to an electrical discharge machining apparatus of the seventeenth aspect of the invention, the apparatus synthesizes the feed in the Z-axis direction for correcting the longitudinal wear amount of the electrode with the X-Y plane feed. It comprises a relative movement control means for controlling at least one type of the repeating movement of the tool path, the working fluid supplying means for supplying the ion exchanging water as the working fluid between poles, and the machining power source for supplying the pulse current of high peak and short pulse, that has a negative polarity at an electrode side, between the poles. It performs machining under the wearing machining condition in which an electrode wearing percentage is 40% or more. Thus, there is an effect that it is possible to obtain an electrical discharge machining apparatus which can perform three-dimensional electrical discharge machining with high machining speed and high machining accuracy.

According to the electrical discharge machining apparatus of the eighteenth aspect of the invention, the apparatus comprises the repetition time control means for synthesizing the feed in the Z-axis direction for correcting the longitudinal wear amount of the electrode with the X-Y plane feed and controlling at least one type of the repeating movement of the tool path, the working fluid supplying means for supplying the ion exchanging water as the working fluid between poles, and a working power source for applying bipolar voltage between the poles and supplying the pulse current of high peak and short pulse, that has a negative polarity at an electrode side, between the poles only when an electrical discharge is generated while the electrode side is negative polarity. It performs machining under the wearing machining condition in which an electrode consuming percentage is 40% or more. Thus, there is an effect that it is possible to obtain an electrical discharge machining apparatus which can perform three-dimensional electrical discharge machining with high machining speed and high machining accuracy and can prevent decomposition of a workpiece due to an electrolytic corrosion.

The electrical discharge machining apparatus of the nineteenth aspect of the invention is made so as to perform machining while supplying the pulse current whose peak value is 100A or more and pulse width is 20 microseconds or less, as a pulse current wave form of high peak and short pulse, so that there is an effect that machining speed and accuracy of an edge portion are improved more, in addition to the effect.

The electrical discharge machining apparatus of the twentieth aspect of the invention is made so as to perform machining while using brass as a material for an electrode of simple shape, so that there is an effect that machining speed is improved much more, in addition to the effects.

According to the electrical discharge machining method of the twenty-first aspect of the invention, the method applies voltage between the electrode and the workpiece which are faced to each other, synthesize the feed in the Z-axis direction for correcting the longitudinal wear amount of the electrode with the X-Y plane feed, and perform machining while repeatedly moving the electrode on the inside machining path for forming the inside shape path in the machining shape and the profile machining path for forming the profile shape path in the machining shape. Thus, it does not need to change patterns of the machining path for removing a material which is left along an edge of a machining layer, each time when the layer to be machined is changed one to another. Therefore, there are effects that machining program becomes easy and data capacity can be decreased drastically.

According to the electrical discharge machining apparatus of the twenty-second aspect of the invention, the apparatus comprises the inside machining path generating means for generating the inside shape path in the machining shape, and the profile machining path generating means for generating the profile shape path in the machining shape. It applies voltage between the electrode and the workpiece which are faced to each other, synthesize the feed in the Z-axis direction for correcting the longitudinal wear amount of the electrode with the X-Y plane feed, and performs machining while repeatedly moving the inside machining path for forming the inside shape path in the machining shape and the profile machining path for forming the profile shape path in the machining shape. It does not need to change patterns of the machining path for removing a material which is left along an edge of a machining layer, each time when the layer to be machined is changed from one to another. Therefore, there is an effect that it is possible to obtain an electrical discharge machining apparatus which can make machining program easy and decrease data capacity drastically.

According to the electrical discharge machining apparatus of the twenty-third aspect of the invention, the apparatus comprises a machining program generating means for electrical discharge machining which includes the inside machining path generating means for generating the inside shape path in the machining shape and the profile machining path generating means for generating the profile shape path in the machining shape. It generates the inside shape path and the profile shape path in the machining shape before machining, applies voltage between the electrode and the workpiece which are faced to each other, and performs machining by repeatedly moving the above inside shape path and the profile shape path while synthesizing the feed in the Z-axis direction for correcting the longitudinal wear amount of the electrode with the X-Y plane feed. Thus, it does not need to change patterns of the machining path for removing a material which is left along an edge of a machining layer, each time when the layer to be machined is changed from one to another. Therefore, an electrical discharge machining can be advantageously obtained in which the machining program is easy to make and in which data capacity is drastically decreased.

According to the electrical discharge machining method of the twenty-fourth aspect of the invention, the method performs machining of the machining shape having a side surface of an optional angle by applying voltage between the electrode and the workpiece which are faced to each other, synthesizing the feed in the Z-axis direction for correcting the longitudinal wear amount of the electrode with the X-Y plane feed, and machining it repeatedly while reducing gradually or changing inwardly the profile shape path of the machining shape. Thus, there are effects that the shape of the electrode is stable, that it is not necessary to correct a machining error due to change of an electrode shape and that an inclining side surface shape can be easily obtained with very high accuracy.

According to the electrical discharge machining apparatus of the twenty-fifth aspect of the invention, the apparatus comprises the offset program storage means for storing the profile shape path in the machining shape as a program having offset information and the offset value storage means for storing a plurality of offset values which change during machining. It performs machining of the machining shape having a side surface of an optional angle by applying voltage between the electrode and the workpiece which are faced to each other, synthesizing the feed in the Z-axis direction for correcting the longitudinal wear amount of the electrode with the X-Y plane feed, and machining it repeatedly while changing gradually the offset value of the profile shape path in the machining shape. Thus, there is an effect that it is possible to perform machining of inclining side surface shape by only defining one program as a profile shape program.

According to the electrical discharge machining apparatus of the twenty-sixth aspect of the invention, the apparatus comprises the offset program storage means for storing the profile shape path in the machining shape as a program having offset information, the side surface shape storage means for storing information about a side surface shape, and the offset value calculating means for calculating offset value, which changes during machining, on the basis of the above information about the side surface shape. It performs machining of the machining shape having a side surface of an optional angle by applying voltage between the electrode and the workpiece which are facing to each other, synthesizing the feed in the Z-axis direction for correcting the longitudinal wear amount of the electrode with the X-Y plane feed, calculating the offset value, which changes during machining, on the basis of the information about the side surface shape, and machining it repeatedly while changing gradually the offset value. Thus, there is an effect that it is possible to perform machining of complicated and optional side surface shape in three dimension.

According to the electrical discharge machining apparatus of the twenty-seventh aspect of the invention, the apparatus comprises the electrode holding means for fixing an electrode at a slanting state by a predetermined angle to its electrode rotation axis, and the machining power source that can vary the electrode wear amount. It machines and forms a side surface shape having a constant slope by applying voltage between the electrode and the workpiece while rotating the electrode at the slanting state by the predetermined angle to its electrode rotation axis, and performing profile machining for a desired shape while synthesizing the feed in the Z-axis direction for correcting the longitudinal wear amount of the electrode with the X-Y plane feed. Thus, there is an effect that it is possible to perform machining of a side surface shape having an optional inclining angle easily.

According to the electrical discharge machining method of the twenty-eighth aspect of the invention, the method applies voltage between the electrode and the workpiece which are faced to each other, performs machining by a cylindrical electrode or tubular electrode of radius R while synthesizing the feed in the Z-axis direction for correcting the longitudinal wear amount of the electrode with the X-Y plane feed, and thereafter performs finishing of a corner portion of radius R, which the above cylindrical electrode or tubular electrode fails to remove, by using a quadrangular column electrode whose one side length L of quadrangle in section is to be $$L \leq \left(1 - \frac{1}{\sqrt{2}}\right) \cdot R.$$

Thus, there is an effect that it is possible to perform a corner finishing with high accuracy by an angular electrode.

According to the electrical discharge machining method of the twenty-ninth aspect of the invention, the method applies voltage between the electrode and the workpiece which are faced to each other, performs machining by a cylindrical electrode or tubular electrode of radius R while synthesizing the feed in the Z-axis direction for correcting the longitudinal wear amount of the electrode with the X-Y plane feed, and thereafter performs finishing of a corner portion of radius R, which the above cylindrical electrode or tubular electrode fails to remove, by using a cylindrical electrode for finishing whose radius R' is to be $$R' \leq \left(1 - \frac{1}{\sqrt{2}}\right) \cdot R.$$

Thus, there is an effect that it is possible to perform a corner finishing with high accuracy by a cylindrical electrode.

According to the electrical discharge machining method of the thirtieth aspect of the invention, the method applies voltage between the electrode and the workpiece which are faced to each other, performs machining by the above cylindrical electrode or tubular electrode of radius R while synthesizing the feed in the Z-axis direction for correcting the longitudinal wear amount of the electrode with the X-Y plane feed, and thereafter performs finishing of the corner portion, which the above cylindrical electrode or tubular electrode fails to remove, by using an electrode of such shape as a part of the liquid supplying hole portion covers the corner portion which the above cylindrical electrode or tubular electrode fails to remove. Thus, there is an effect that it is possible to perform a corner finishing with high accuracy by a cylindrical electrode or tubular electrode.

According to the electrical discharge machining apparatus of the thirty-first aspect of the invention, the apparatus comprises the electrode exchanging means for exchanging a plurality of electrodes, the corner portion judging means for judging whether a position which is now machined is a corner portion or not, and the relative position control means. The relative position control means controls the electrode to perform machining in a slanting direction while synthesizing the feed in the Z-axis direction for correcting the longitudinal wear amount of the electrode with the X-Y plane feed at the corner portion, and to perform only the X-Y plane feed at portions other than the corner potion. The apparatus applies voltage between the electrode and the workpiece which are faced to each other, performs machining by a cylindrical electrode or tubular electrode while synthesizing the feed in the Z-axis direction for correcting the longitudinal wear amount of the electrode with the X-Y plane feed, thereafter exchanges the electrode for a finishing electrode, and performs finishing machining of the corner portion by the machining in slanting direction, while synthesizing the feed in the Z-axis direction for correcting the longitudinal wear amount of the electrode with the X-Y plane feed at the corner portion and performing only the X-Y plane feed at the portions except the corner portion, depending on whether a position which is now machined is a corner portion or not. Thus, there is an effect that the finishing accuracy of corner portions is improved.

According to the electrical discharge machining apparatus of the thirty-second aspect of the invention, the apparatus comprises the interpole detecting means for detecting whether interpole space is opened or not on the basis of decrease of discharge frequency or increase of average machining voltage or the like during machining, and a relative position control means for stopping the feed in the Z-axis direction and performing only the X-Y plane feed in case the interpole space is opened or nearly opened by the above interpole detecting means. The apparatus applies voltage between the electrode and the workpiece which are faced to each other, performs machining while synthesizing the feed in the Z-axis direction for correcting the longitudinal wear amount of the electrode with the X-Y plane feed, and stops the feed in the Z-axis direction and performs only the X-Y plane feed in case the interpole space is opened or nearly opened. Thus, there are effects that a corner portion is judged automatically and finishing accuracy of the corner portion is improved.

According to the electrical discharge machining apparatus of the thirty-third aspect of the invention, the apparatus performs horizontal movement at portions other than the corner portions at higher speed than that of normal machining feed. Thus, there are effects that it is possible to improve finishing accuracy of the corner portion and reduce the time for machining drastically, in addition to the effect of the thirty-first and thirty-second aspects of the invention.

According to the electrical discharge machining apparatus of the thirty-fourth aspect of the invention, the apparatus comprises the moving speed detecting means for detecting reduction of horizontal moving speed at a portion other than the above mentioned corner portion, and the corner portion judging means for judging whether or not the electrode for corner finishing reaches a bottom surface formed by rough machining on the basis of a detected result of the above moving speed detecting means. The apparatus judges whether or not the electrode for corner finishing reaches the bottom surface formed by rough machining on the basis of the reduction of the horizontal moving speed of the portion other than the above mentioned corner portion, and judges complete time of finishing machining. Thus, there is an effect that it is possible to perform finishing with high accuracy without deterioration of machining accuracy of the bottom surface, which has been made by the premachining, due to the finishing machining, in addition to the effects of the thirty-first and thirty-second aspects of the invention.

According to the electrical discharge machining apparatus of the thiry-fifth aspect of the invention, the apparatus comprises the interpole detecting means for detecting increase of the discharge frequency or decrease of average machining voltage during machining, and the corner portion judging means for judging whether or not an electrode for corner finishing reaches the bottom surface formed by rough machining on the basis of the detected result by the above interpole detecting means. The apparatus judges whether or not the electrode for corner finishing reaches the bottom surface formed by rough machining by detecting increase of the discharge frequency or decrease of the average machining voltage, and judges complete time of finishing machining. Thus, there is an effect that it is possible to perform finishing with high accuracy without deterioration of machining accuracy of the bottom surface, which has been made by the premachining, due to the finishing machining, in addition to the effect of the thirty-first and thirty-second aspects of the invention.

What is claimed is:

1. An electric discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

storing a correction amount for performing correction of the electrode feed in the Z axis direction corresponding to a fixed unit moving distance of the electrode in an X-Y plane and a two-dimensional path of the electrode in the X-Y plane, as a NC program for the NC control, and performing a feed of the electrode by the correction amount in the Z-axis direction each time the electrode moves by the fixed unit moving distance in the X-Y plane during machining.

2. An electrical discharge machining method as recited in claim 1, further comprising the step of performing machining of a machining shape having a side surface of a desired angle by repeatedly machining while gradually reducing or inwardly changing a profile shape path in a machining shape.

3. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

a storage means for storing a correction amount for performing correction of the electrode feed in the Z-axis direction corresponding to a fixed unit moving distance of the electrode in an X-Y plane and a two-dimensional path of the electrode in the X-Y plane, as a NC program for the NC control, and a relative position control means for performing a feed of the electrode by the correction amount in the Z-axis direction each time the electrode moves by the fixed unit moving distance in the X-Y plane during machining.

4. An electrical discharge machining apparatus as recited in claim 3, further comprising:

a repetition time control means for regulating the feed of the electrode in the Z-axis direction for correcting for the longitudinal wear amount of the electrode with the X-Y plane feed of the electrode and controlling one type of a repeating movement of a tool path, a machining liquid supplying means for supplying ion exchange water as machining liquid between poles, and a working power source for supplying a pulse current of high peak and short pulse between the poles, said working power source having a negative polarity at an electrode side, thereby performing machining under a wearing machining condition having an electrode wearing percentage of 40% or more.

5. An electrical discharge machining apparatus as recited in claim 3, further comprising:

a repetition time control means for regulating the feed of the electrode in the Z-axis direction for correcting for a longitudinal wear amount of the electrode with the X-Y plane feed of the electrode and controlling one type of a repeating movement of a tool path, a machining liquid supplying means for machining ion exchange water as machining liquid between poles, and a working power source that has a negative polarity at an electrode side between the poles, for applying bipolar voltage between the poles and supplying a pulse current of high peak and short pulse, thereby performing machining under a wearing machining condition having an electrode wearing percentage of 40% or more.

6. An electrical discharge machining apparatus as recited in claim 3, further comprising:

an offset program storage means for storing a profile shape path in a machining shape as a program having offset information and an offset value storage means for storing a plurality of offset values to be changed during machining, thereby performing machining of a shape having a side surface of a desired angle by repeatedly machining while changing the offset values one after another.

7. An electrical discharge machining apparatus as recited in claim 3, further comprising:

an offset program storage means for storing a profile shape path in a machining shape as a program having offset information, a side surface shape storage means for storing information about a side surface shape, and an offset value calculating means for calculating an offset value to be changed during machining on the basis of the stored information, thereby performing machining of a shape having a side surface of a desired angle by machining while changing the offset value based on a calculated result of the offset value calculating means.

8. An electric discharge machining apparatus as recited in claim 4 or claim 5, wherein the working power source for supplying the pulse current of high peak and short pulse uses a pulse current with a peak value of 100A or more and a pulse width of 20 microseconds or less.

9. An electric discharge machining apparatus as recited in claim 8, wherein the electrode is comprised of brass.

10. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

storing a relation between a fixed unit moving distance in an X-Y plane and a corresponding correction amount for performing correction of the electrode feed in the Z-axis direction and a two-dimensional path of the electrode in the X-Y plane, as a NC program for the NC control, and performing a feed of the electrode by said correction amount in the Z-axis direction each time the electrode moves by the fixed unit moving distance in the X-Y plane during machining.

11. An electrical discharge machining apparatus which applies voltage between an electrode and a workpiece and which performs three-dimensional NC control while regulating a feed in a Z-axis direction, for correcting for a longitudinal wear amount of the electrode, said apparatus comprising:

a storage means for storing a relation between a fixed unit moving distance in an X-Y plane and a corresponding correction amount for performing correction of the electrode feed in the Z-axis direction and a two-dimensional path of the electrode in the X-Y plane, as a NC program for the NC control, and a relative position control means for performing a feed of the electrode by the correction amount in the Z-axis direction each time the electrode moves by the fixed unit moving distance in the X-Y plane during machining.

12. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

storing a relation between a specific unit moving distance in an X-Y plane and a corresponding correction amount, for performing correction of the electrode feed in the Z-axis direction, as a specific unit moving distance in the X-Y plane and an angle, and a two-dimensional path of the electrode in the X-Y plane, as a NC program for the NC control, and performing a feed of the electrode by the correction amount in the Z-axis direction each time the electrode moves by the specific unit moving distance in the X-Y plane during machining.

13. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

a storage means for storing a relation between a fixed unit moving distance in an X-Y plane and a corresponding correction amount, for performing correction of the electrode feed in the Z-axis direction as a fixed unit moving distance in the X-Y plane and an angle, and a two-dimensional path of the electrode in the X-Y plane, as a NC program for the NC control, and a relative position control means for performing a feed of the electrode by the correction amount in the Z-axis direction each time the electrode moves by the fixed unit moving distance in the X-Y plane during machining.

14. An electrical discharge machining method which applies voltage between an electrode and a workpiece and which performs three-dimensional NC control while regulating a feed of an electrode in a Z-axis direction, for correcting for a longitudinal wear amount of the electrode, said method comprising the steps of:

storing a relation between a fixed unit moving distance in an X-Y plane and a corresponding correction amount for performing correction of the electrode feed in the Z-axis direction, and a relation between a fixed unit moving distance in the Z-axis direction and the corresponding correction amount, for performing correction of the electrode feed in the Z-axis direction, and calculating a corrected fixed unit moving distance in the X-Y plane on the basis of the fixed unit moving distance in the X-Y plane and the fixed unit moving distance in the Z-axis direction, and performing a feed of the electrode by the correction amount in the Z-axis direction each time the electrode moves by the corrected fixed unit moving distance in the X-Y plane during machining.

15. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

a storage means for storing a relation between a fixed unit moving distance in an X-Y plane and a corresponding correction amount for performing correction in the Z-axis direction, and a relation between a fixed unit moving distance in the Z-axis direction and the corresponding correction amount for performing correction in the Z-axis direction, and a relative position control means for calculating a corrected fixed unit moving distance in the X-Y plane on the basis of the fixed unit moving distance in the X-Y plane and the fixed unit moving distance in the Z-axis direction, and performing a feed of the electrode by the correction amount in the Z-axis direction each time the electrode moves by the corrected fixed unit moving distance in the X-Y plane during machining.

16. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

storing a relation between a fixed unit moving distance in an X-Y plane and a corresponding correction amount for performing correction in the Z-axis direction, and a relation between a fixed unit moving distance in the Z-axis direction and the corresponding correction amount for performing correction in the Z-axis direction, and performing a feed of the electrode by the correction amount in the Z-axis direction each time the electrode moves by the fixed unit moving distance in the X-Y plane and the electrode moves by the fixed unit moving distance in the Z-axis direction during machining.

17. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

a storage means for storing a relation between a fixed unit moving distance in an X-Y plane and a corresponding correction amount for performing correction in the Z-axis direction, and a relation between a fixed unit moving distance in the Z-axis direction and the corresponding correction amount for performing correction in the Z-axis direction, and a relative position control means for performing a feed of the electrode by the correction amount in the Z-axis direction each time the electrode moves by the fixed unit moving distance in the X-Y plane and the fixed unit moving distance in the Z-axis direction during machining.

18. An electrical discharge machining method which divides a desired three-dimensional shape into a plurality of layers in a Z-axis direction, which applies voltage between an electrode and a workpiece and which performs machining for each layer while regulating a feed of an electrode in the Z-axis direction, for correcting for a longitudinal wear amount of the electrode, so as to perform three-dimensional NC control, said method comprising the steps of:

storing X-Y data of a tool path for each layer, a correction unit interval as a standard for performing correction in an X-Y axis direction, and a unit moving distance in the Z-axis direction corresponding to the correction unit interval, and a two-dimensional path of the electrode in the X-Y plane, as a NC program for the NC control;

controlling the number of times machining on the tool path is performed for each layer based on a machining depth determined by a moving amount in the Z-axis direction and the unit moving distance in the Z-axis direction corresponding to an X-Y moving distance.

19. An electrical discharge machining apparatus which divides a desired three-dimensional shape into a plurality of layers in a Z-axis direction, which applies voltage between an electrode and a workpiece and which performs machining for each layer while regulating a feed of the electrode in the Z-axis direction, for correcting for a longitudinal wear amount of the electrode, so as to perform three-dimensional NC control, said apparatus comprising:

a storage means for storing X-Y data of a tool path for each layer, a correction unit interval as a standard for correcting in an X-Y axis direction, and a unit moving distance in the Z-axis direction corresponding to the correction unit interval, and a two-dimensional path of the electrode in the X-Y plane, as a NC program for the NC control, and a repetition time control means for controlling the number of times machining on the tool path is for each layer performed based on the unit moving distance in the Z-axis direction, an X-Y moving distance in the X-Y plane corresponding to the unit moving distance in the Z-axis direction and a machining depth determined by a thickness of each layer.

20. An electrical discharge machining method which divides a desired three-dimensional shape into a plurality of layers in a Z-axis direction, which applies voltage between an electrode and a workpiece and which performs machining for each layer while regulating a feed of the electrode in the Z-axis direction for correcting for a longitudinal wear amount of the electrode, so as to perform three-dimensional NC control, said method comprising the steps of:

storing X-Y data of a tool path for each layer, a correction unit interval as a standard for correcting in an X-Y axis direction, and a unit moving distance in the Z-axis direction corresponding to the correction reference interval;

controlling the number of times machining on the tool path is performed based on the unit moving distance in the Z-axis directions, an X-Y moving distance in the X-Y plane corresponding to the unit moving distance in the Z-axis direction and a machining depth determined by a thickness of the layer;

measuring the machining depth during or subsequent to the controlling step while performing machining for each layer, comparing the measured machining depth with a machining depth expected for the number of times machining was performed on the tool path, and, if the measured machining depth exceeds an allowable range, changing one or more of the subsequent repetition times, repetition times to be added, the unit moving distance in the Z-axis direction, the X-Y plane corresponding to the unit moving distance in the Z-axis direction, and electrical conditions that are able to control the wear amount of the electrode.

21. An electrical discharge machining apparatus which divides a desired three-dimensional shape into a plurality of layers in a Z-axis direction, which applies voltage between an electrode and a workpiece and which performs machining for each layer while regulating a feed of the electrode in the Z-axis direction, for correcting for a longitudinal wear amount of the electrode, so as to perform three-dimensional NC control, said apparatus comprising:

a storage means for storing X-Y data of a tool path for each layer;

a repetition time control means for controlling how many times machining along the tool path is performed based on a unit moving distance moved by the electrode in the Z-axis direction, an X-Y moving distance moved by the electrode in the X-Y plane corresponding to the unit moving distance in the Z-axis direction and a machining depth determined by a thickness of the layer;

a measuring means for measuring the machining depth during machining;

an electrical condition control means for comparing the measured machining depth with a machining depth expected for the number of times machining is performed on the tool path, and when the measured machining depth exceeds an allowable range, changing one or more of the subsequent repetition times, repetition times to be added, the unit moving distance in the Z-axis direction, the X-Y moving distance in the X-Y plane corresponding to the unit moving distance in the Z-axis direction, and electrical conditions that control the wear amount of the electrode.

22. An electrical discharge machining method which divides a desired three-dimensional shape into a plurality of layers in a Z-axis direction, which applies voltage between an electrode and a workpiece and which performs machining for each layer while regulating a feed of the electrode in the Z-axis direction, for correcting for a longitudinal wear amount of the electrode, so as to perform three-dimensional NC control, said method comprising the steps of:

storing X-Y data of a tool path for each layer;

deciding how many times the tool path is performed based on a unit moving distance in the Z-axis direction, a moving distance in the X-Y plane corresponding to the unit moving distance in the Z-axis direction and a machining depth determined by a thickness of the layer;

measuring the machining depth during the decided number of repetition times or after the decided number of repetition times while performing machining for each layer and controlling the repetition times of the tool path;

comparing the measured machining depth with a machining depth expected for the decided number of repetition times, and when the measured machining depth exceeds an allowable range, changing one or more of the subsequent repetition times, repetition times to be added, a unit moving distance of the electrode in the X-Y direction, a feed amount of the electrode in the Z-axis direction corresponding to the unit moving distance in the X-Y direction, the unit moving distance in the Z-axis direction, the X-Y moving distance in the X-Y plane corresponding to the unit moving distance in the Z-axis direction, and electrical conditions that are able to control the wear amount of the electrode.

23. An electrical discharge machining apparatus which divides a desired three-dimensional shape into a plurality of layers in a Z-axis direction, which applies voltage between an electrode and a workpiece and which performs machining for each layer while regulating a feed of the electrode in the Z-axis direction, for correcting for a longitudinal wear amount of the electrode, so as to perform three-dimensional NC control, said apparatus comprising:

a storage means for storing X-Y data of a tool path for each layer;

a repetition time control means for deciding and controlling how many times machining along the tool path is repeated depending on a unit moving distance in the Z-axis direction, an X-Y moving distance in the X-Y plane corresponding to the unit moving distance in the Z-axis direction and a machining depth determined by a thickness of the layer;

a measuring means for measuring the machining depth; and an electrical condition control means for comparing the measured machining depth with the machining depth expected for the decided number of repetition times, and when the measured machining depth exceeds an allowable range, changing one or more of the subsequent repetition times, repetition times to be added, a unit moving distance in an X-Y direction, a feed amount in the Z-axis direction corresponding to the unit moving distance in the X-Y direction, the unit moving distance in the Z-axis direction, the X-Y moving distance in the X-Y plane corresponding to the unit moving distance in the Z-axis direction, and electrical conditions that are able to control the wear amount of the electrode.

24. An electric discharge machining apparatus as recited in any one of claim 1, 3, 4, 5, 10, to claim 23 wherein the electrode is brass.

25. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the step of: performing machining while repeatedly moving an inside machining path for forming an inside shape path in a machining shape and repeatedly moving a profile machining path for forming a profile shape path in the machining shape.

26. An electrical discharge machining apparatus which applies voltage between an electrode and a workpiece and which performs three-dimensional NC control while regulating a feed of an electrode in a Z-axis direction, for correcting for a longitudinal wear amount of the electrode, said apparatus comprising:

an inside machining path generating means for generating an inside shape path in a machining shape, and a profile machining path generating means for generating a profile shape path in the machining shape, thereby performing machining while repeatedly moving the inside shape path and the profile shape path.

27. An electrical discharge machining apparatus which applies voltage between an electrode and a workpiece and which performs three-dimensional NC control while regulating a feed in a Z-axis direction, for correcting for a longitudinal wear amount of the electrode, said apparatus comprising:

an inside machining path generating means for forming an inside shape path in a machining shape and a profile machining path generating means for forming a profile shape path in the machining shape.

28. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

an electrode holding means for fixing the electrode at a slanting state of a predetermined angle from its electrode rotation axis, and a working power source that can vary an electrode wear amount, thereby providing an apparatus which forms a side surface shape having a constant slope by profile machining during the machining of the desired shape and while rotating the electrode at the slanting state of the predetermined angle.

29. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

performing machining of an inside corner portion of a radius R by a cylindrical electrode or tubular electrode, and, thereafter, finishing a corner portion which the cylindrical electrode or tubular electrode fails to remove by a quadrangular electrode having one side length L being $$L \leq \left(1 - \frac{1}{\sqrt{2}}\right) \cdot R.$$

30. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

performing machining of an inside corner portion of a radius R using a cylindrical electrode or tubular initial machining electrode, and, thereafter, finishing machining a corner portion which the initial machining electrode fails to remove by a finishing electrode of either cylindrical or tubular shape, said finishing electrode having a radius R' of $$R' \leq \left(1 - \frac{1}{\sqrt{2}}\right) \cdot R.$$

31. An electrical discharge machining method which applies voltage between an electrode and a workpiece and which performs three-dimensional NC control while regulating a feed of the electrode in a Z-axis direction, for correcting for a longitudinal wear amount of the electrode, said method comprising the steps of:

performing machining of an inside corner portion of a radius R using a tubular shaped initial machining electrode, and, thereafter, finishing a corner portion which the initial machining electrode fails to remove by a finishing electrode of either cylindrical or tubular shape, said finishing electrode further having such a shape as a part of a liquid hole portion covers the corner portion which the finishing electrode fails to remove.

32. An electrical discharge machining apparatus which applies voltage between an electrode and a workpiece and which performs three-dimensional NC control while regulating a feed of the electrode in a Z-axis direction, for correcting for a longitudinal wear amount of the electrode, said apparatus comprising:

an electrode exchanging means for exchanging a plurality of electrodes;

a corner portion judging means for judging whether a position which is being machined is a corner portion; and a relative position control means for controlling so as to perform machining in a slanting direction while regulating the feed of the electrode in the Z-axis direction to correct for the longitudinal wear amount of the electrode with the X-Y plane feed of the electrode at a corner portion; thereby providing an apparatus for performing only the X-Y plane feed of the electrode at portions other than the corner portion, exchanging the electrode for an electrode for finishing after machining by a cylindrical electrode or tubular electrode, and performing finishing machining for the corner portion on the basis of a command of the relative position control means.

33. An electrical discharge machining apparatus which applies voltage between an electrode and a workpiece, and which performs three-dimensional NC control while regulating a feed of the electrode in a Z-axis direction, for correcting for a longitudinal wear amount of the electrode, said apparatus comprising:

an interpole detecting means for detecting when an interpole space is opened due to a decrease of a discharge frequency or an increase of an average machining voltage or the like during machining, said interpole detecting means stopping a feed in a Z-axis direction and performing only the X-Y plane feed when the interpole detecting means detects that the interpole space is opened or nearly opened.

34. An electrical discharge machining apparatus as recited in claim 32 or claim 33, wherein the interpole control means performs a horizontal movement at portions other than corner portions at a higher speed than a normal machining feed.

35. An electrical discharge machining apparatus as recited in claim 32 or claim 33 further comprising:

a moving speed detecting means for detecting a decrease of a horizontal moving speed at portions other than the corner portions, and a corner portion judging means for judging when an electrode for finishing a corner reaches a bottom surface by rough machining from detected results of the interpole detecting means and judging a time of completing finishing machining by the corner portion judging means.

36. An electrical discharge machining apparatus as recited in claim 32 or claim 33, further comprising:

an interpole detecting means for detecting an increase of a discharge frequency or a decrease of an average machining voltage during machining, and a corner portion judging means for judging when an electrode for finishing a corner reaches a bottom surface during machining from detected results of the interpole detecting means, thereby determining completion of finishing machining by the corner portion judging means.

* * * * *